(12) United States Patent
Schaffner et al.

(10) Patent No.: US 6,186,252 B1
(45) Date of Patent: Feb. 13, 2001

(54) FOLDABLE MIDWHEEL DRIVE POWER CHAIR

(75) Inventors: Walter E. Schaffner, Shavertown; James P. Mulhern; Gerald J. White, both of Hunlock Creek; Stephen J. Antonishak, Alden, all of PA (US)

(73) Assignee: Pride Mobility Products, Corporation, Exeter, PA (US)

( * ) Notice: Under 35 U.S.C. 154(b), the term of this patent shall be extended for 0 days.

(21) Appl. No.: 09/166,303

(22) Filed: Oct. 5, 1998

Related U.S. Application Data

(63) Continuation-in-part of application No. 09/060,187, filed on Apr. 14, 1998, which is a continuation-in-part of application No. 29/067,721, filed on Jan. 31, 1997, now Pat. No. Des. 404,693, which is a continuation-in-part of application No. 08/748,214, filed on Nov. 12, 1996, now Pat. No. 5,944,131, which is a continuation-in-part of application No. 08/742,972, filed on Nov. 1, 1996, which is a continuation-in-part of application No. 29/056,607, filed on Jul. 3, 1996, now Pat. No. Des. 397,645

(60) Provisional application No. 60/061,120, filed on Oct. 6, 1997.

(51) Int. Cl.$^7$ ........................................... B60K 1/00
(52) U.S. Cl. .................... 180/65.1; 280/657; 280/907
(58) Field of Search .................... 180/65.1, 6.48, 180/6.5, 250.1, 907; 297/423.26, 423.34, 423.36, DIG. 4, DIG. 10; 280/647, 657, 658

(56) References Cited

U.S. PATENT DOCUMENTS

| Re. 30,867 | 2/1982 | Gaffney . |
|---|---|---|
| D. 171,318 | 1/1954 | Wegele . |
| D. 178,841 | 9/1956 | Krummer . |
| D. 305,521 | 1/1990 | Wiatrak et al. . |
| D. 357,653 | 4/1995 | Kruse . |

(List continued on next page.)

FOREIGN PATENT DOCUMENTS

| 1018906 | 10/1977 | (CA) . |
|---|---|---|
| 1207867 | 7/1986 | (CA) . |
| 1233100 | 2/1988 | (CA) . |
| 27 03 727 | 8/1978 | (DE) . |
| 2724553 | 12/1978 | (DE) . |

(List continued on next page.)

OTHER PUBLICATIONS

Pride Health Care, Inc. brochure entitled "The Pride . . . Partner . . . Your Mobility Connection" (undated).

Everest & Jennings brochure entitled "Quest Transportable Power Wheelchair", Oct., 1994.

Huntleigh Mobility brochure entitled "Corbie Power Chair The Ultimate in Manoeuvrability and Style", 1996.

Pride Health Care, Inc. brochure entitled "Pride's New Jazzy" (undated).

Sunrise Medical Ltd. borchure entitled "PowerTec F60 & F60S", 1994.

(List continued on next page.)

*Primary Examiner*—Richard M. Camby
(74) *Attorney, Agent, or Firm*—Seidel, Gonda, Lavorgna & Monaco, PC

(57) ABSTRACT

A power chair is provided comprising a frame transversely foldable between operating and transport positions. A seat is connected to the frame, with a pair of drive wheels also connected to the frame. The drive wheels are rotatable about a transverse axis below a portion of the seat supporting an occupant's thighs. The power chair further includes motors for driving respective drive wheels. Perspective motor/drive wheel combinations are pivotally connected to the frame. At least one ground-engaging idler wheel is connected to the frame, located rearward of the drive wheels. At least one anti-tip wheel is positioned above ground, forward of the drive wheels, and connected to the frame for movement relative to the frame upon encountering an obstacle.

25 Claims, 44 Drawing Sheets

U.S. PATENT DOCUMENTS

| | | |
|---|---|---|
| D. 365,786 | 1/1996 | Peterson . |
| D. 365,787 | 1/1996 | Peterson et al. . |
| D. 365,788 | 1/1996 | Peterson . |
| D. 380,991 | 7/1997 | Deming . |
| 1,046,681 | 10/1912 | Towson . |
| 1,268,229 | 6/1918 | Frank . |
| 1,281,980 | 10/1918 | Kostewich . |
| 1,293,958 | 2/1919 | Smedshammer . |
| 1,296,531 | 3/1919 | Landby . |
| 1,309,305 | 7/1919 | Scheiner . |
| 1,333,121 | 3/1920 | Roche . |
| 1,348,568 | 8/1920 | Kemble . |
| 1,428,907 | 9/1922 | Reigh . |
| 1,459,371 | 6/1923 | Kelly . |
| 1,875,512 | 9/1932 | Silvestri . |
| 1,984,831 | 12/1934 | Higley . |
| 2,495,573 | 1/1950 | Duke . |
| 2,574,199 | 11/1951 | Tandler et al. . |
| 2,594,034 | 4/1952 | King . |
| 2,696,272 | 12/1954 | Schlaphoff . |
| 2,749,997 | 6/1956 | Deslippe . |
| 2,817,406 | 12/1957 | Brewer . |
| 2,819,093 | 1/1958 | Geiser . |
| 2,839,146 | 6/1958 | Bouffort . |
| 2,867,449 | 1/1959 | Shawver . |
| 2,886,118 | 5/1959 | Strunk . |
| 2,910,130 | 10/1959 | Schlaphoff . |
| 2,919,758 | 1/1960 | Newton et al. . |
| 2,973,048 | 2/1961 | Jensen . |
| 2,978,251 | 4/1961 | Gerdes . |
| 2,986,200 | 5/1961 | Nobile . |
| 2,993,550 | 7/1961 | Klappert . |
| 2,994,546 | 8/1961 | Cooper . |
| 3,001,599 | 9/1961 | Fryar . |
| 3,004,619 | 10/1961 | Straussler . |
| 3,042,132 | 7/1962 | Bouffort . |
| 3,043,389 | 7/1962 | Steinberg . |
| 3,057,425 | 10/1962 | Proett . |
| 3,079,172 | 2/1963 | Burwell . |
| 3,104,112 | 9/1963 | Crail . |
| 3,106,481 | 10/1963 | Sorg . |
| 3,110,352 | 11/1963 | McClarnon . |
| 3,117,648 | 1/1964 | Landreth . |
| 3,177,962 | 4/1965 | Bailey . |
| 3,190,676 | 6/1965 | Junge . |
| 3,202,234 | 8/1965 | Osborne . |
| 3,212,596 | 10/1965 | Johnson . |
| 3,213,957 | 10/1965 | Wrigley . |
| 3,249,171 | 5/1966 | Kinghorn . |
| 3,254,734 | 6/1966 | Behrmann . |
| 3,282,365 | 11/1966 | McReynolds . |
| 3,329,228 | 7/1967 | Harris . |
| 3,369,629 | 2/1968 | Weiss . |
| 3,486,765 | 12/1969 | Turner . |
| 3,504,934 | 4/1970 | Wallis . |
| 3,513,926 | 5/1970 | Paget, Jr. . |
| 3,580,349 | 5/1971 | Brennan et al. . |
| 3,580,591 | 5/1971 | Coffey . |
| 3,605,929 | 9/1971 | Rolland . |
| 3,664,450 | 5/1972 | Udden et al. . |
| 3,698,502 | 10/1972 | Patin . |
| 3,713,502 | 1/1973 | DeLaney et al. . |
| 3,749,192 | 7/1973 | Karchak, Jr. et al. . |
| 3,770,289 | 11/1973 | Dougherty et al. . |
| 3,781,031 | 12/1973 | Patin . |
| 3,855,654 | 12/1974 | Pivacek . |
| 3,871,464 | 3/1975 | Eden . |
| 3,876,041 | 4/1975 | Pivacek . |
| 3,891,229 | 6/1975 | Gaffney . |
| 3,896,891 | 7/1975 | Miltenburg et al. . |
| 3,901,527 | 8/1975 | Danziger et al. . |
| 3,902,758 | 9/1975 | Pivacek . |
| 3,921,744 | 11/1975 | Benoit et al. . |
| 3,924,706 | 12/1975 | Figura . |
| 3,930,551 | 1/1976 | Cragg . |
| 3,931,989 | 1/1976 | Nagamitsu . |
| 3,933,373 | 1/1976 | Gammelgaard . |
| 3,941,198 | 3/1976 | Kappas . |
| 3,945,449 | 3/1976 | Ostrow . |
| 3,952,822 | 4/1976 | Udden et al. . |
| 3,953,054 | 4/1976 | Udden et al. . |
| 4,006,916 | 2/1977 | Patin . |
| 4,037,678 | 7/1977 | Braune . |
| 4,042,054 | 8/1977 | Ward . |
| 4,082,348 | 4/1978 | Haury . |
| 4,108,449 | 8/1978 | Rhodes . |
| 4,111,274 | 9/1978 | King et al. . |
| 4,119,163 | 10/1978 | Ball . |
| 4,203,612 | 5/1980 | Feikema . |
| 4,319,381 | 3/1982 | Rodaway . |
| 4,353,567 | 10/1982 | Weldy . |
| 4,387,325 | 6/1983 | Klimo . |
| 4,424,873 | 1/1984 | Terlaak . |
| 4,429,055 | 1/1984 | Rao . |
| 4,431,076 | 2/1984 | Simpson . |
| 4,436,320 | 3/1984 | Brudermann et al. . |
| 4,449,990 | 5/1984 | Tedford, Jr. . |
| 4,452,327 | 6/1984 | Mowat et al. . |
| 4,460,057 | 7/1984 | Kohyama . |
| 4,469,188 | 9/1984 | Mita . |
| 4,500,102 | 2/1985 | Haury et al. . |
| 4,503,925 | 3/1985 | Palmer et al. . |
| 4,511,825 | 4/1985 | Klimo . |
| 4,513,832 | 4/1985 | Engman . |
| 4,538,857 | 9/1985 | Engman . |
| 4,541,501 | 9/1985 | Kawasaki . |
| 4,546,764 | 10/1985 | Gerber . |
| 4,555,121 | 11/1985 | Lockard et al. . |
| 4,570,739 | 2/1986 | Kramer . |
| 4,595,212 | 6/1986 | Haury et al. . |
| 4,633,962 | 1/1987 | Cox et al. . |
| 4,634,941 | 1/1987 | Klimo . |
| 4,655,471 | 4/1987 | Peek . |
| 4,671,257 | 6/1987 | Kaiser et al. . |
| 4,721,321 | 1/1988 | Haury et al. . |
| 4,724,559 | 2/1988 | Bly et al. . |
| 4,771,840 | 9/1988 | Keller . |
| 4,805,925 | 2/1989 | Haury et al. . |
| 4,811,945 | 3/1989 | Disbrow et al. . |
| 4,813,693 | 3/1989 | Lockard et al. . |
| 4,834,413 | 5/1989 | Patel et al. . |
| 4,840,390 | 6/1989 | Lockard et al. . |
| 4,887,830 | 12/1989 | Fought et al. . |
| 4,892,166 | 1/1990 | Gaffney . |
| 4,909,525 | 3/1990 | Flowers . |
| 4,947,955 | 8/1990 | Hopely, Jr. . |
| 4,962,551 | 10/1990 | Bly . |
| 4,967,864 | 11/1990 | Boyer et al. . |
| 4,981,305 | 1/1991 | Lockard et al. . |
| 4,989,890 | 2/1991 | Lockard et al. . |
| 5,020,624 | 6/1991 | Nesterick et al. . |
| 5,033,793 | 7/1991 | Quintile . |
| 5,038,430 | 8/1991 | Bly . |
| 5,074,372 | 12/1991 | Schepis . |
| 5,076,390 | 12/1991 | Haskins . |
| 5,078,227 | 1/1992 | Becker . |
| 5,094,310 | 3/1992 | Richey et al. . |
| 5,111,899 | 5/1992 | Reimann . |
| 5,121,806 | 6/1992 | Johnson . |
| 5,121,938 | 6/1992 | Gross et al. . |
| 5,134,731 | 8/1992 | Quintile et al. . |

| | | |
|---|---|---|
| 5,145,020 | 9/1992 | Quintile et al. . |
| 5,150,762 | 9/1992 | Stegeman et al. . |
| 5,154,251 | 10/1992 | Fought . |
| 5,156,226 | 10/1992 | Boyer et al. . |
| 5,169,506 | 12/1992 | Michaels . |
| 5,170,826 | 12/1992 | Carstensen et al. . |
| 5,180,025 | 1/1993 | Yeh et al. . |
| 5,183,133 | 2/1993 | Roy et al. . |
| 5,186,793 | 2/1993 | Michaels . |
| 5,195,803 | 3/1993 | Quintile . |
| 5,203,610 | 4/1993 | Miller . |
| 5,228,533 | 7/1993 | Mitchell . |
| 5,238,082 | 8/1993 | Stegeman et al. . |
| 5,263,728 | 11/1993 | Patel et al. . |
| 5,294,141 | 3/1994 | Mentessi et al. . |
| 5,341,517 | 8/1994 | Bly . |
| 5,366,037 | 11/1994 | Richey . |
| 5,366,038 | 11/1994 | Hidetsugu et al. . |
| 5,378,045 | 1/1995 | Siekman et al. . |
| 5,397,443 | 3/1995 | Michaels . |
| 5,413,187 | 5/1995 | Kruse et al. . |
| 5,419,571 | 5/1995 | Vaughan . |
| 5,421,598 | 6/1995 | Robertson et al. . |
| 5,435,404 | 7/1995 | Garin, III . |
| 5,442,823 | 8/1995 | Siekman et al. . |
| 5,445,233 | 8/1995 | Fernie et al. . |
| 5,513,899 | 5/1996 | Michaels et al. . |
| 5,518,081 | 5/1996 | Thibodeau . |
| 5,522,734 | 6/1996 | Goertzen . |
| 5,531,284 | 7/1996 | Okamoto . |
| 5,540,297 | 7/1996 | Meier . |
| 5,573,260 | 11/1996 | Peterson et al. . |
| 5,575,348 | 11/1996 | Goertzen et al. . |
| 5,592,997 | 1/1997 | Ball . |
| 5,690,183 | 11/1997 | Sengel . |
| 5,697,465 | 12/1997 | Kruse . |
| 5,727,802 | 3/1998 | Garven et al. . |
| 5,823,621 | 10/1998 | Broadhead . |
| 5,848,658 | 12/1998 | Pulver . |
| 5,853,059 | 12/1998 | Goertzen et al. . |
| 5,899,475 | 5/1999 | Verhaeg et al. . |
| 5,964,473 | 10/1999 | Degonda et al. ................ 280/250.1 |
| 6,070,898 | 6/2000 | Dickie et al. ..................... 280/304.1 |

FOREIGN PATENT DOCUMENTS

| | | |
|---|---|---|
| 3128112 | 2/1983 | (DE) . |
| 92038786 | 6/1992 | (DE) . |
| 296 14 531 U | 11/1996 | (DE) . |
| 0 338 689 A2 | 3/1989 | (EP) . |
| 338689 | 10/1989 | (EP) . |
| 0 312 969 B1 | 3/1993 | (EP) . |
| 0 339 500 B1 | 3/1993 | (EP) . |
| 1064076 | 5/1954 | (FR) . |
| 2215054 | 8/1974 | (FR) . |
| 2383822 | 10/1978 | (FR) . |
| 2399822 | 3/1979 | (FR) . |
| 2 455 886 | 5/1979 | (FR) . |
| 2399822 | 9/1979 | (FR) . |
| 1447961 | 9/1976 | (GB) . |
| 2061197 | 5/1981 | (GB) . |
| 2127364 | 4/1984 | (GB) . |
| 2132954 | 7/1984 | (GB) . |
| 2 141 980 | 1/1985 | (GB) . |
| 2 224 980 | 5/1990 | (GB) . |
| 2265868 | 10/1993 | (GB) . |
| 2311970 | 10/1997 | (GB) . |
| 58-63575 | 4/1983 | (JP) . |
| WO8702633 | 5/1987 | (WO) . |
| WO8706205 | 10/1987 | (WO) . |
| WO 90/05515 | 3/1990 | (WO) . |
| WO9006097 | 6/1990 | (WO) . |
| WO9117077 | 11/1991 | (WO) . |
| WO 96/15000 | 5/1996 | (WO) . |
| WO9615752 | 5/1996 | (WO) . |

OTHER PUBLICATIONS

Everest and Jennings O.C. 3 brochure entitled "Voyager IV", 1983.
Permobil brochure entitled "Permobil Power Chairman Empowering the Human Spirit" (undated).
Bodypoint Designs brochure entitled "Bodypoint Designs Winter Catalog 1995–1996", Copyright 1995.
Orthofab Inc. brochure entitled "V.I.P. Mobility for Everyone" (undated).
Permobile brochure entitled "Permobil for Kids" (undated).
Quickie Designs Inc. brochure entitled "Quickie Power Products" (undated).
Ligtvoet Products B.V. brochure entitled "Ligtvoet Modern Design" (undated).
MEYRA Wilhelm Meyer GmbH & Co. KG brochure entitled "Vorbild Einer Neuen Zeit—MEYRA" (undated).
MEYRA Wihelm Meyer GmbH & Co. KB brochure entitled "Die Elektrischen Aktiven—MEYRA" (undated).
MEYRA Wilhelm Meyer GmbH & Co. KG brochure entitled "Sonderbedieneinheiten—MEYRA" (undated).
Booster Electric Vehicles Ltd. brochure entitled "PUMA Booster" (undated).
Invacare brochure entitled "Cruiser 4E" (undated).
Mangar International brochure entitled "The Mangar Freestyle" (undated).
Aldersley Battery Chairs Limited brochure entitled "Aldersley EXCEL—The first of its kind!" (undated).
Aldersley Battery Chairs Limited brochure entitled "Are You Looking for a New Electric Wheelchair?" (undated).
Colours 'N motion brochure entitled "Little Dipper" (undated).
Colours by Permobil brochure entitled "Boing!" (undated).
Colours 'N motion brochure entitled "Eclipse" (undated).
Colours 'N motion brochure entitled "Impact" (undated).
Colours by Permobil order form for the Avenger (undated).
Colours by Permobil order form for The Boing! (undated).
Colours by Permobil order form for The Supernova Xtreme (undated).
Colours by Permobil order form for The Eclipse (undated).
Colours by Permobil order form for The G–Force (undated).
Colours by Permobil order form for The Impact (undated).
Colours by Permobil order form for The Little Dipper (undated).
LaBac Systems brochure entitled "LaBac Introduces it's Tilt, ASB, and RSR on the Quickie P300 with 20" Wheels" dated Jun. 3, 1996.
Kid–Kart order form dated Oct. 1, 1996.
Hoveround Corporation brochure entitled "Personal Mobility Vehicles" (undated).
Permobil brochure entitled "Chairman MPS Permobil Multi Position System" (undated).
Permobil order form for Chair.Man Mini Flex, Mar. 1, 1996.
Permobil order form for Chair.Man Stander, Mar. 1, 1996.
Permobil order form for Chair.Man MPS, Mar. 1, 1996.
Permobil order form for Chair.Man Corpus, Mar. 1, 1996.
Permobil order form for Chair.Man Robo, Mar. 1, 1996.
Permobil order form for Chair.Man Mini Stander, Mar. 1, 1996.
Permobil announcement entitled "Thank You for Your Interest in Permobil's Power Mobility Products!" (undated).

Booster Electric Vehicles Ltd. brochure entitled "BEATLE 2 Booster" (undated).

Permobil brochure entitled "Chairman of Permobil" (undated).

MEYRA Wilhelm Meyer GmbH & Co. KG brochure entitled "Elektronik OPTIMUS Light" (undated).

Invacare brochure entitled "Action P7E," 1997.

Quickie Designs Inc. brochure entitled "Quickie P100/P110" (undated).

"Designer's Corner" article, *Design News Magazine*, p. 54, Feb. 24, 1992.

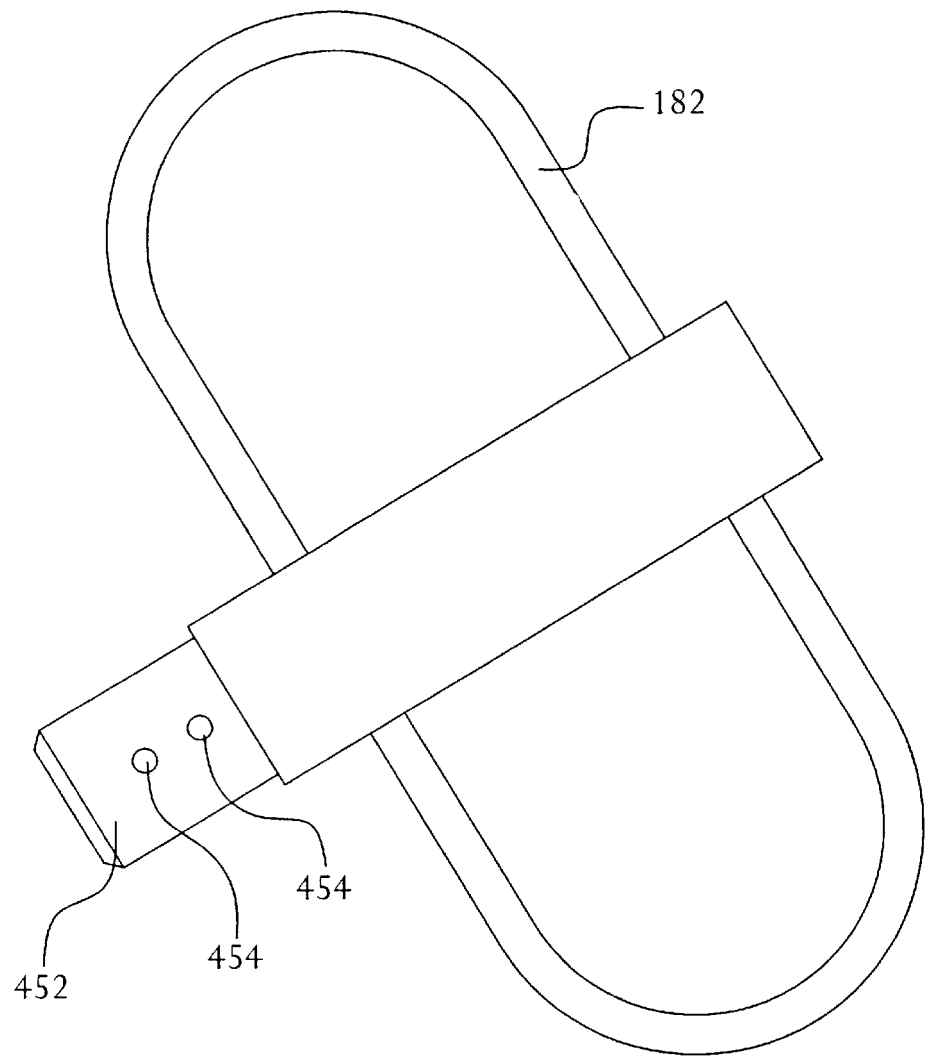
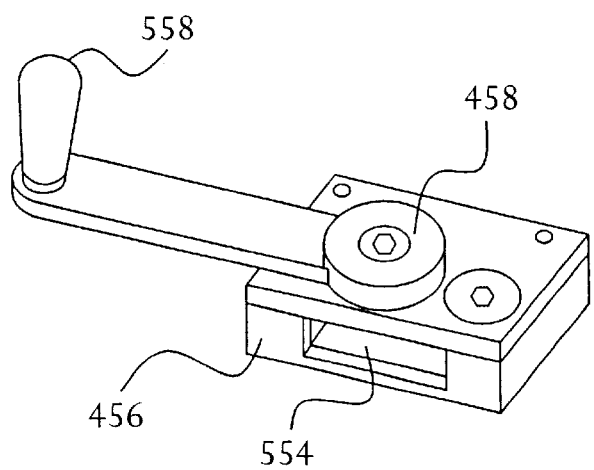
FIG. 10

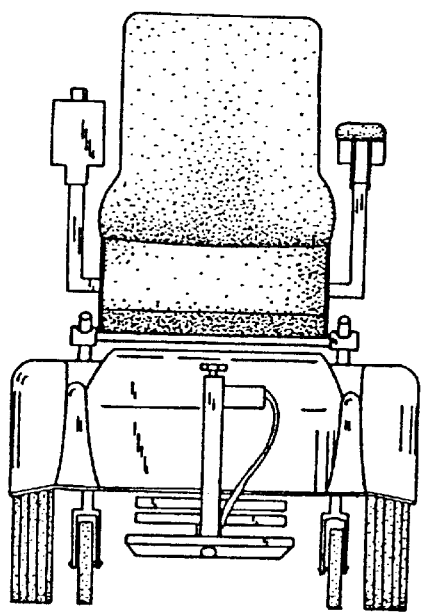 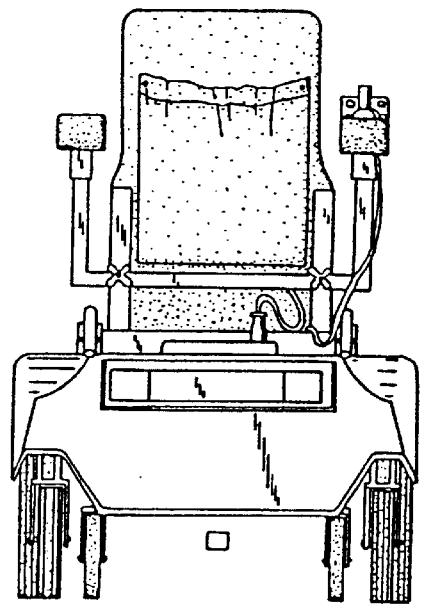
FIG. 32  FIG. 33
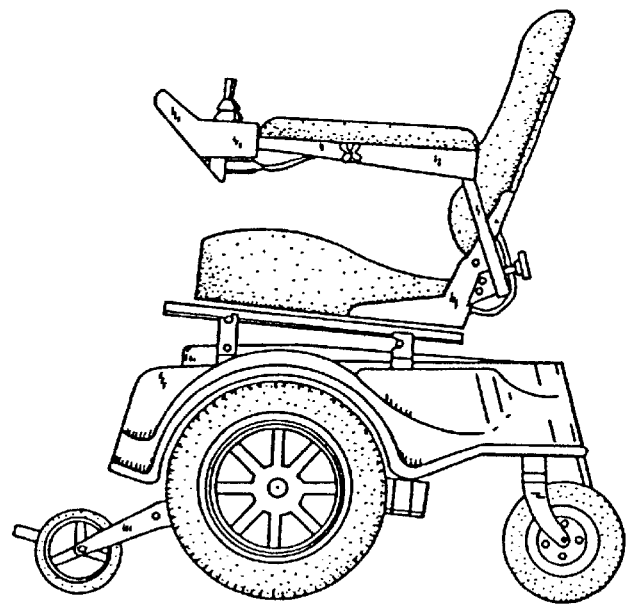
FIG. 34

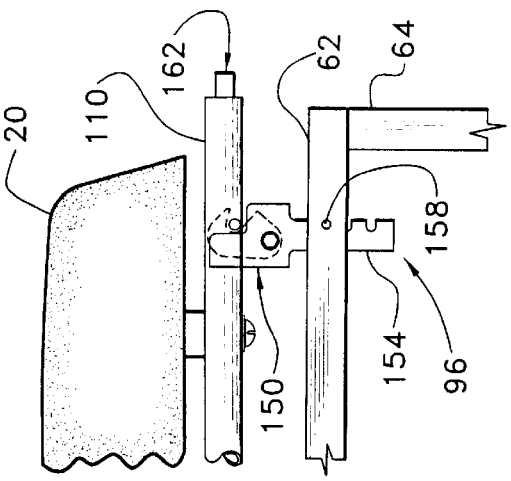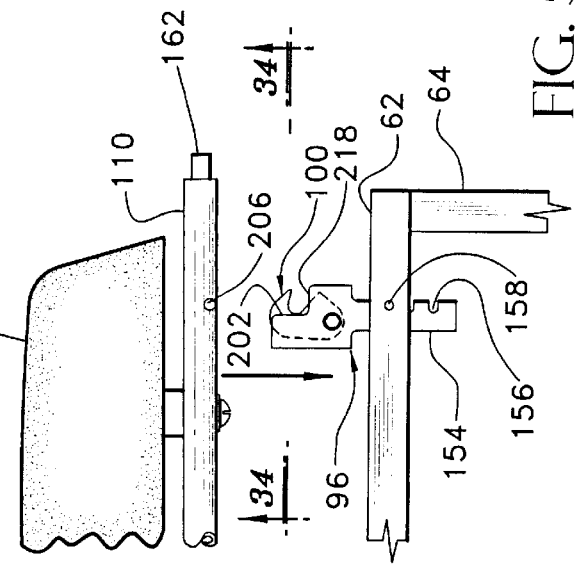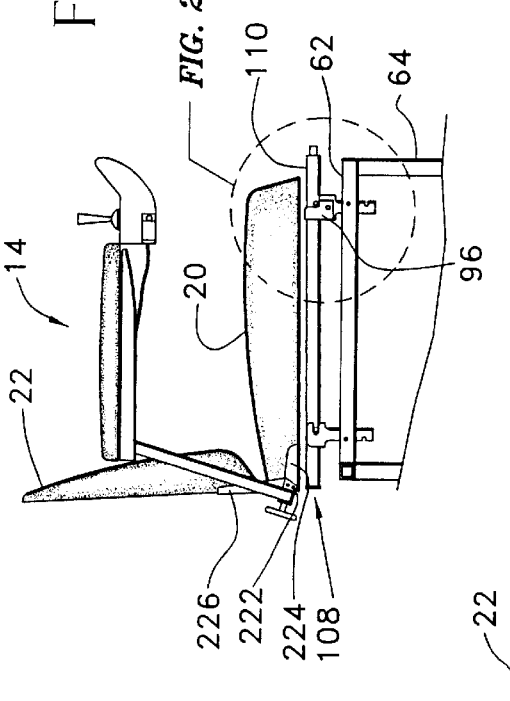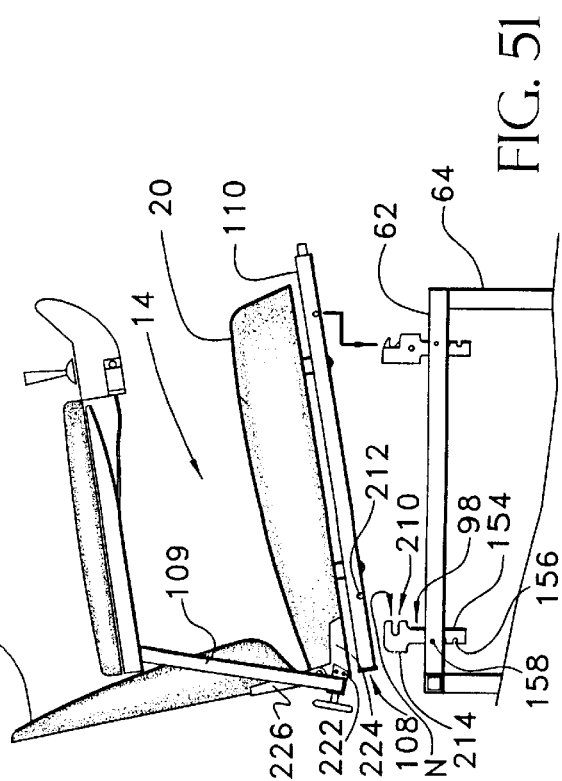

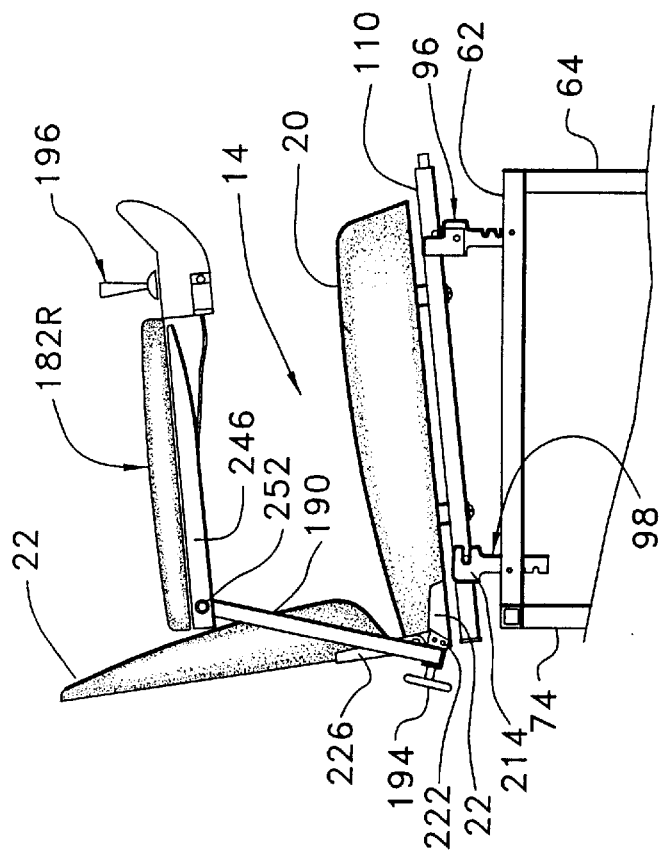
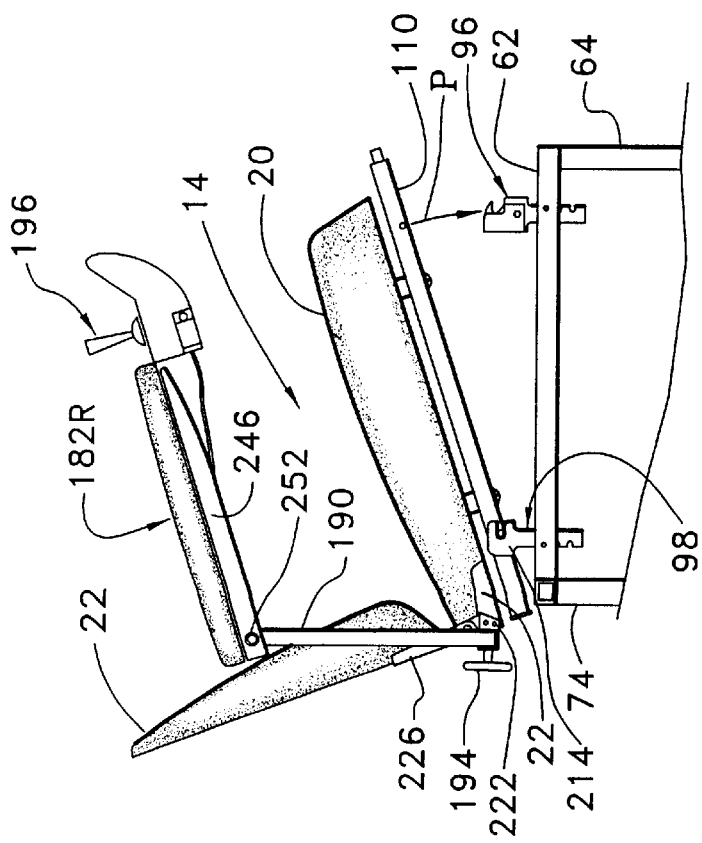

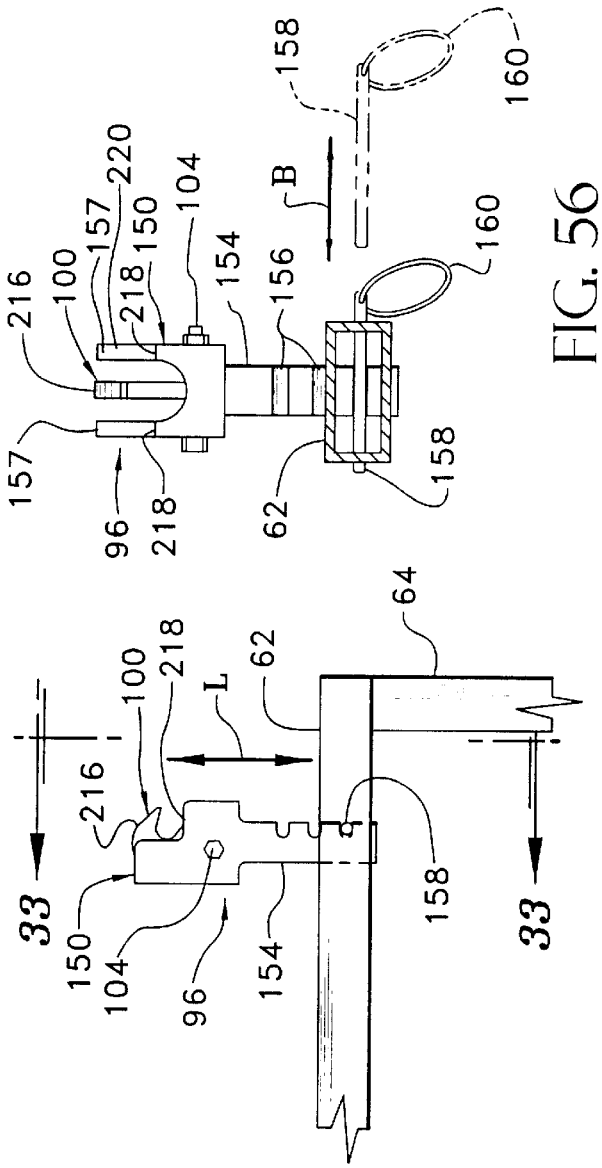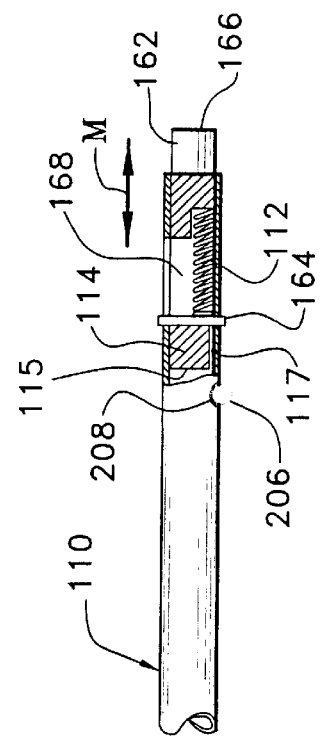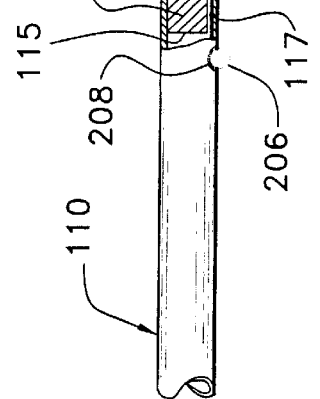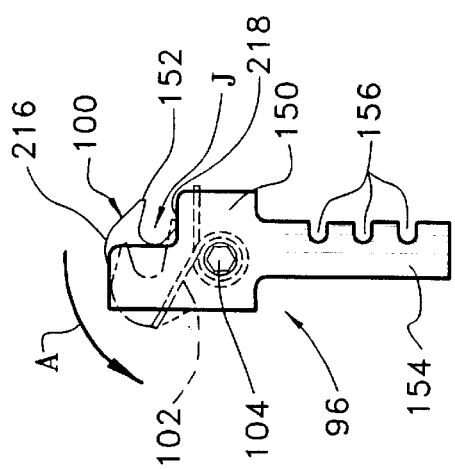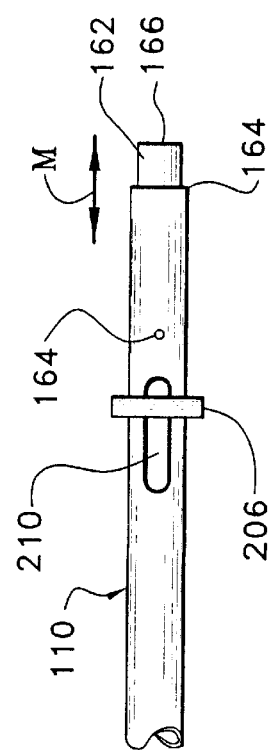

FOLDABLE MIDWHEEL DRIVE POWER CHAIR

CROSS-REFERENCE TO RELATED APPLICATIONS

This patent application is based in part on U.S. provisional patent application Ser. No. 60/061,120, filed Oct. 6, 1997 in the names of Walter E. Schaffner, James P. Mulhern, Stephen J. Antonishak and Gerald J. White and entitled FOLDABLE MID-WHEEL DRIVE POWER WHEELCHAIR, the benefit of the filing date of which is hereby claimed under 35 USC 120. This patent application is a continuation-in-part of U.S. design patent application Ser. No. 29/067,721 filed Jan. 31, 1997 now U.S. Des. Pat. No. 404,693, U.S. utility patent application Ser. No. 08/742,972 filed Nov. 1, 1996, U.S. utility patent application Ser. No. 08/748,214 filed Nov. 12, 1996 now U.S. Pat. No. 5,944,131 and U.S. patent application Ser. No. 09/060,187 filed Apr. 14, 1998, all of which are, directly or indirectly, continuation-in-parts of U.S. design application Ser. No. 29/056,607 filed Jul. 3, 1996, now U.S. Des. Pat. No. 397,645 issued Sep. 1, 1998, the benefit of the filing date of which are claimed under 35 USC 120.

FIELD OF THE INVENTION

This invention relates to wheelchairs, particularly to powered wheelchairs, for use by handicapped and disabled persons.

BACKGROUND OF THE INVENTION

Power wheelchairs are known and have been the subject of increasing development efforts to provide handicapped and disabled persons with independent mobility to assist handicapped and disabled persons in leading more normal lives.

Power wheelchairs known heretofore have, for the most part, resembled conventional, manual wheelchairs; indeed, many such power wheelchairs have merely been conventional wheelchairs equipped with motors. Use of such power wheelchairs sometimes results in the user feeling a stigma associated therewith in that unthoughtful persons may view and even speak to the power wheelchair user in a quizzical or even offensive manner.

Known power wheelchairs suffer in that they tend to be large and are not particularly maneuverable. These large, difficult to maneuver power wheelchairs present difficulties for the power wheelchair user in navigating within conventional dwellings which have not been modified to accommodate such conventional power wheelchairs.

Typical conventional rear wheel drive power wheelchairs, which are little more than manual wheelchairs equipped with motors, have turning circles of about 72 inches in diameter, whereas typical front wheel drive power wheelchairs have, for the most part, turning circles in the neighborhood of 52 inches in diameter. These turning circles are too big for the user of a conventional power wheelchair to reverse the wheelchair direction by turning the wheelchair around within a corridor or hallway of a conventional office building or most homes.

Power wheelchairs with two drive motors are known; one is illustrated in U.S. Pat. No. 5,540,297. Other power wheelchairs are disclosed in U.S. Pat. Nos. 4,513,832; 4,538,857; 5,094,310; 5,145,020 and 5,366,037.

Front wheel drive power wheelchairs are sold by Permobile, Inc. in Woburn, Mass. and typically have the driving front wheels at the extreme forward end of the vehicle chassis thereby requiring substantial space in order to turn the front wheel drive power wheelchair because the axis of rotation of the chair, upon turning, is between the drive wheel axes which are at the extreme forward end of the chair.

Foldable power rear wheel drive wheelchairs are also known, having been developed by converting conventional folding wheelchairs into powered folding wheelchairs by incorporation of drive motors into the conventional folding wheelchairs. Such conventional folding wheelchairs are typically difficult to fold in that an "X" folding mechanism is utilized having sleeves sliding along tubular members in a vertical direction as the two halves or sides of the folding wheelchair frame move towards one another. The "X" members terminate in the sleeves which slide up and down along vertical members of the side frames. Typically, the sleeves tend to bind as the sleeves endeavor to slide along the vertical members; such binding makes it difficult to fold and unfold conventional folding power wheelchairs.

SUMMARY OF THE INVENTION

In one of its aspects this invention provides a foldable, midwheel drive power chair having a frame, a removable seat supported by the frame, a pair of drive wheels connected to the frame and preferably rotatable about a transverse axis under a central portion of the seat and a pair of idler wheels preferably connected to the frame behind the drive wheels.

In another of its aspects this invention provides a foldable midwheel power chair including a frame, a seat and latch means for retaining the seat preferably in fixed disposition on the frame upon application of downward force to the seat such as by a power chair user occupying the power chair seat and for releasing the seat from the frame responsively to application of preferably manually generated and applied preferably axially-oriented force to said latch means, all without use of tools.

In yet another of its aspects this invention provides a foldable midwheel power chair including a frame, a seat preferably having cushion and back portions, with the seat being mounted on the frame, a pair of drive wheels connected to the frame and rotatable about transverse axes below a portion of the seat cushion supporting a chair occupant's thighs, where each drive wheel is rotatably connected to a side member portion of the frame which side member frame portions move towards one another when the power chair is folded after the seat portion has been removed from the foldable frame, where the power chair preferably includes a pair of idler wheels connected to the frame behind the seat.

In yet another of its aspects this invention provides a power chair including a frame, a seat supported by the frame, a pair of drive wheels rotatable about transverse axes preferably below a central portion of the seat, motors for rotating respective ones of the drive wheels with the motors being preferably connected to the drive wheels for unitary motion therewith and with the frame upon the connected drive wheel encountering an obstacle.

In yet another of its aspects this invention provides a power chair which has a foldable frame, a seat, a pair of drive wheels rotatable about transverse axes preferably below the seat, motors for driving respective ones of the drive wheels, at least one battery for powering the motors and a pair of decorative body fenders for preferably at least partially concealing the batteries and the motors with the fenders preferably resting on the frame. The frame preferably supports the seat by extending through the fenders.

In yet another of its aspects this invention provides a power chair including a foldable frame, a seat, a pair of drive wheels rotatable about transverse axes below the seat, motors for driving respective ones of the drive wheels, at least one battery for powering the motors and means, preferably operable responsively to preferably manually generated force, for releasably connecting the seat to the frame, where the preferably manually generated force is preferably axially oriented and is most preferably in the form of a pair of parallel force vectors.

In yet another of its aspects this invention provides a power chair having a foldable frame, a seat and means for manually adjustably positioning seat height and/or tilt respecting the frame, without the use of tools, including front and rear seat support members which are longitudinally spaced from one another, extend upwardly from the frame and are movable upwardly respecting the frame independently of one another together with means for manually fixing the front and rear seat support members independently at selected ones of a plurality of positions to the frame.

In yet another of its aspects this invention provides a power chair including a foldable frame, a seat having a cushion, a back and arms on either side of and above the cushion and means for adjustably transversely positioning the arms separated from one another along a continuum of positions thereby to adjustably select the effective width of the seat, where the means for adjustably positioning the arms may include an arm support base, arm support extensions connected to the arm support base and movable transversely therealong and means for adjustably fixing the arm support members respecting the arm support base at a selected location along said continuum of positions along the arm support base by application of manual force thereto without the use of tools.

In yet another of its aspects this invention provides a power chair having a foldable frame and a seat and providing in combination the aforementioned means for manually adjustably positioning seat-tilt respecting the frame without the use of tools.

BRIEF DESCRIPTION OF THE DRAWINGS

FIG. 10 is a two part drawing of a disassembled arm lock apparatus usable with a power chair having a frame as illustrated in FIGS. 1 through 6, with one part of the drawing being a plan view and the second part being an isometric.

FIG. 32 is a front view of a power chair shown in Figure H as presented in co-pending U.S. patent application Ser. No. 08/742,972 with FIG. I hereof corresponding to FIG. 9 of that application.

FIG. 33 is a rear view of a power chair shown in Figures G and H as presented in co-pending U.S. patent application Ser. No. 08/742,972 with Figure J hereof corresponding to FIG. 10 of that application.

FIG. 34 is a left side view of a power chair shown in Figures H through J as presented in co-pending U.S. patent application Ser. No. 08/742,972 with Figure K hereof corresponding to FIG. 11 of that application.

FIG. 48 is a broken side view of the seat and an upper portion of the frame of the power chair illustrated in Figures N through R showing means operable responsively to manually generated force for releasably connecting the seat to the frame as presented in co-pending U.S. patent application Ser. No. 08/742,972 with Figure Y hereof corresponding to FIG. 25 of that application.

FIG. 49 is a broken side view of the seat and an upper portion of the frame of the power chair as illustrated in Figure Y showing the seat support structure partially engaged with the frame as presented in co-pending U.S. patent application Ser. No. 08/742,972 with Figure Z hereof corresponding to FIG. 26 of that application.

FIG. 50 is a broken side view of the seat and an upper portion of the frame similar to Figures X and Z showing the power chair seat mounted on the frame in a position tilted back relative to the position illustrated in Figure Y as presented in co-pending U.S. patent application Ser. No. 08/742,972 with Figure AA hereof corresponding to FIG. 27 of that application.

FIG. 51 is a broken side view of the seat and an upper portion of the frame, similar to Figures Y through AA, depicting operation of means for releasably connecting the seat to the frame as presented in co-pending U.S. patent application Ser. No. 08/742,972 with Figure BB hereof corresponding to FIG. 28 of that application.

FIG. 52 is a side view taken at the position of circle 29 in Figure Y illustrating a latch portion of means for releasably connecting the seat to the frame as presented in co-pending U.S. patent application Ser. No. 08/742,972 with Figure CC hereof corresponding to FIG. 29 of that application.

FIG. 53 is a side view taken at the same position as Figure CC illustrating the seat subframe ready to engage a latch portion of means for releasably connecting the seat to the frame as presented in co-pending U.S. patent application Ser. No. 08/742,972 with Figure DD hereof corresponding to FIG. 30 of that application.

FIG. 54 is a side view of the latch illustrated in Figures CC and DD, depicting movement of latch parts as presented in co-pending U.S. patent application Ser. No. 08/742,972 with Figure EE hereof corresponding to FIG. 31 of that application.

Figure FF is a view of the portion of the frame and the latch illustrated in Figures CC and DD, taken at the same position, illustrating vertical adjustment of a seat support member as presented in co-pending U.S. patent application Ser. No. 08/742,972 with Figure FF hereof corresponding to FIG. 32 of that application.

FIG. 55 is a front elevation of the structure illustrated in Figure FF taken at arrows 33—33 in Figure FF as presented in co-pending U.S. patent application Ser. No. 08/742,972 with Figure GG hereof corresponding to FIG. 33 of that application.

FIG. 56 is a partially broken view of a portion of a seat subframe taken at arrows 34—34 in Figure DD as presented in co-pending U.S. patent application Ser. No. 08/742,972 with Figure HH hereof corresponding to FIG. 34 of that application.

Figure 35:
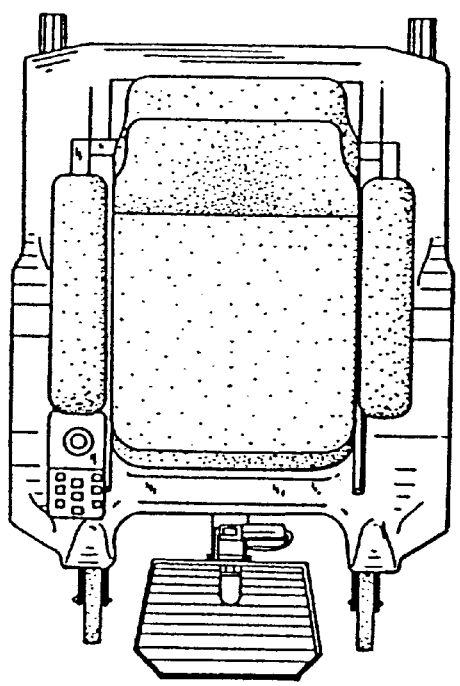
FIG. 35 is a top view of a power chair shown in Figures H through K as presented in co-pending U.S. patent application Ser. No. 08/742,972 with Figure L hereof corresponding to FIG. 12 of that application.

FIG. 57 is a partially broken side view of structure illustrated in Figure HH as presented in co-pending U.S. patent application Ser. No. 08/742,972 with Figure II hereof corresponding to FIG. 35 of that application.

Figure 36:
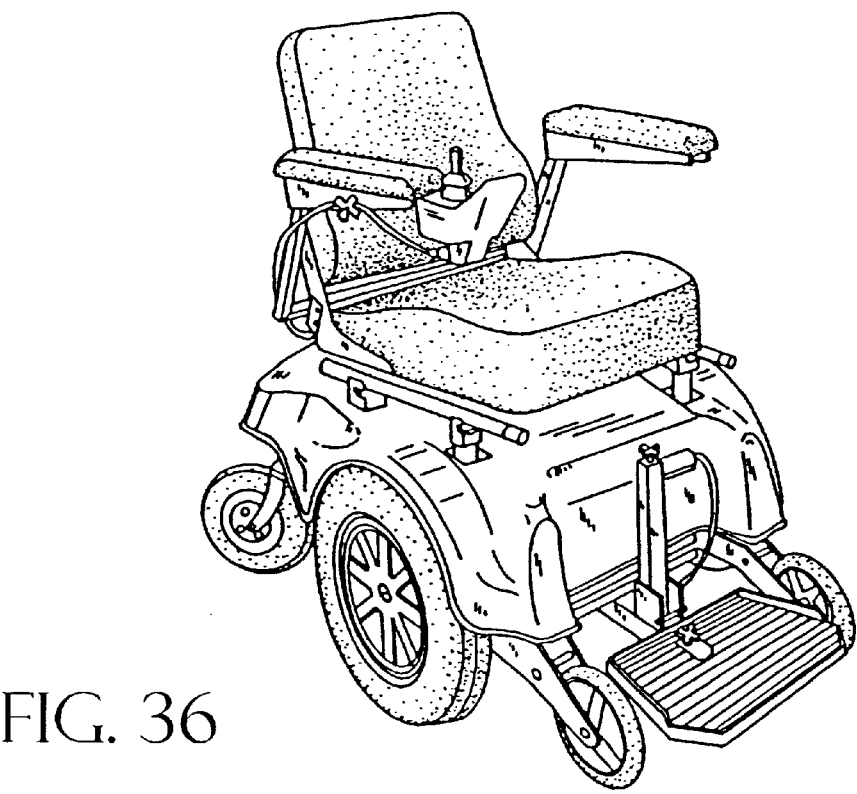
FIG. 36 is a perspective view looking at the right front of the power chair shown in Figures H through L as presented in co-pending U.S. patent application Ser. No. 08/742,972 with Figure M hereof corresponding to FIG. 13 of that application.

FIG. 58 is a side view of an arm of a power chair seat as illustrated generally in Figures Y through BB showing the manner in which the arm may be swung upwardly as presented in co-pending U.S. patent application Ser. No. 08/742,972 with Figure JJ hereof corresponding to FIG. 36 of that application.

Figure 37:
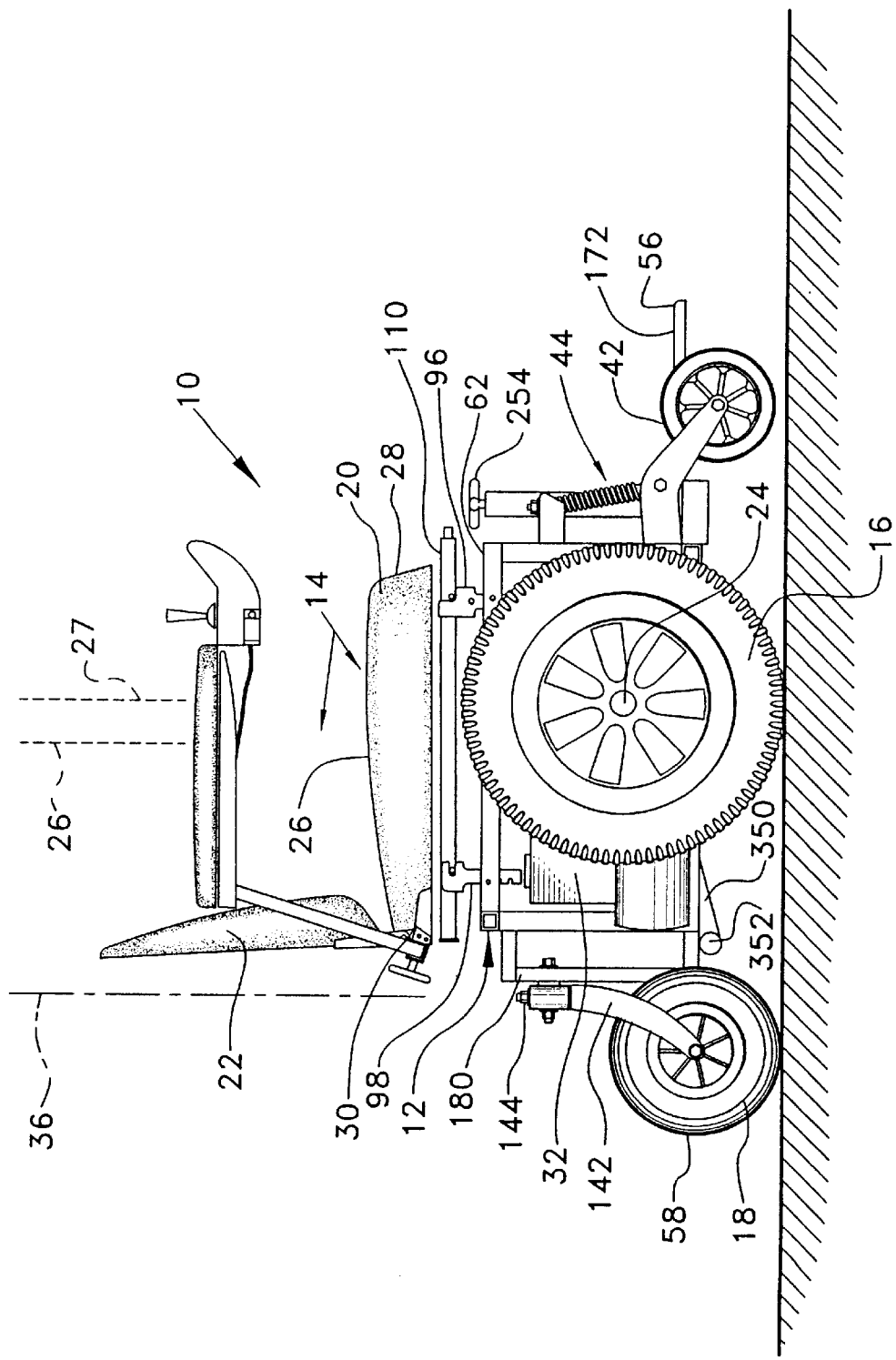
FIG. 37 is a side view of a power chair as presented in co-pending U.S. patent application Ser. No. 08/742,972 with Figure N hereof corresponding to FIG. 14 of that application.

FIG. 59 is an enlarged view of structure illustrated in Figure JJ taken at circle 37 in Figure JJ as presented in co-pending U.S. patent application Ser. No. 08/742,972 with Figure KK hereof corresponding to FIG. 37 of that application.

Figure 38:
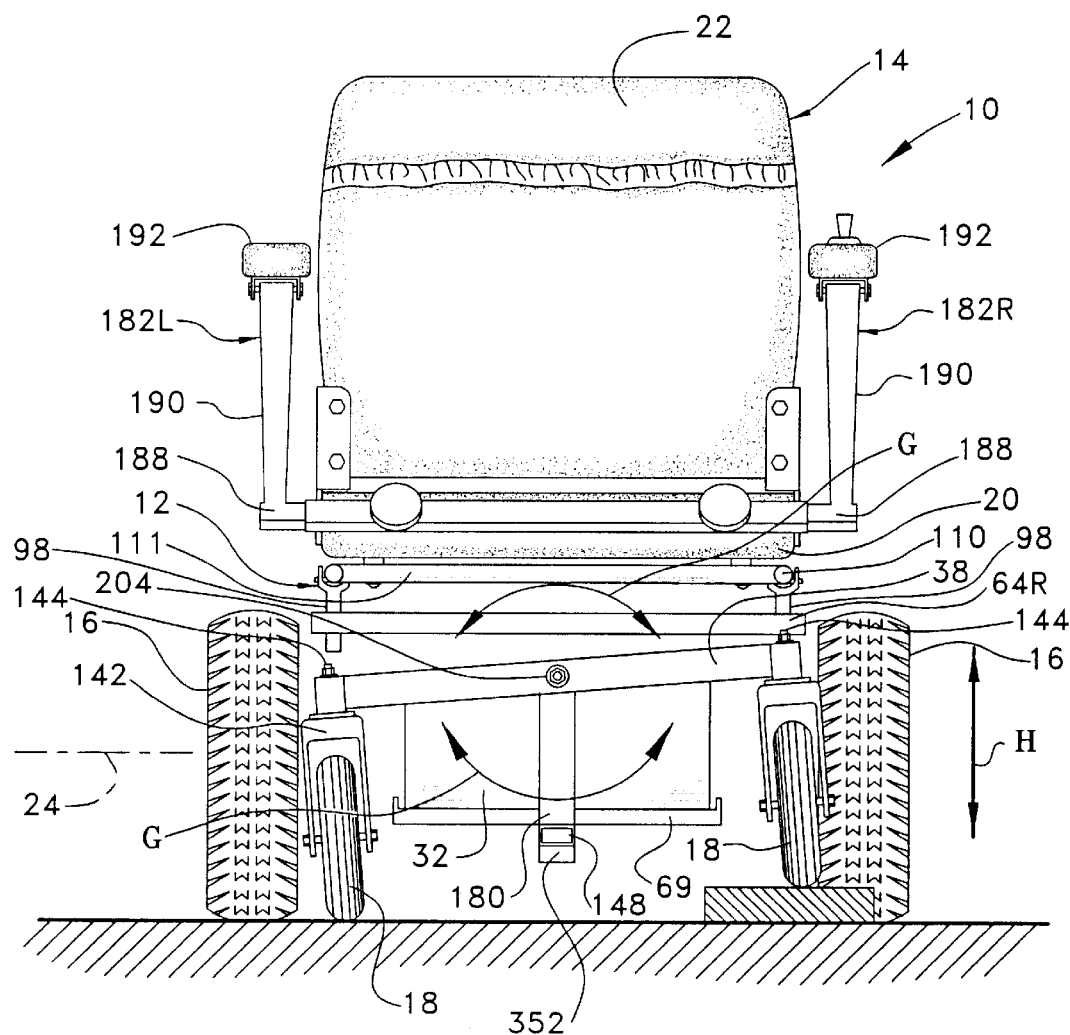
FIG. 38 is a rear view of the power chair illustrated in Figure N with the power chair body similarly removed to reveal internal structure and mechanical details as presented in co-pending U.S. patent application Ser. No. 08/742,972 with FIG. O hereof corresponding to FIG. 15 of that application.

FIG. 60 is an enlarged view of structure illustrated in Figure T taken at the position indicated by the circle in Figure T as presented in co-pending U.S. patent application Ser. No. 08/742,972 with Figure LL hereof corresponding to FIG. 38 of that application.

Figure 39:
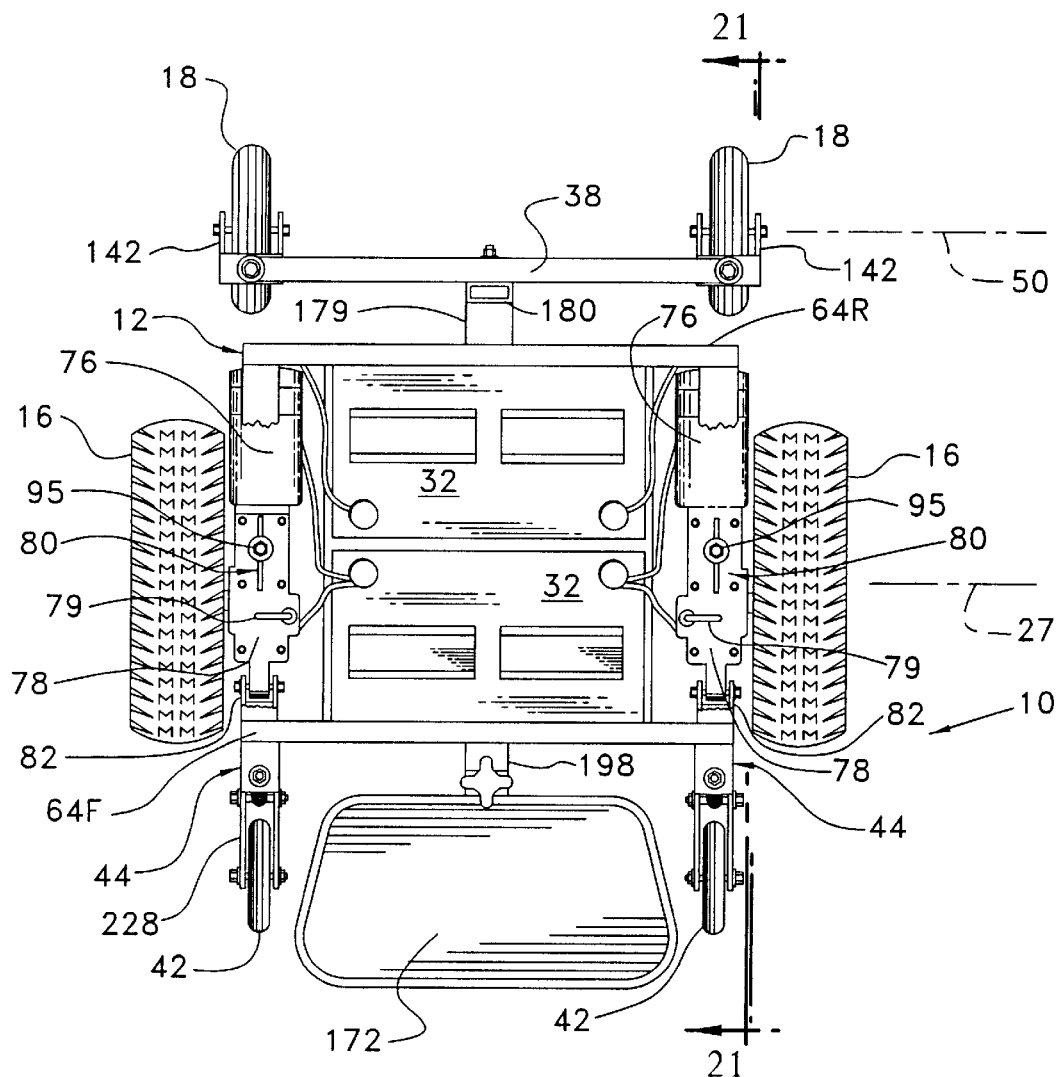
FIG. 39 is a top view of the power chair illustrated in Figures N and O but with the power chair seat and body removed to reveal internal structure and mechanical details as presented in co-pending U.S. patent application Ser. No. 08/742,972 with Figure P hereof corresponding to FIG. 16 of that application.

FIG. 61 is a broken side view of a further alternate embodiment of suspension apparatus for the power chair drive wheels and forward anti-tip wheels taken at arrows 21—21 in Figure P and with the drive wheel illustrated in phantom similarly to Figure U as presented in co-pending U.S. patent application Ser. No. 08/742,972 with Figure MM hereof corresponding to FIG. 39 of that application.

Figure 62:
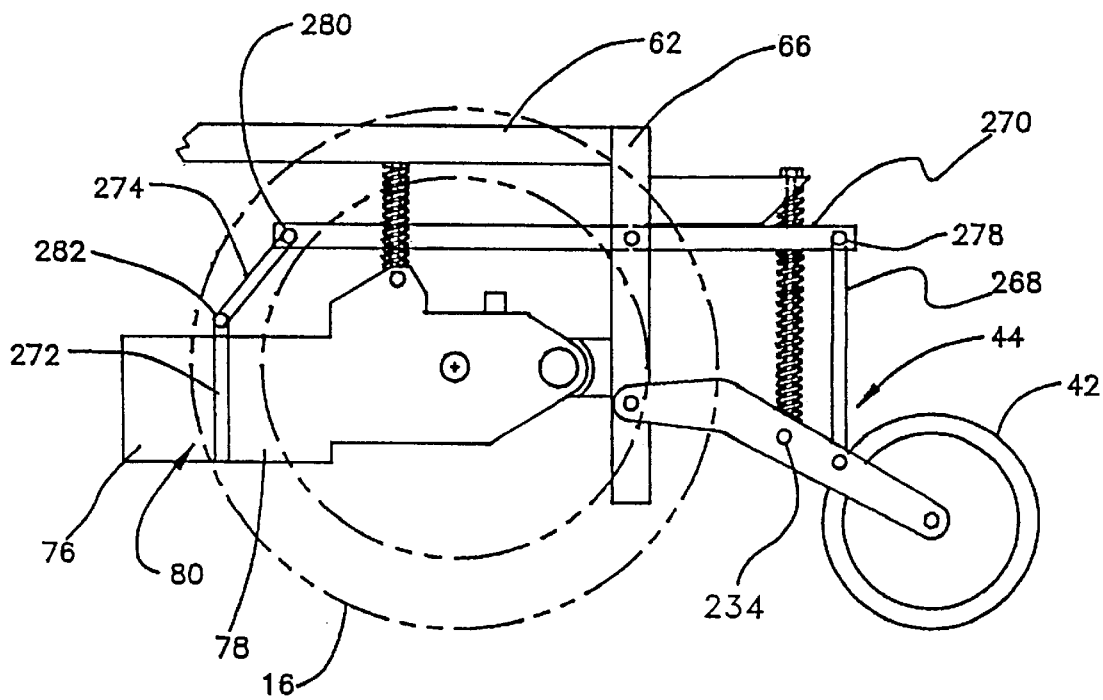

FIG. 62 is a broken schematic side view of the suspension apparatus for the curb-climbing power chair drive wheels and forward anti-tip wheels, taken at arrows 21—21 in Figure P, with the drive wheel illustrated in phantom similarly to Figure U as presented in pending U.S. patent application Ser. No. 09/060,187.

Figure 63:
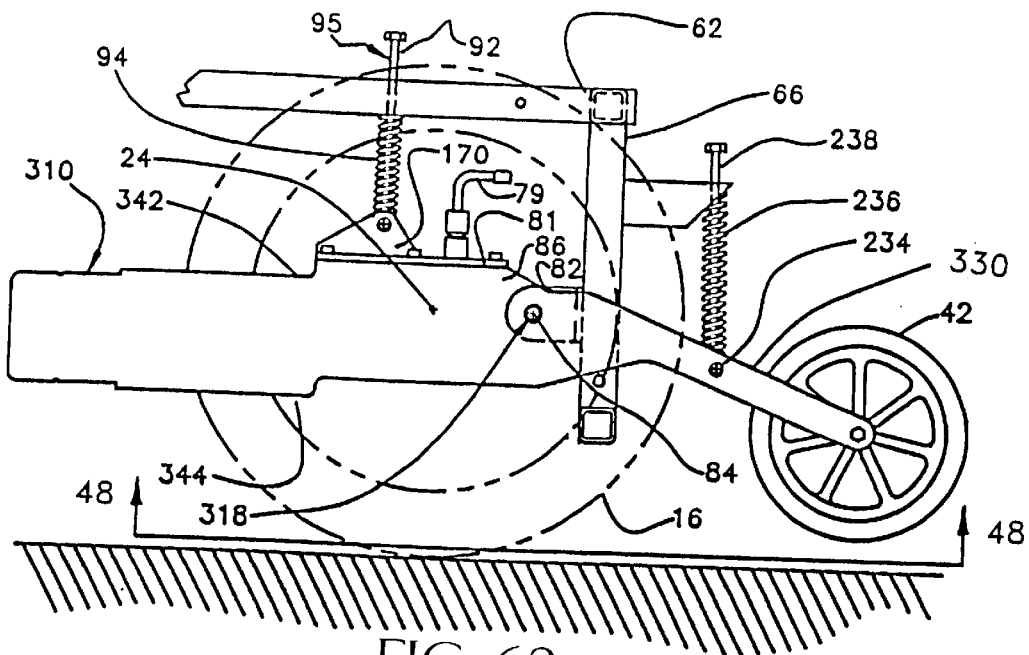

FIG. 63 is a broken side view of the suspension apparatus for the curb-climbing power chair drive wheels and forward anti-tip wheels similarly to in Figure NN with the drive wheel illustrated traversing a small bump as presented in U.S. provisional patent application Ser. No. 60\041,973.

Figure 64:
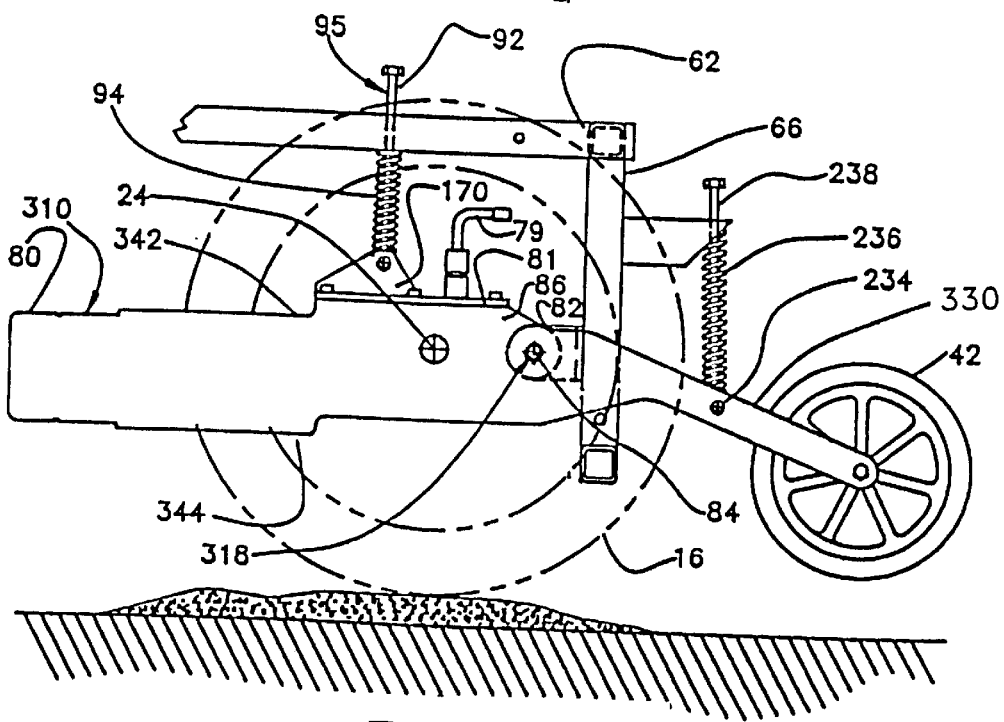

FIG. 64 is a broken side view of the suspension apparatus for the curb-climbing power chair drive wheels and forward anti-tip wheels illustrated in Figures NN and OO, taken at arrows 21—21 in Figure P and with the drive wheel illustrated in phantom similarly to Figure U, with a drive wheel further illustrated as being on a curb member elevated respecting grade and the forward anti-tip wheels contacting grade as presented in U.S. provisional patent application Ser. No. 60\041,973.

Figure 40:
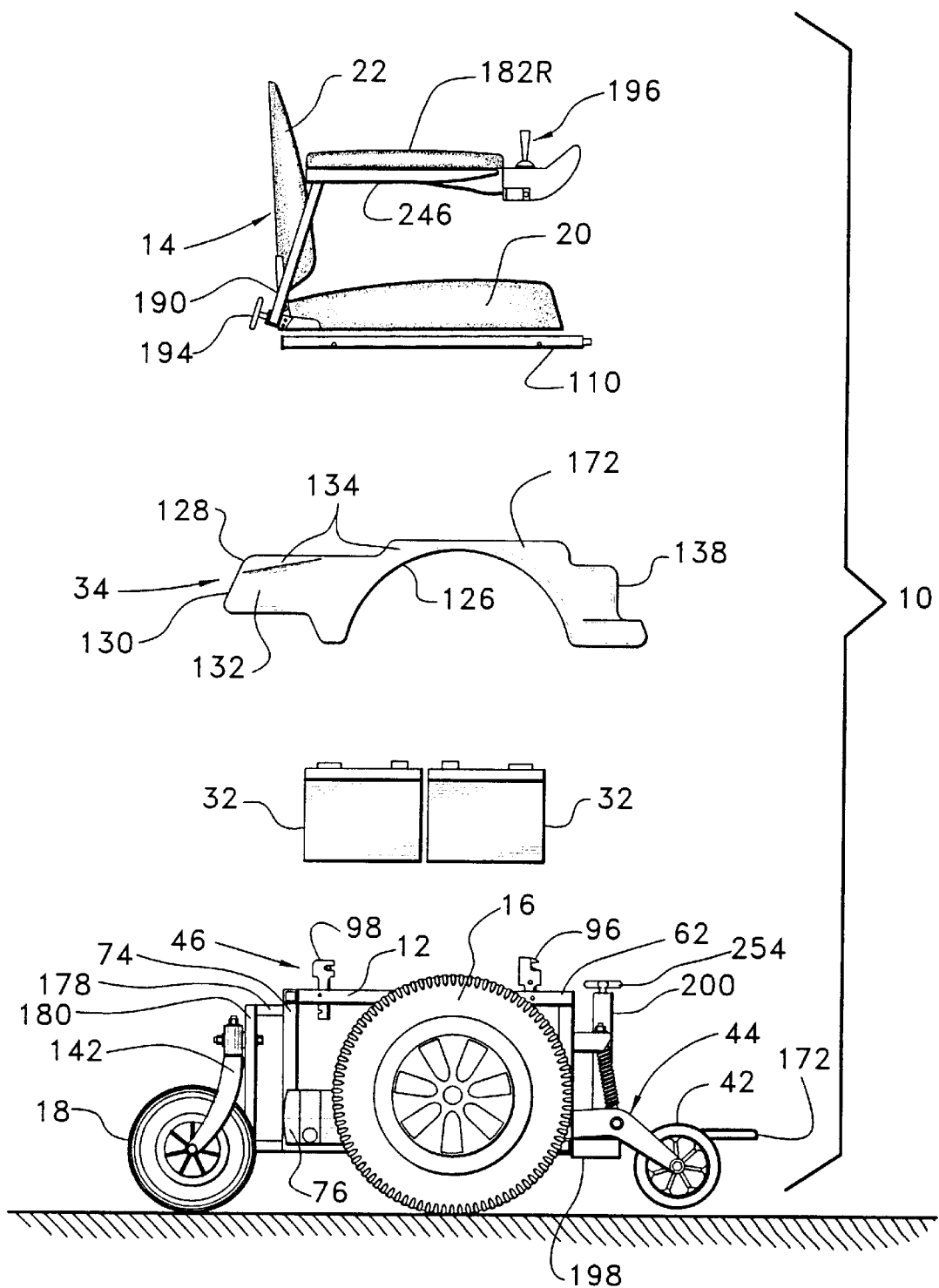
FIG. 40 is an exploded side view of the power chair illustrated in Figures N through P taken in the same direction as FIG. 14 and illustrating the manner in which the power chair batteries, body and seat are assembled with the power chair frame and running gear as presented in co-pending U.S. patent application Ser. No. 08/742,972 with Figure Q hereof corresponding to FIG. 17 of that application.
Figure 41:
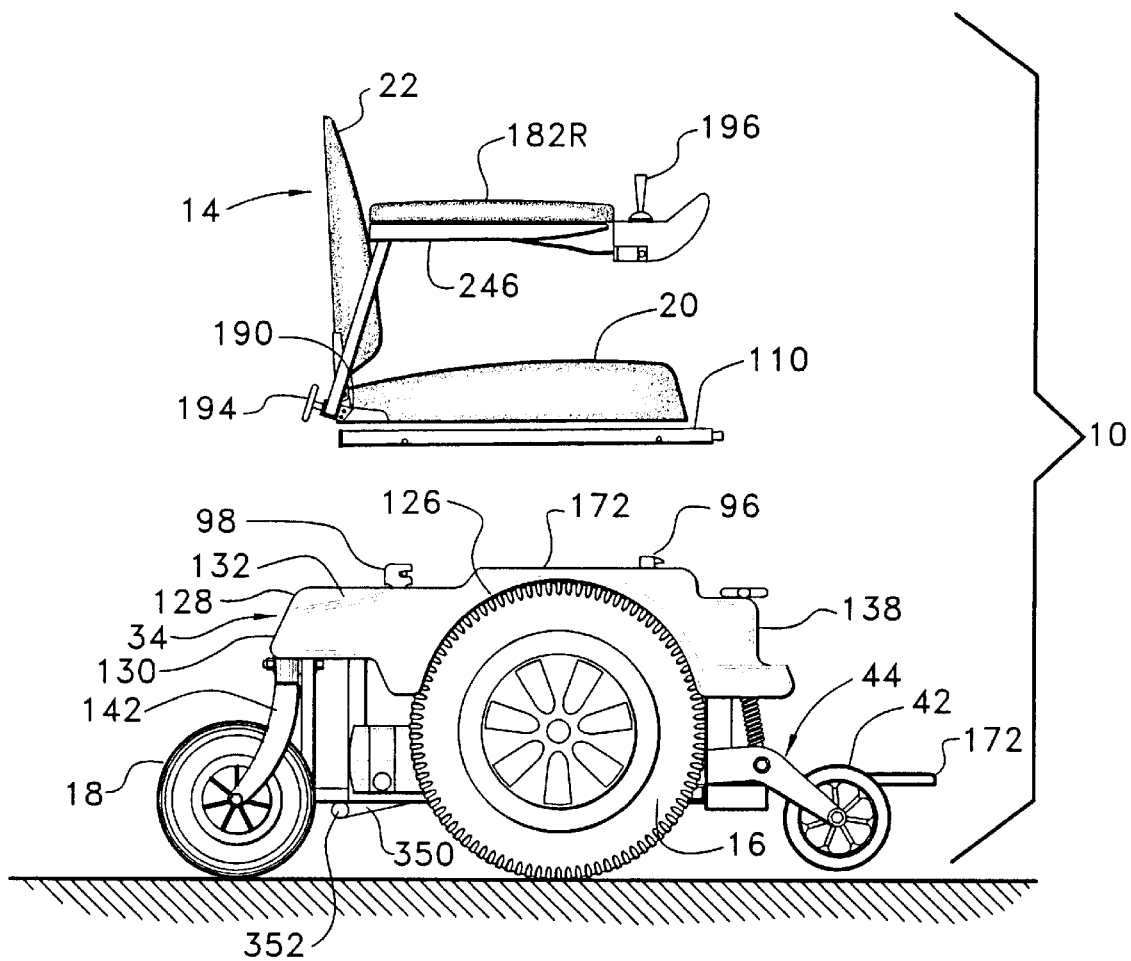
FIG. 41 is a partially exploded side view of the power chair illustrated in Figures N through Q taken looking in the same direction as FIG. 17 with the batteries and power chair body in position and supported by the power chair frame and with the power chair seat illustrated removed from the frame and above the frame/body assembly as presented in co-pending U.S. patent application Ser. No. 08/742,972 with Figure R hereof corresponding to FIG. 18 of that application.
Figure 42:
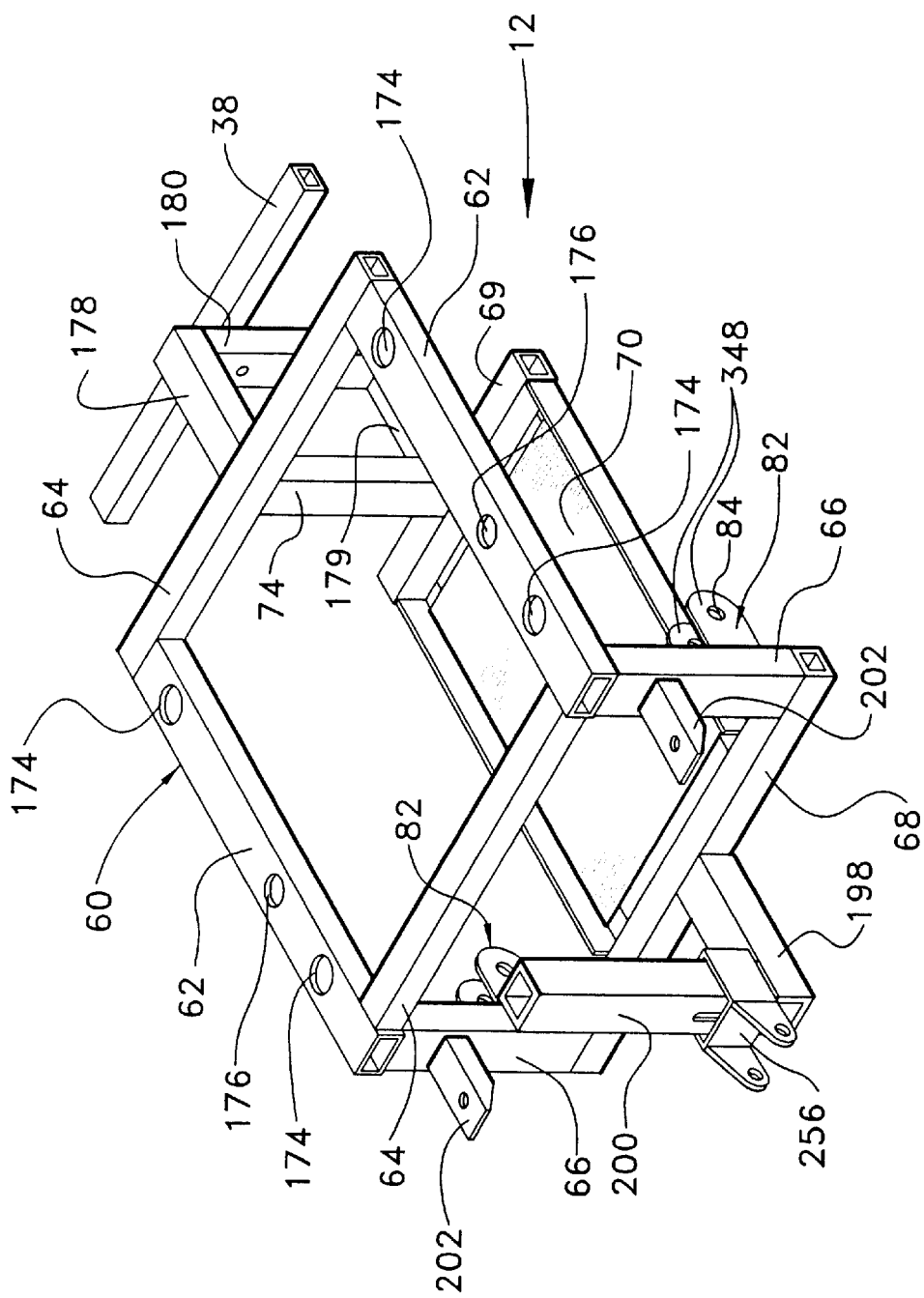
FIG. 42 is an isometric view of the frame of the power chair as presented in co-pending U.S. patent application Ser. No. 08/742,972 with Figure S hereof corresponding to FIG. 19 of that application.
Figure 43:
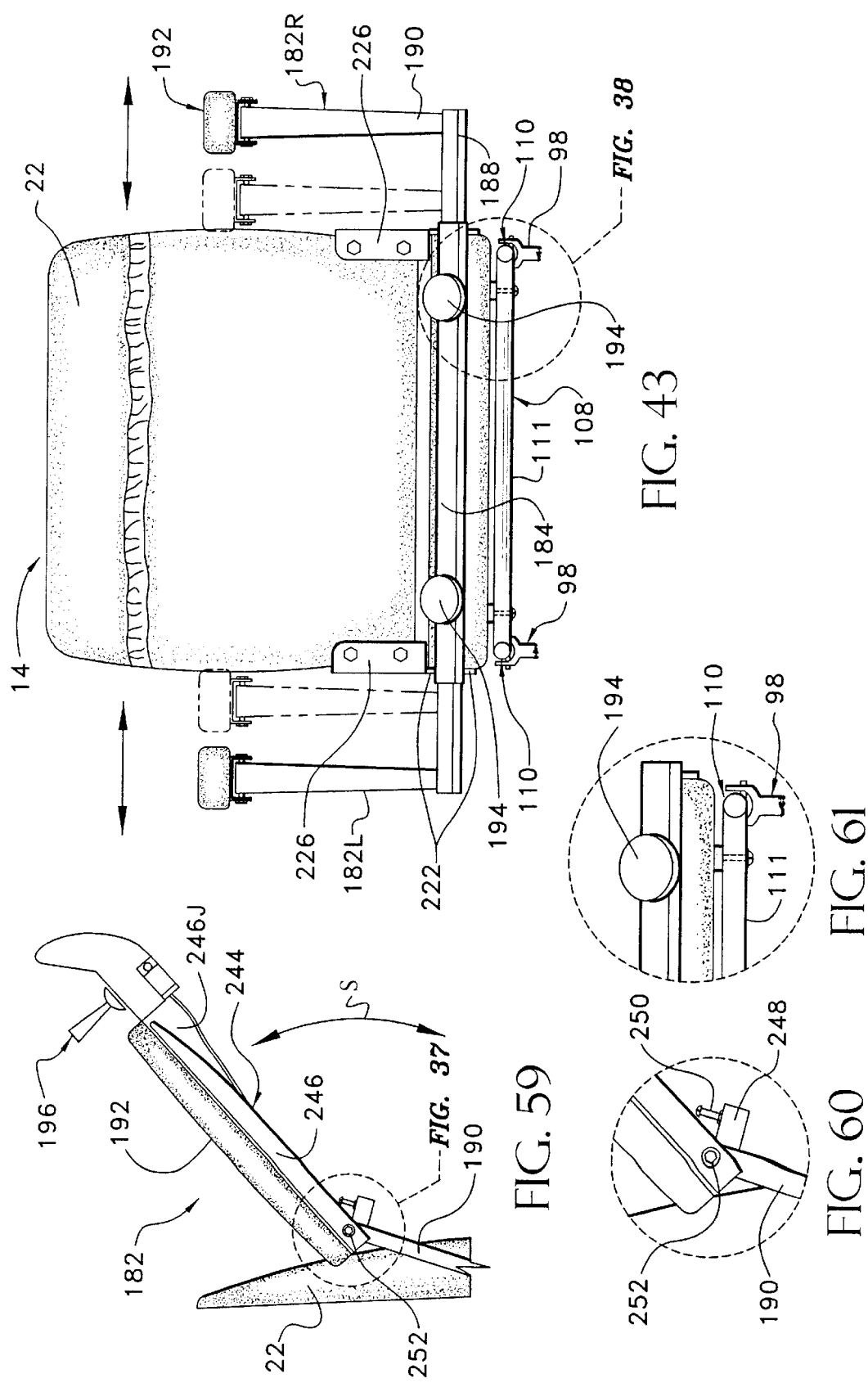
FIG. 43 is a view of the power chair seat back looking in the same direction as FIG. O, illustrating power chair seat arm width adjustment aspects of the invention as presented in co-pending U.S. patent application Ser. No. 08/742,972 with Figure T hereof corresponding to FIG. 20 of that application.
Figure 44:
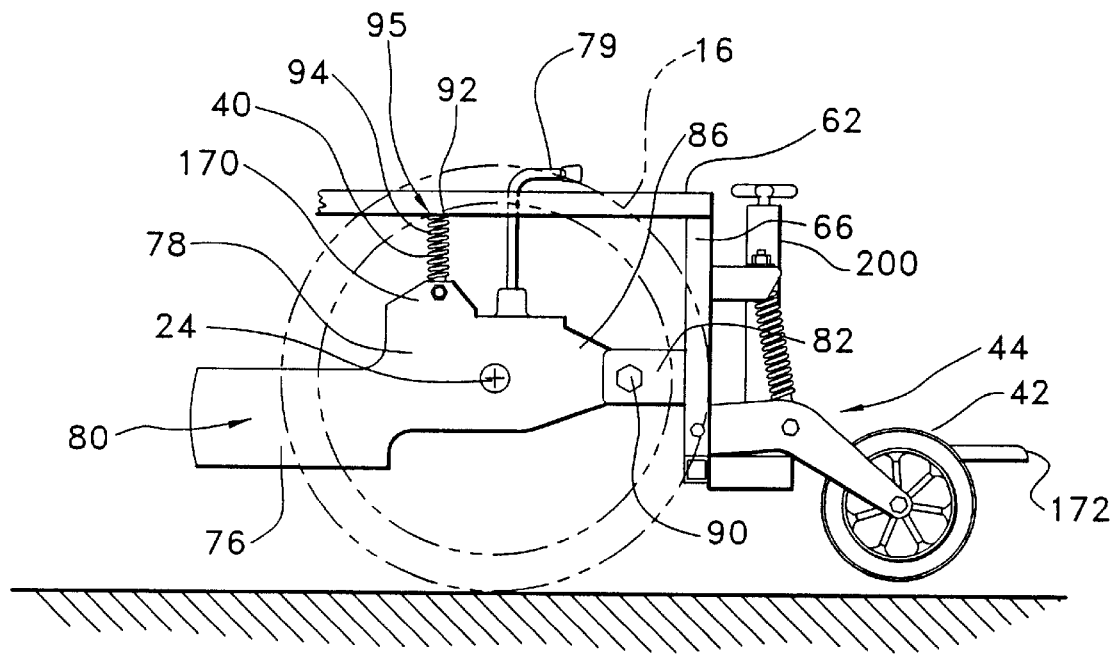
FIG. 44 is a broken side view of the power chair independent drive wheel suspension, taken at arrows 21—21 in Figure P, with the drive wheel illustrated in phantom as presented in co-pending U.S. patent application Ser. No. 08/742,972 with Figure U hereof corresponding to FIG. 21 of that application.
Figure 45:
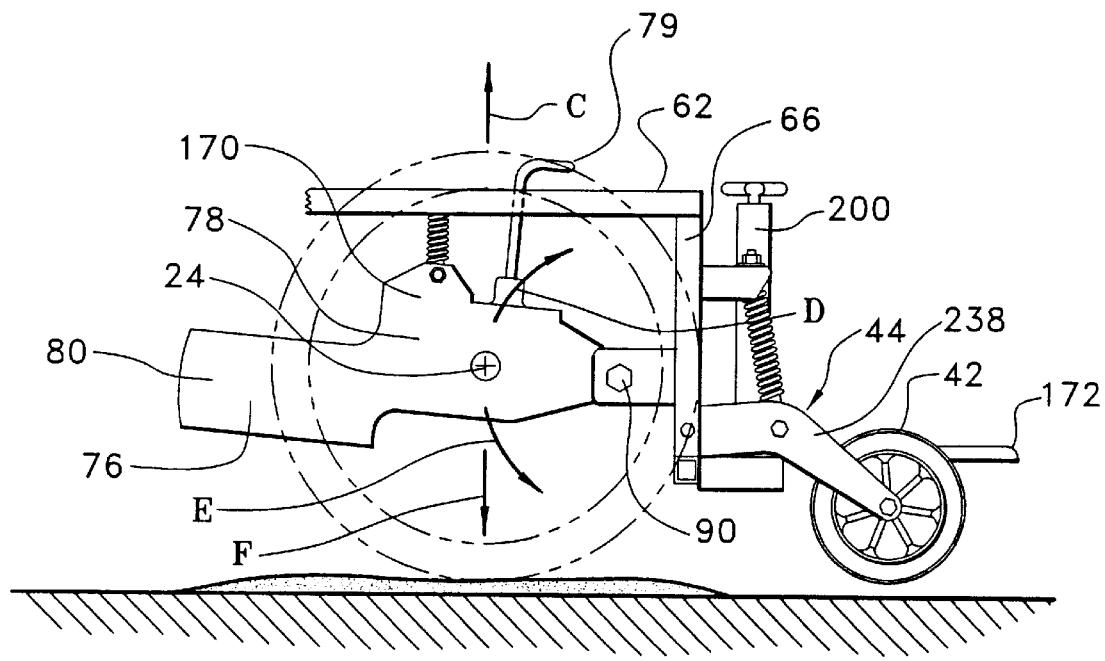
FIG. 45 is a broken side view of the embodiment of the power chair suspension illustrated in Figure U, taken at arrows 21—21 in Figure P, with the drive wheel illustrated in phantom, illustrating operation of the drive wheel suspension upon the drive wheel encountering an obstacle as presented in co-pending U.S. patent application Ser. No. 08/742,972 with Figure V hereof corresponding to FIG. 22 of that application.
Figure 46:
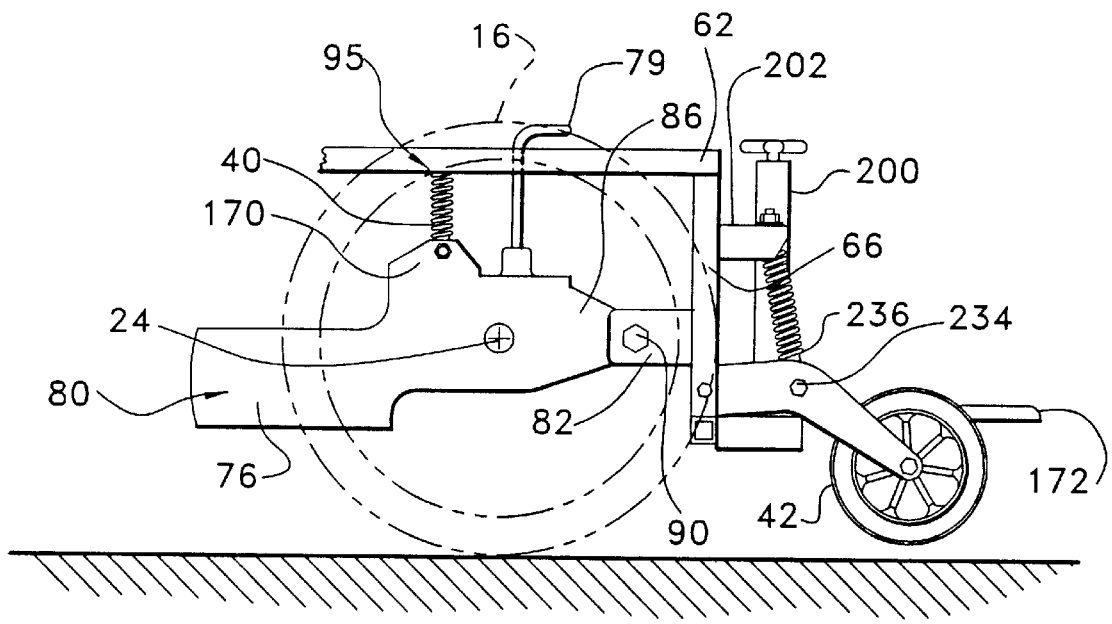
FIG. 46 is identical to Figure U and is presented for purposes of ready reference when considering Figure X as presented in co-pending U.S. patent application Ser. No. 08/742,972 with Figure W hereof corresponding to FIG. 23 of that application.
Figure 47:
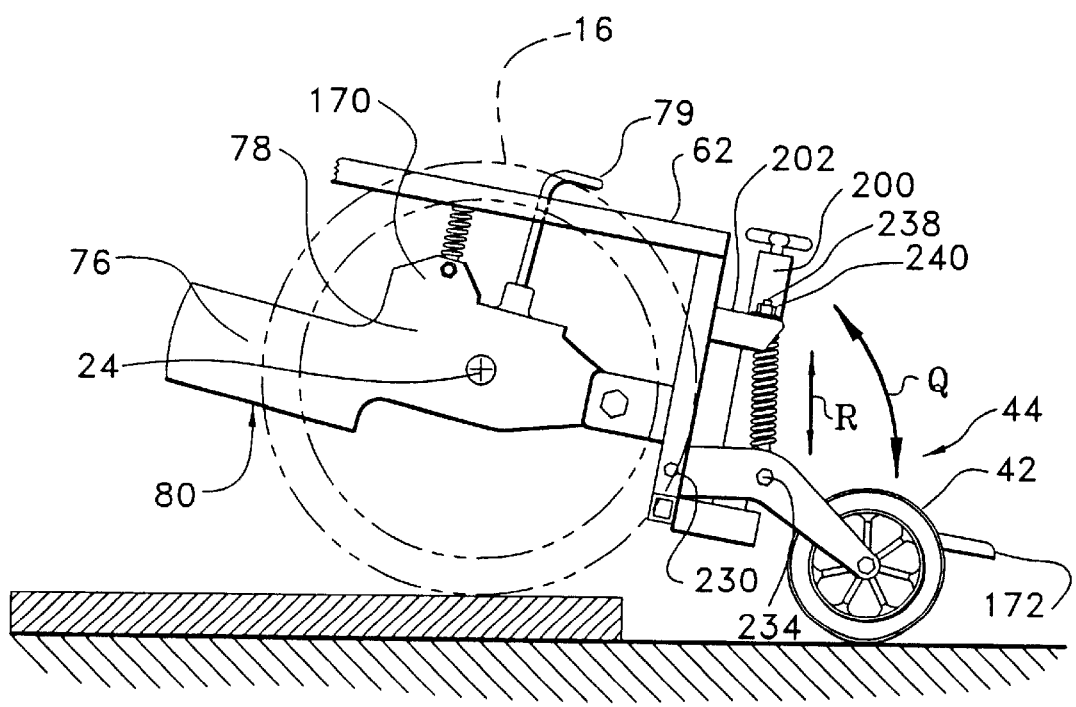
FIG. 47 is a side view of one embodiment of the drive wheel and forward anti-tip wheel independent suspension apparatus illustrated in Figures U through W, taken at arrows 24—24 in Figure P and illustrating aspects of operation of anti-tip wheel suspension apparatus as presented in co-pending U.S. patent application Ser. No. 08/742,972 with Figure X hereof corresponding to FIG. 24 of that application.
Figure 65:
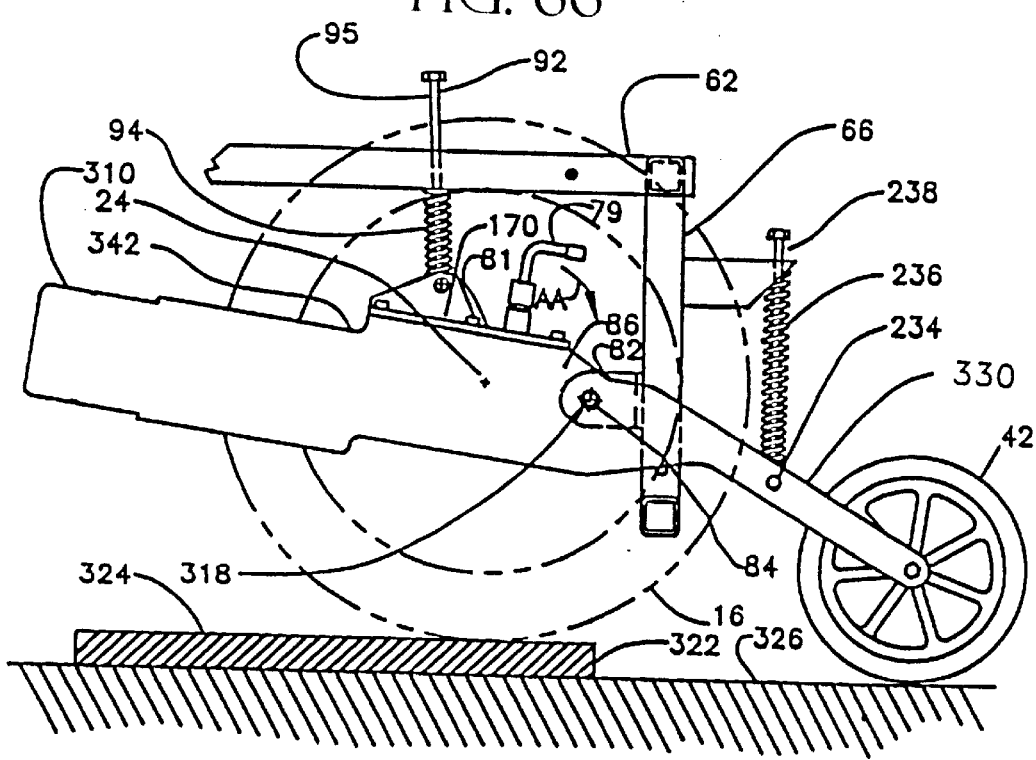

FIG. 65 is a view identical to FIG. 40 and is presented for contrast with Figure PP as presented in U.S. provisional patent application Ser. No. 60\041,973.

Figure 66:
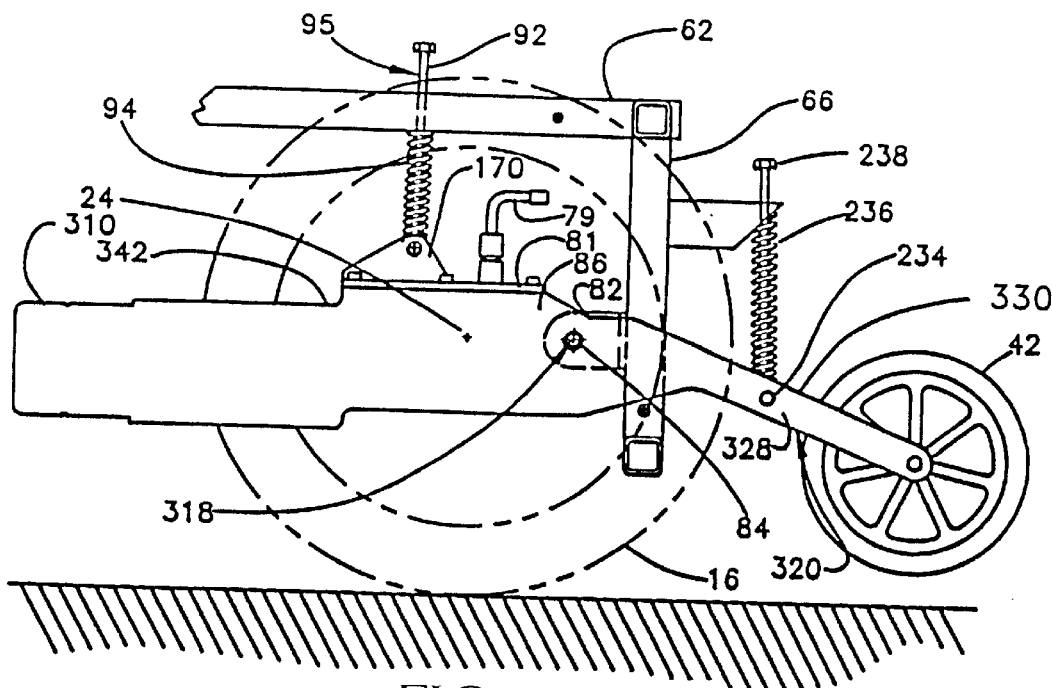

FIG. 66 is a broken side view of the suspension apparatus for a curb-climbing power chair drive wheels and forward anti-tip wheels taken at arrows 21—21 in Figure P, with the drive wheel illustrated in phantom and with the forward anti-tip wheels encountering a vertical edge of a high curb as presented in U.S. provisional patent application Ser. No. 60\041,973.

Figure 67:
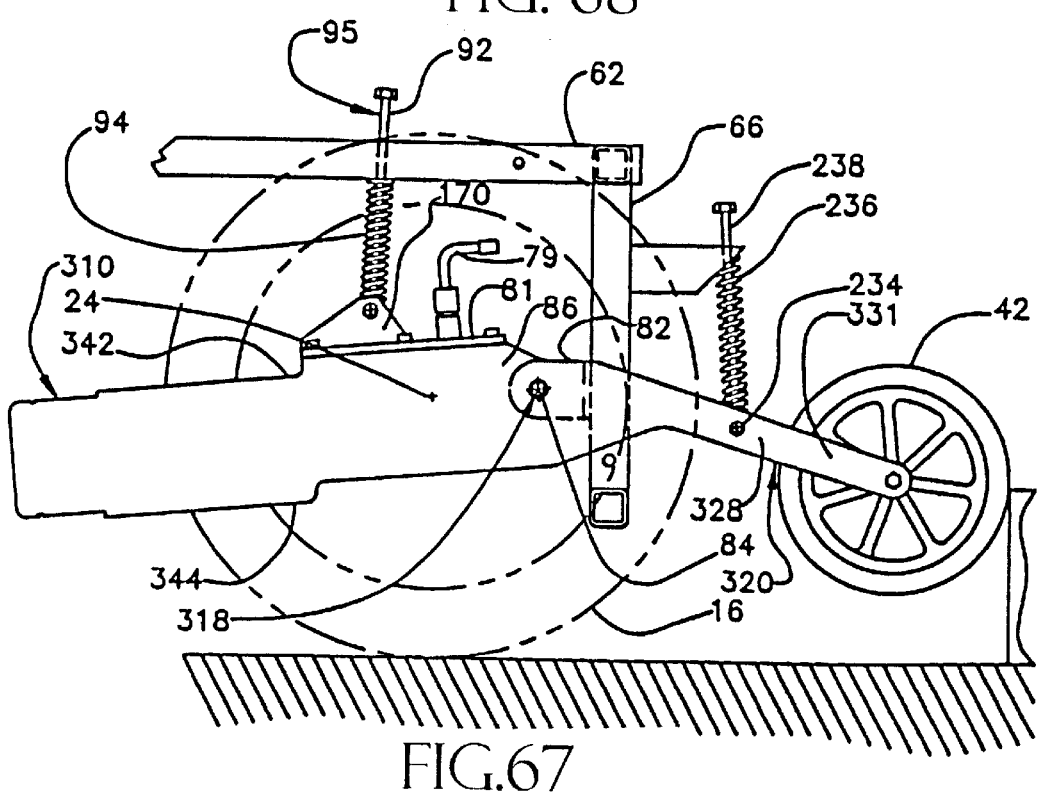

FIG. 67 is a broken side view of the suspension apparatus for the curb-climbing power chair drive wheels and forward anti-tip wheels taken at arrows 21—21 in Figure P, with the drive wheel and with the forward anti-tip wheels on the top of the high curb illustrated in Figure RR as presented in U.S. provisional patent application Ser. No. 60\041,973.

Figure 68:
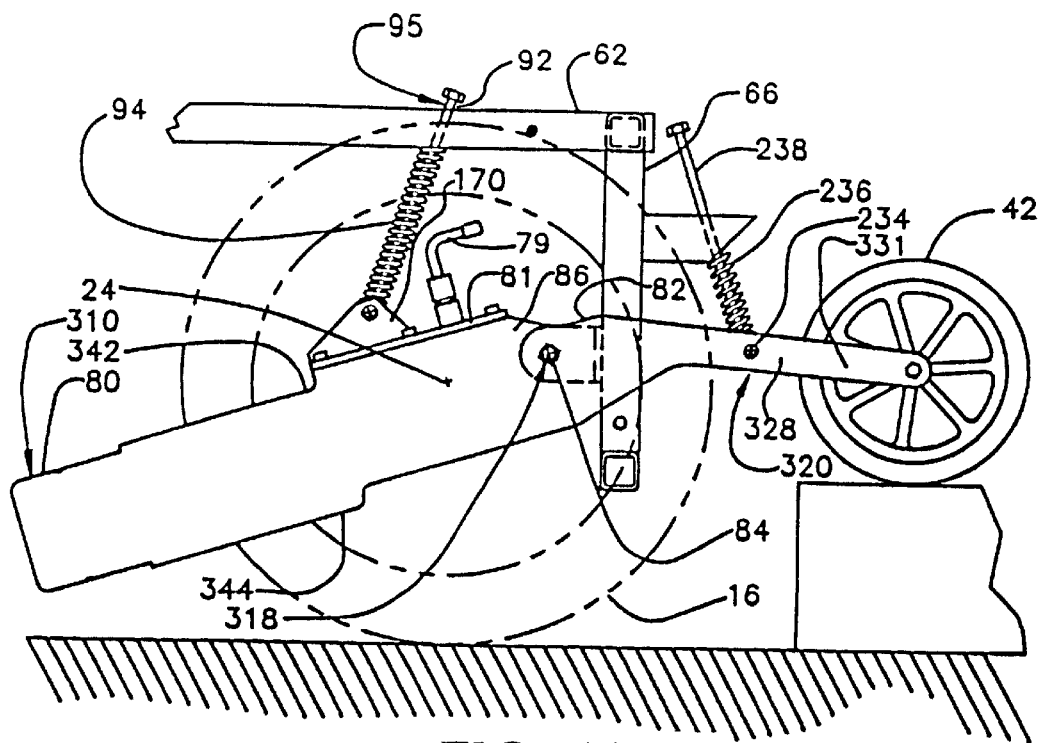

FIG. 68 is a broken side view of the suspension apparatus for a curb-climbing power chair drive wheels and forward anti-tip wheels taken at arrows 21—21 in Figure P, with the drive wheel illustrated in phantom similarly to Figures U and NN through SS and with the drive wheels and the forward anti-tip wheels on a common downgrade as presented in U.S. provisional patent application Ser. No. 60\041,973.

Figure 69:
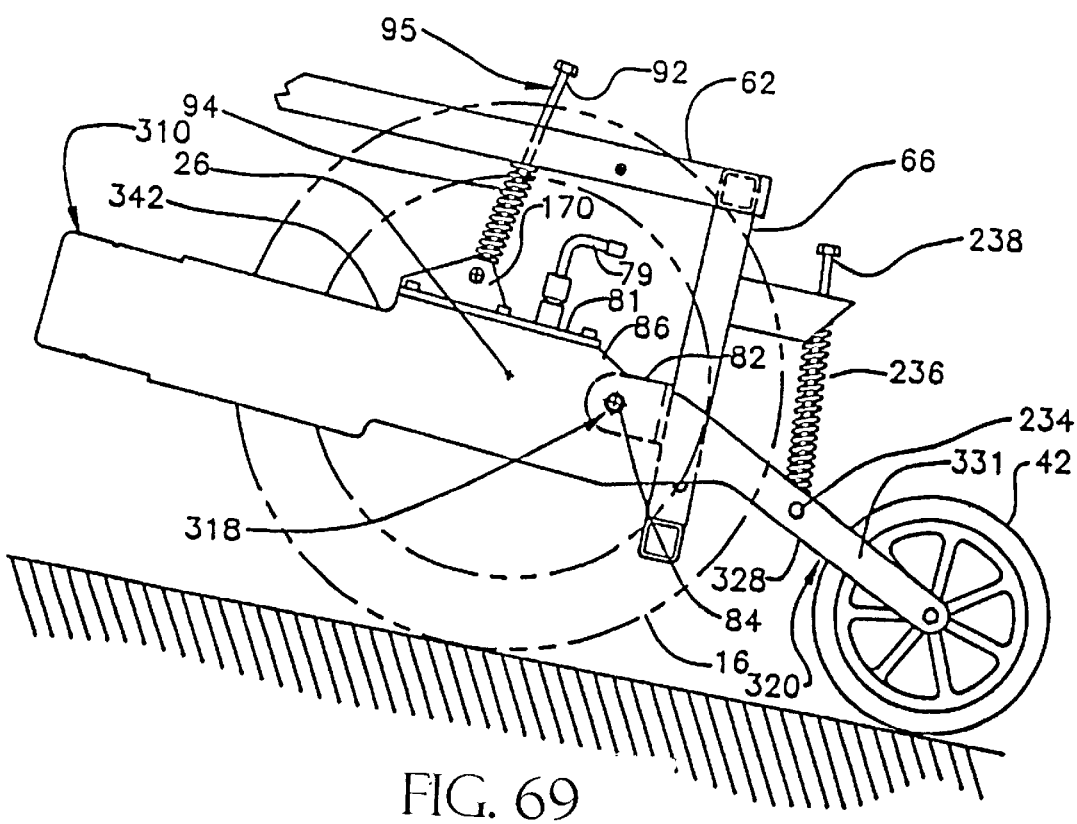

FIG. 69 is a broken side view of the suspension apparatus for the curb-climbing power chair drive wheels and forward anti-tip wheels taken at arrows 21—21 in Figure P with the drive wheel illustrated in phantom, similarly to Figures U and NN through TT showing the drive wheels descending from a curb and with the forward anti-tip wheels contacting grade as presented in U.S. provisional patent application Ser. No. 60\041,973.

Figure 70:
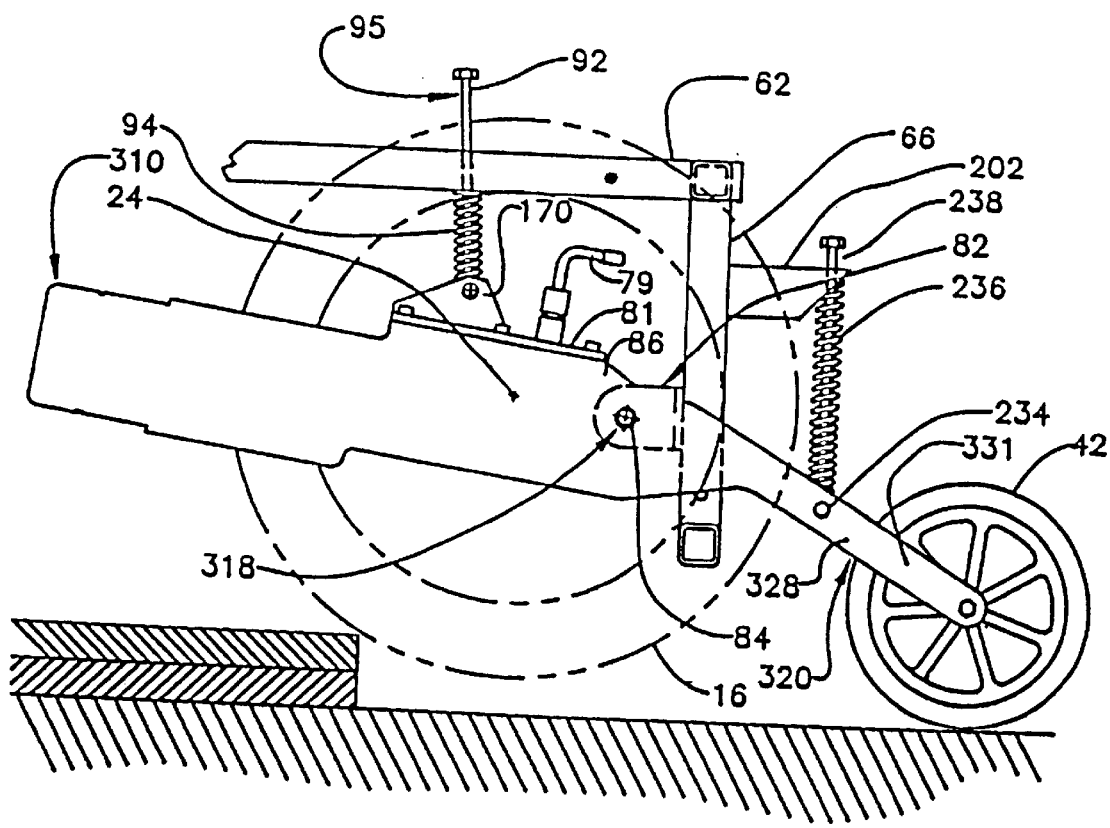

FIG. 70 is a broken plan view, taken looking upwardly at arrows 48—48 in Figure NN, of the suspension apparatus showing the fixedly connected curb-climbing power chair motor housing and spindle for the forward anti-tip wheels illustrated in Figures NN through UU as presented in U.S. provisional patent application Ser. No. 60\041,973.

Parts and part numbers which are the same or analogous in function appearing in Figures A through VV are also used in FIGS. 1 through 38.

DESCRIPTION OF THE PREFERRED EMBODIMENTS AND BEST MODE KNOWN FOR PRACTICING THE INVENTION

Figure 1:
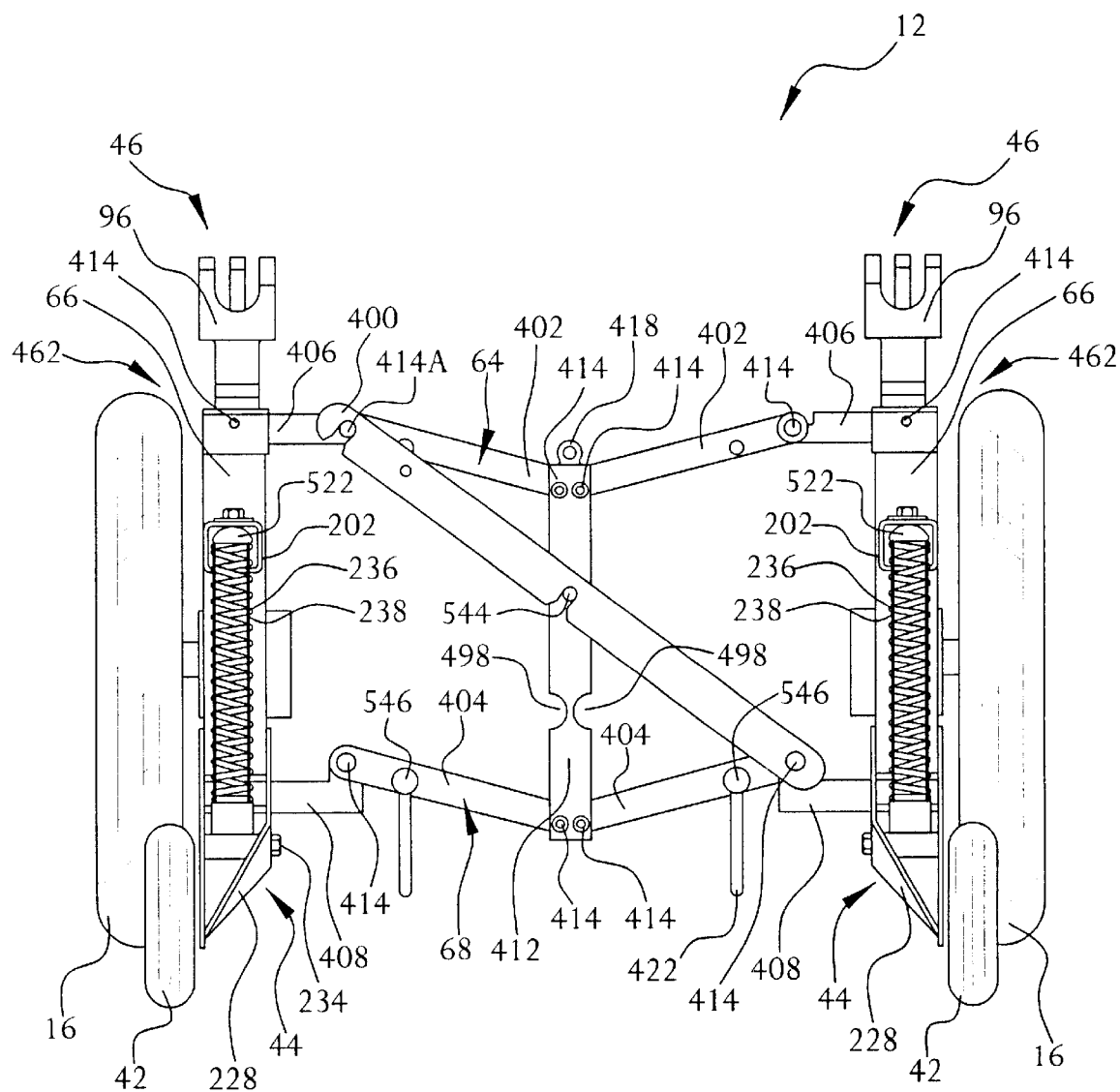
FIG. 1 is a front view of the frame portion of a foldable midwheel drive power chair showing the frame in an unfolded configuration with a locking bar in the locked position in accordance with the preferred embodiment of the invention.

Referring to the drawings in general and to FIG. 1 in particular, a power chair designated generally 10 includes a frame which has been designated generally 12. Frame 12 preferably includes a pair of longitudinally extending members 62, visible in FIGS. 4 and 14 on either side of frame 12, a pair of preferably vertically extending members 66 which extend vertically downwardly from forward ends of longitudinally extending members 62, where the side member combinations defined by longitudinally extending members 62 and vertically extending members 66 are designated 460 and 462 respectively in FIGS. 1, 4 and 14. Side member combinations 460, 462 are connected together by three transversely extending foldable members, individually generally designated 64, 68 and 69 and illustrated in FIGS. 1 and 21, which facilitate the folding of frame 12 to bring the side frame members defined by combinations 460, 462 of longitudinally extending members 62 and vertical members 66, closer together. Frame 12 is illustrated in FIG. 1 in a configuration with side member combinations 460, 462 separated one from another, as they would be configured while chair 10 is operating.

Figure 21:
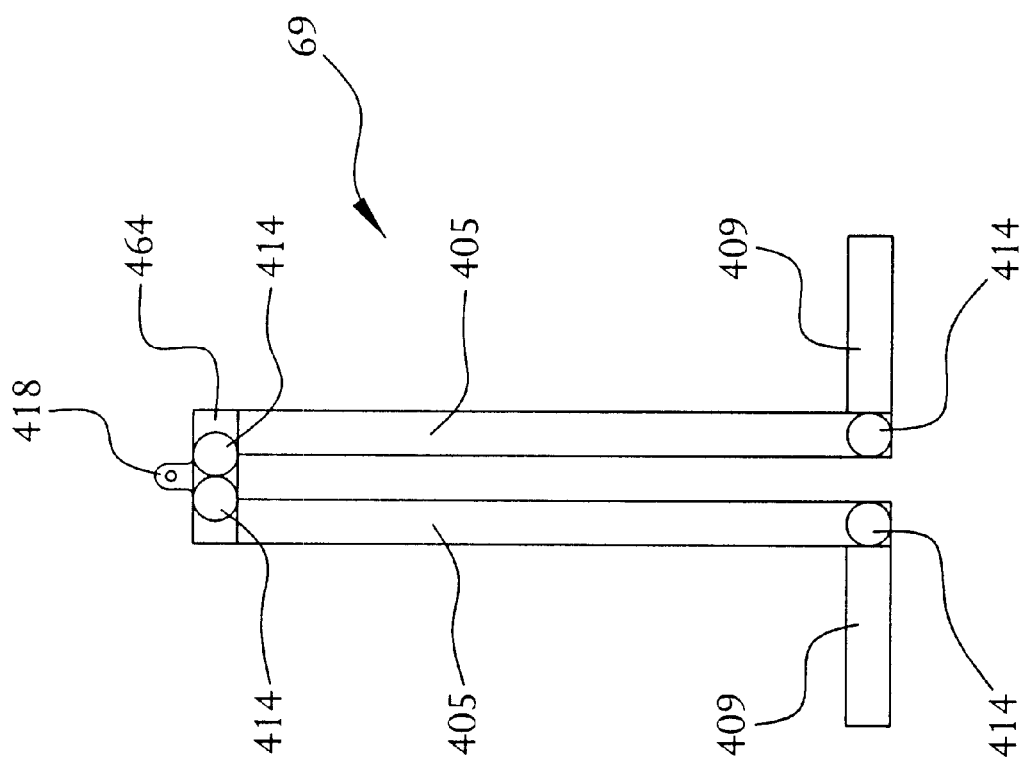
FIG. 21 is a rear elevation view of the frame portion of a midwheel drive foldable power chair illustrated in FIGS. 1 through 6, showing the frame in a folded configuration.

Side members 460, 462 defined by combinations of longitudinally extending members 62 and vertical members 66 are preferably respectively movably connected in part together by forward transversely extending foldable members 64, 68 with the upper forward transversely extending foldable member being designated 64 and the lower forward transversely extending foldable member being designated 68 in FIG. 1. A third transversely extending foldable member 69 illustrated in FIG. 21 is preferably located at the rear of frame 12 and further serves to connect the two side member combinations 460, 462 together.

Foldable power chair 10 includes a pair of drive wheels, each designated 16 in the drawings, and preferably a pair of idler wheels 18 located behind respective drive wheels 16. It is feasible, but less desirable, to provide only a single idler wheel located at the rear of the power chair. When a single rear idler wheel is provided, the single rear idler wheel is transversely centered respecting frame 12.

Foldable power chair 10 preferably includes a seat, which has not been illustrated in FIG. 1 so as to more clearly show the details of frame 12.

Foldable power chair 10 further includes a pair of anti-tip wheels 42 located at the forward end of power chair 10 and connected to frame 12 by a pair of spring-strut combinations designated generally 44 in FIG. 1.

Two pairs of upstanding seat support members are provided with each seat support member by designated generally 46. Members 46 may be provided to support a seat for carrying an occupant using foldable power chair 10. The two forward seat support members are designated generally 96 in FIGS. 1, 2 and 3 while the two rearward seat support members are designated generally 98 in FIG. 5.

Rear idler wheels 18 are preferably connected to frame 12 by a pair of U-shaped spindles 142 with spindles 142 housing bearing assemblies 144 in upper portions thereof. Spindles 142 and bearing assemblies 144 connecting rear idler wheels 18 to frame 12 are not visible in FIG. 1 but are visible in FIG. 5.

Each spring-strut combination 44 preferably further includes a generally U-shaped or wishbone configuration spindle 228 which extends forwardly from and is pivotally connected to vertical member 66 forming a part of frame 12. The pivotal connection of U-shaped spindle 228 to vertical member 66 is not visible in FIG. 1.

Spring-strut combination 44 further preferably includes a transverse shaft 234 extending between two legs of U-shaped spindle 228. A fitting resident on shaft 234 between the legs of spindle 228 receives a lower end of an upstanding strut 238. The upper end of strut 238 resides in a bushing 522 shown in FIG. 1 and illustrated in detail in FIGS. 18 through 20 retained within a forward extending pedestal 202 which is fixedly connected and extends forward from the front facing surface of vertical member 66 of frame 12.

A coil spring 236 preferably surrounds upstanding strut 238 and is compressed between the fitting residing on transverse shaft 234 and forward extending pedestal 202 upon anti-tip wheels 42 encountering an obstacle or upon power chair 10 tipping forward and anti-tip wheels 42 contacting the ground.

Each of upper and lower forward transversely extending foldable members 64, 68 include a pair of transversely extending members where the two transversely extending members of upper member 64 are denoted 402 in FIG. 1 and the two transversely extending members of lower member 68 are denoted 404 in FIG. 1.

Respecting upper forward transversely extending member 64, each of transversely extending members 402 are movable pivotally about connections with a pair of transversely extending beam members 406, which extend towards one another from respective inwardly facing surfaces of vertical members 66 proximate the upper ends of vertical members 66. Transversely extending beam members 406 are fixedly connected to facing surfaces of vertically extending members 66, preferably by welding.

A similar pair of lower forward transversely extending beam members 408 extend towards one another from inwardly facing surfaces, designated 410, of vertical members 66. The pair of upper transverse members 402 which are parts of member 64 and the pair of lower transverse members which are parts of member 68 are pivotally connected at their extremities remote from connection with respective transversely extending beam members 406, 408, to a vertically movable, vertically extending central connection beam 412. Suitable pivotal connections are provided by pin members 414 proximate transverse extremities of transverse members 402 and 404.

Figure 2:
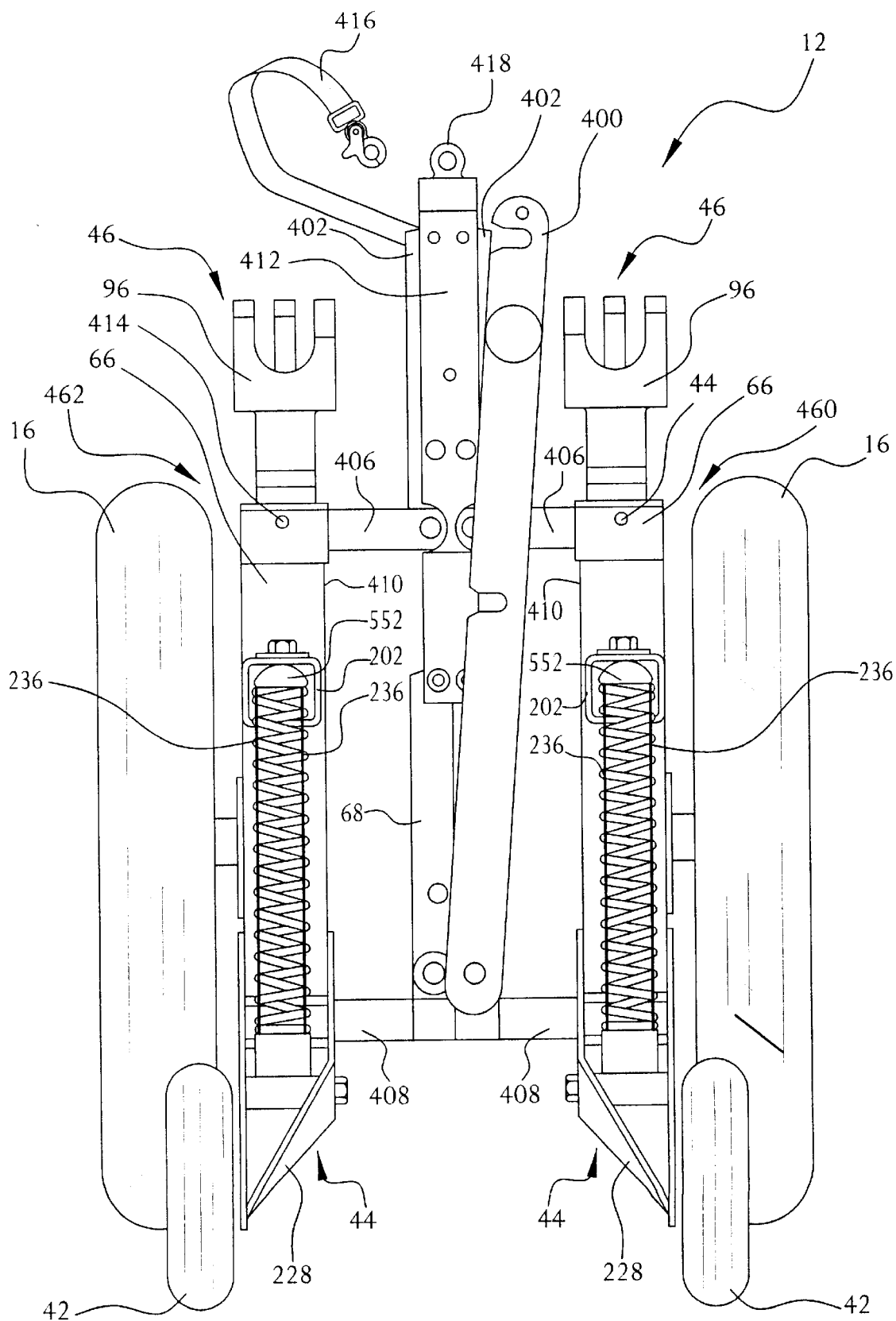
FIG. 2 is a front view of the frame portion of a power chair showing the frame in a fully folded configuration with the locking bar in the unlocked position in accordance with the preferred embodiment of the invention.

As illustrated in FIG. 2 the power chair 10 may be folded into a configuration of reduced width, for transport or storage. FIG. 2 provides a view of frame 12 together with other parts of chair 10 in the fully folded configuration looking at frame 12 from the front. FIG. 21 provides a view of frame 12 in the fully folded configuration looking at frame 12 from the rear.

The rear portion of frame 12 of power chair 10 differs from the front portion of the frame 12 in that only a single transverse folding member 464 is provided, as illustrated in FIG. 21. The rear view of frame 12 of foldable power chair 10 is analogous to the front view except there is no vertically oriented central connection beam 412 and locking bar 400.

As illustrated in FIGS. 1 and 2, in order to fold foldable power chair 10, locking bar 400 must be disengaged from frame 12. Locking bar 400 is pivotally connected to the left hand lower transverse fixed beam member 408 by a pivot pin connection 414. Locking bar 400 has downwardly facing notches, an extremity one of which engages a longitudinal extension of pivot pin connections 414A and an intermediate one of which engages a pin 544. With the slots engaging these pin extensions 414, locking bar 400 is secured in place and foldable power chair 10 is retained in the open position, for operation.

Locking bar 400 may be swung away from the position illustrated in FIG. 1 to the position illustrated in FIG. 2, to facilitate folding of frame 12. Swinging locking bar 400 away from the position of securement causes locking bar 400 to disengage from the pivot pin extension at 414 and from pivot pin 544; hence locking bar 400 is disengaged from the vertically oriented central connection beam 412 and left upper transverse fixed beam member 406. Locking bar 400 is then pivoted out of the way on the extension of pivot pin connection 414 of the right transverse member 404 as illustrated in FIG. 2.

As illustrated in FIG. 1, a strap hook 418 is mounted on the upper extremity of vertically oriented central connection beam 412 at the front of the foldable power chair. Another strap hook 418 is mounted on rear transverse member 464, at the juncture of transverse members 402, at the rear of foldable power chair 10, as illustrated in FIG. 21. A strap 416 has clamps on each end for engaging strap hooks 418 and may be secured to frame 12 of foldable power chair 10.

When strap 416 is secured to frame 12, foldable power chair 10 can easily be folded by pulling upward on strap 416. As strap 416 is lifted, vertically oriented central connection beam 412 moves upward and the pairs of transverse members 402 and 404 rotate upwardly. As frame 12 folds drive wheels 16 and idler wheels 18 move closer together, reducing width of the foldable power chair 10 for transport or storage as shown in FIG. 3.

Strap hook 418 can be used as an attachment for a leash for pulling foldable power chair 10 after it has been folded. Strap 416 is disconnected from strap hook 418 attached to transverse members 402 on the back of foldable power chair 10. Strap 416 is left connected to strap hook 418 affixed to vertically oriented central connection beam 412 on the front of the foldable power chair. As strap 416 is pulled, foldable power chair 10 follows.

Figure 3:
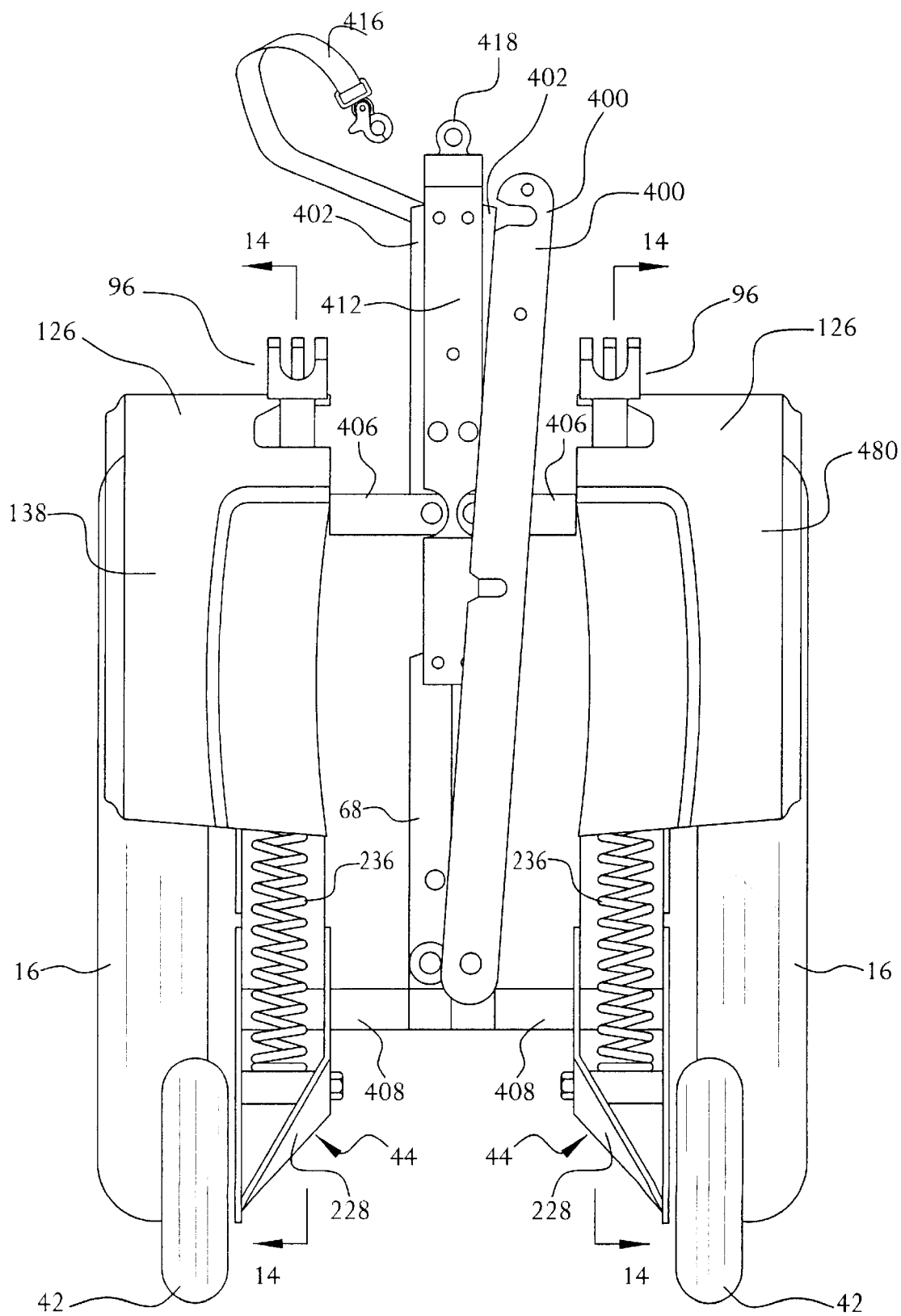
FIG. 3 is a front view of the frame of a power chair illustrated in FIGS. 1 through 2, with the frame in the fully folded configuration and with two fenders in place on the folded frame in accordance with the preferred embodiment of the invention.

As illustrated in FIG. 3, a pair of fenders 126 are provided and preferably wrap substantially around upper semi-circular portions of respective drive wheels 16. Fenders 126 preferably extend outwardly preferably over at least major portions of the width of associated drive wheels 16, to fit closely about the drive wheel portions which are enveloped by respective fenders 126. Fenders 126 hide much of frame 12 from view and provide an aesthetically pleasing appearance.

Figure 15:
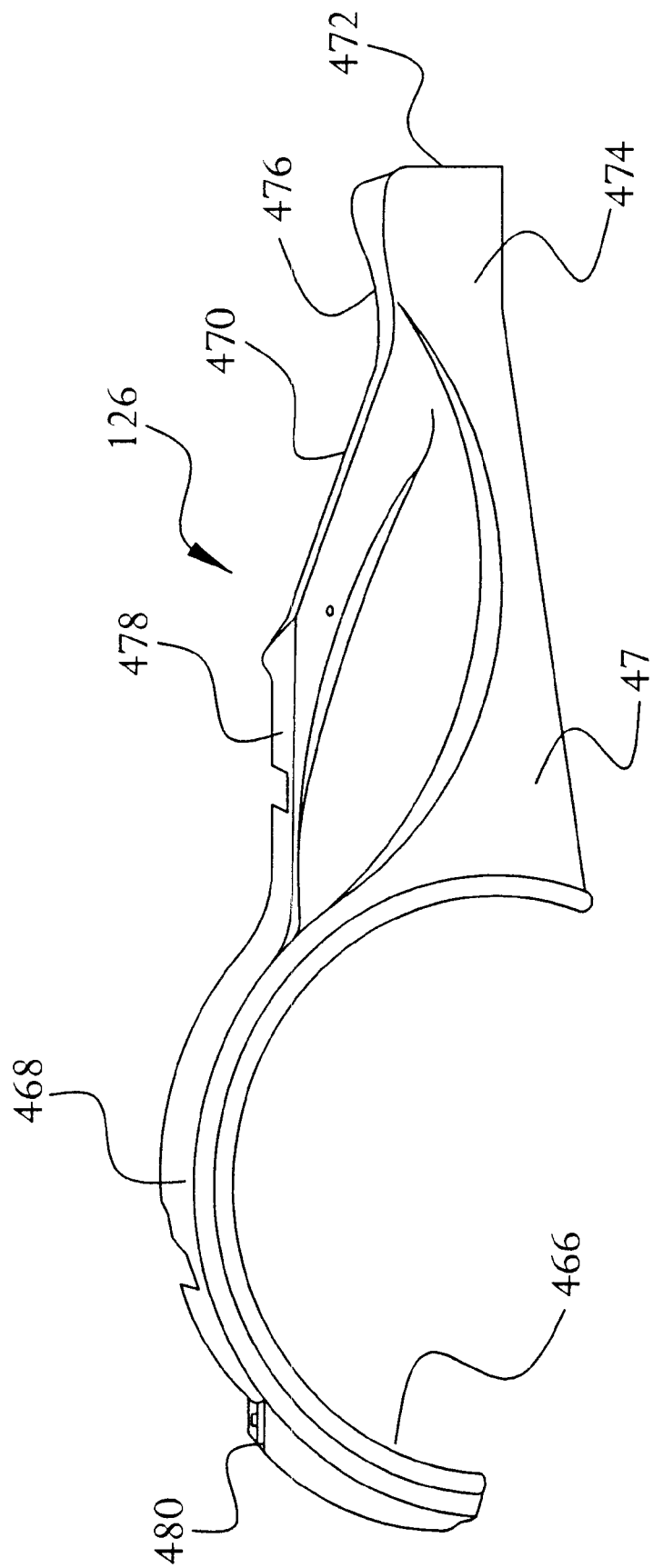
FIG. 15 is a side view of a fender for one side of the frame usable with the midwheel drive foldable power chair illustrated in FIGS. 1 through 6.

As best illustrated in FIG. 15 and as also apparent from FIG. 3, each fender 126 includes a semi-circular inner edge 466 which fits closely about a drive wheel 16 when fender 126 is in place on frame 12. Fender 126 includes an arcuate transversely elongated upwardly facing portion 468, a sloped rearwardly facing planar portion 470, which is also transversely elongated and a planar outwardly facing side portion 472 which is essentially vertical when fender 126 is secured in position on frame 12 and essentially joins rearwardly facing planar portion 470 as these two surfaces approach the rearward extremity of fender 126. A cap portion 474 of fender 126 covers spindle 142 which carries idler wheel 18; cap portion 474 presents a generally cylindrical outward appearance while the inside portion of cap portion 474 is cut away to facilitate cap portion 474 fitting over spindle 142.

As shown in FIG. 15, fender 126 further includes a transition portion 476 which connects cap portion 474 and planar portions 470 and 472 and still further includes a planar upwardly facing portion 478. Fender 126 is preferably secured to an associated side member 460 or 462 by securement of planar portions 470 and 478 to corresponding parts of side member 460 or 462.

As shown in FIG. 15, fender 126 further yet preferably includes a forwardly facing integrally formed bumper member 480 which overlies and protects the spring-strut combination designated generally 44 governing upward movement of forward anti-tip wheels 42 relative to frame 12. Bumper member 480 is sufficiently elongated in the transverse or widthwise direction respecting fender 126 to cover the associated spring-strut combination 44.

Still referring to FIG. 15, annular upwardly facing portion 468 is preferably transversely elongated sufficiently to cover the width of an associated drive wheel 16 and the portion of frame side member 460 or 462 adjacent to and immediately inboard of the associated drive wheel 16. Similarly, the planar portions 470 and 478 are sufficiently elongated in the transverse or widthwise direction respecting fender 126 to cover the associated portion of side member 460 or 462 in which fender 126 is mounted.

Figure 4:
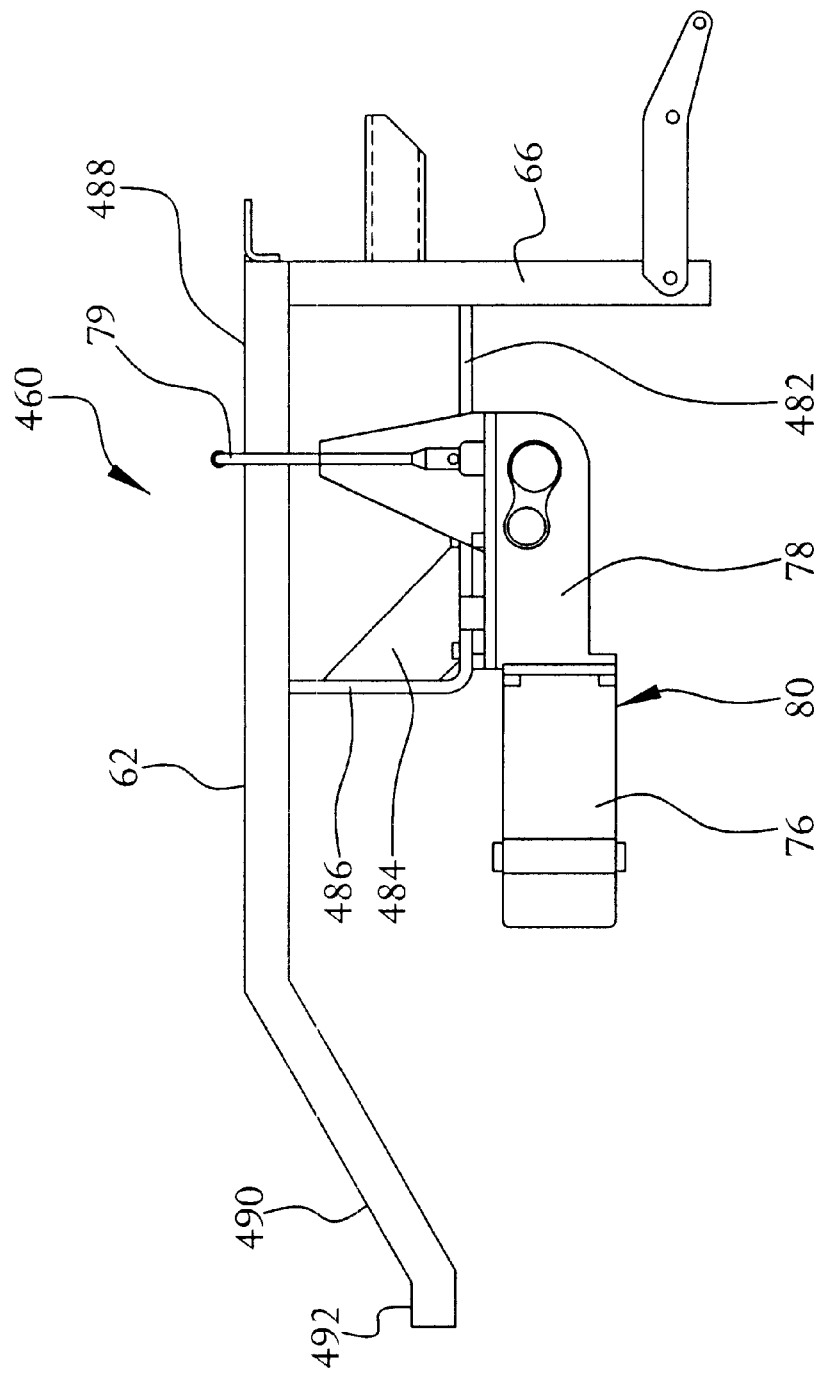
FIG. 4 is a side view looking outwardly from the interior of the frame at the position indicated generally by arrows 4—4 in FIG. 3 of the power chair as illustrated generally in FIGS. 1 through 3, showing a motor, transmission and frame side member in detail in accordance with the preferred embodiment of the invention.
Figure 14:
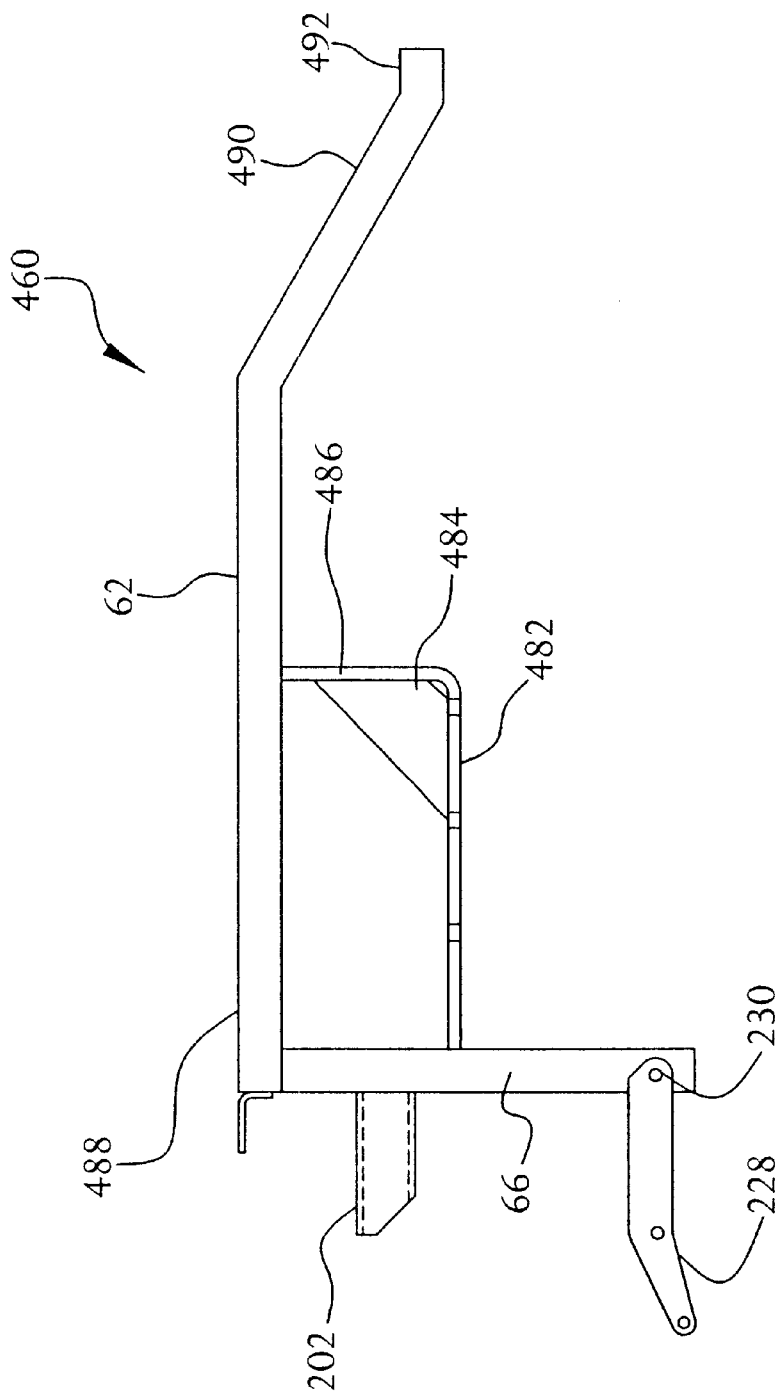
FIG. 14 is a side view looking outwardly from the interior of the frame for the power chair at the position indicated generally by arrows 14—14 in FIG. 3 showing the pivotal connections of U-shaped spindles to vertical members for a midwheel drive foldable power chair having a frame as illustrated in FIGS. 1 through 6, in accordance with the preferred embodiment of the invention.

Referring to FIGS. 4 and 14, each combination side member 460, 462 includes not only a longitudinally extending member 62 and a vertical member 66 but also a longitudinally extending motor support member 482 which is secured to vertical member 66 proximate the vertical midpoint thereof and extends rearwardly from vertical member 66 preferably parallel with longitudinally extending member 62. Motor support member 482 is connected to longitudinal extending member 62 by a preferably triangular web 484 and by a preferably vertical bracing member 486 as illustrated in FIGS. 4 and 14. Connections among motor support member 482, triangular web 484, bracing member 486, vertical member 60 and longitudinal member 62 are preferably by welding since all of the structures are preferably steel. This construction provides high strength/high rigidity combination side members 460, 462.

As illustrated in FIG. 3, fenders 126 preferably rest directly on frame 12, are preferably a single molded piece of high impact plastic and are exceedingly light. Fenders 126 stay in place when frame 12 is folded and are preferably secured in place by push pins or bolts, which have not been illustrated in the drawings to enhance drawing clarity. Fenders 126 are preferably permanently connected to frame 12.

Figure 5:
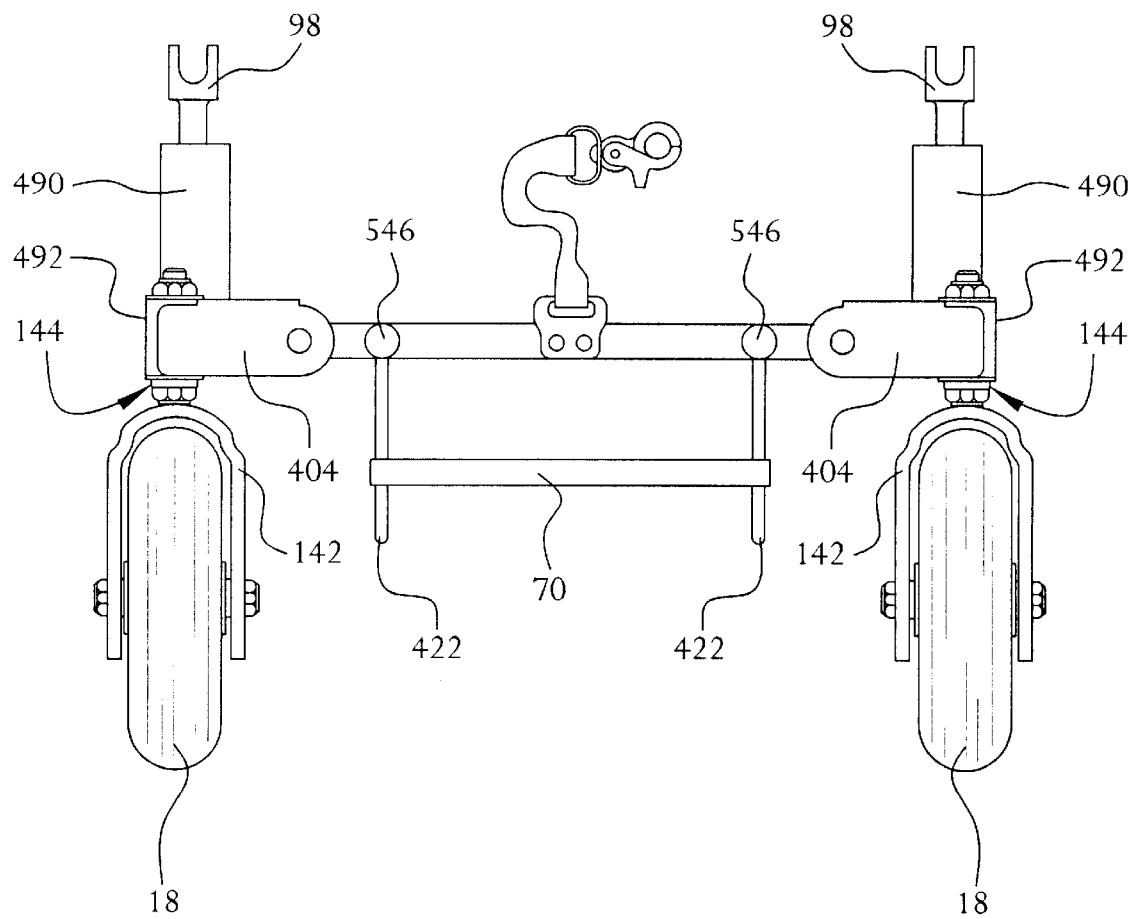
FIG. 5 is a rear view of a frame of a power chair as illustrated generally in FIGS. 1 through 4 in accordance with the preferred embodiment of the invention.

Referring to FIGS. 4 and 14, longitudinal member 62 includes a longitudinally extending major portion 488 and a downwardly sloped extension portion 490 having a receptacle member 492 at the end thereof which is adapted to receive a bearing assembly 144 which in turn receives a U-shaped spindle 142 in which an idler wheel 18 is mounted, as shown in FIG. 5.

Referring to FIG. 4, power chair 10 includes two motors, only one of which is illustrated in FIG. 4 for independently driving respective drive wheels 16. These motors are each designated generally 76 and are each preferably within a rigid casing which houses, in addition to motor 76, a transmission 78 for transferring driving rotation from an output shaft of a motor 76 to an associated drive wheel 16.

There is no common single axle for drive wheels 16 in the preferred embodiment of the invention.

Motor 76 and transmission 78 are available from Rockwell Automation in Eden Prairie, Minn. Transmission 78 is preferably a right angle worm drive serving to change the axis about which the driving rotation is provided by motor 76. Specifically, motor 76 is positioned so that the motor output shaft extends substantially longitudinally. Associated transmission 78 through the right angle worm drive provides the driving rotation output via an axle, not numbered in the drawings, connecting to an associated drive wheel 16.

A shift lever 79 extending out of transmission 78 may be rotated to disengage transmission 78 thereby providing free wheel operation of drive wheels 16. By twisting shift lever 79, the power chair operator can switch from driven to freewheeling operation of drive wheels 16.

Motor 76 and transmission 78 are rigidly connected by motor/transmission housing 80. Motor and transmission housing 80 is preferably glass filled nylon, which is extremely strong and provides quite operation.

Figure 6:
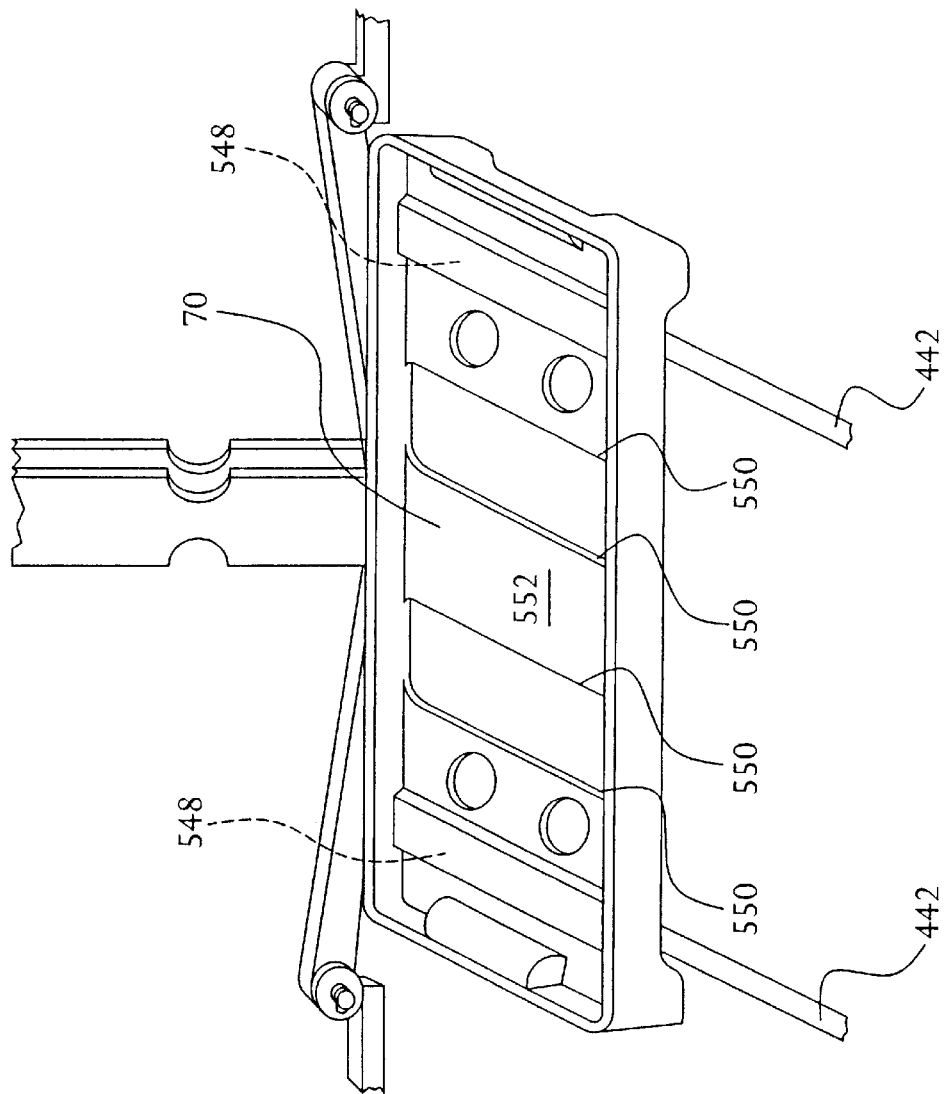
FIG. 6 is a broken isometric view taken from the rear of a battery tray in place within a central portion of the frame of a power chair embodying aspects of the invention as illustrated generally in FIGS. 1 through 5 in accordance with the preferred embodiment of the invention.

As illustrated in FIG. 6, a removable tray 70 is provided for carrying electrochemical means, namely one or more batteries, for powering the motors rotating drive wheels 16. Longitudinal rods 422 running along the bottom of frame 12 support the tray 70 as seen in FIGS. 5 and 6. Rods 422 extend rearwardly from respective ones of members 404 constituting lower forward transversely extending foldable member 68 to rear transverse member 464, as illustrated in FIGS. 1 and 5. Rods 422 are connected to members 404 and 464 by pivotal connections 546 allowing relative rotation between rods 422 and members 404 and 464, facilitating folding of frame 12. The tray 70 has slots or recesses 548 formed on the bottom for receiving longitudinal rods 422. Weight of a battery bearing downwardly on tray 70 effectively secures tray 70 to rods 422 and hence to frame 12. Tray 70 is preferably an injection molded or thermoformed plastic body of unitary construction.

Tray 70 preferably has a series of progressively larger recesses or ridges 550 formed in the upwardly facing surface 552, to accommodate different sizes and models of batteries from various manufacturers. In the lower surface, channels or recesses 548 receive longitudinal rods 422 running from front to back of frame 12 when tray 70 is laid on longitudinal rods 422. Longitudinal rods 422 are pivotally connected to the pair of transverse members 404 and pivot when foldable power chair 10 is folded. When frame 12 is unfolded, tray 70 is placed down on longitudinal rods 422 and the longitudinal rods 422 are received in recesses 548 formed on the bottom of tray 70. Weight of a battery riding on tray 70 is in turn transferred to longitudinal rods 422 and contributes to stability of frame 12 when unfolded and in operating configuration. This construction facilitates rapid and facile disassembly and reassembly of foldable power chair 10 when it is desired to fold the power chair for transport and then to unfold it and use it in a new locale. With this construction, no tools are required for disassembly and reassembly of the midwheel drive foldable power chair.

Figure 7:
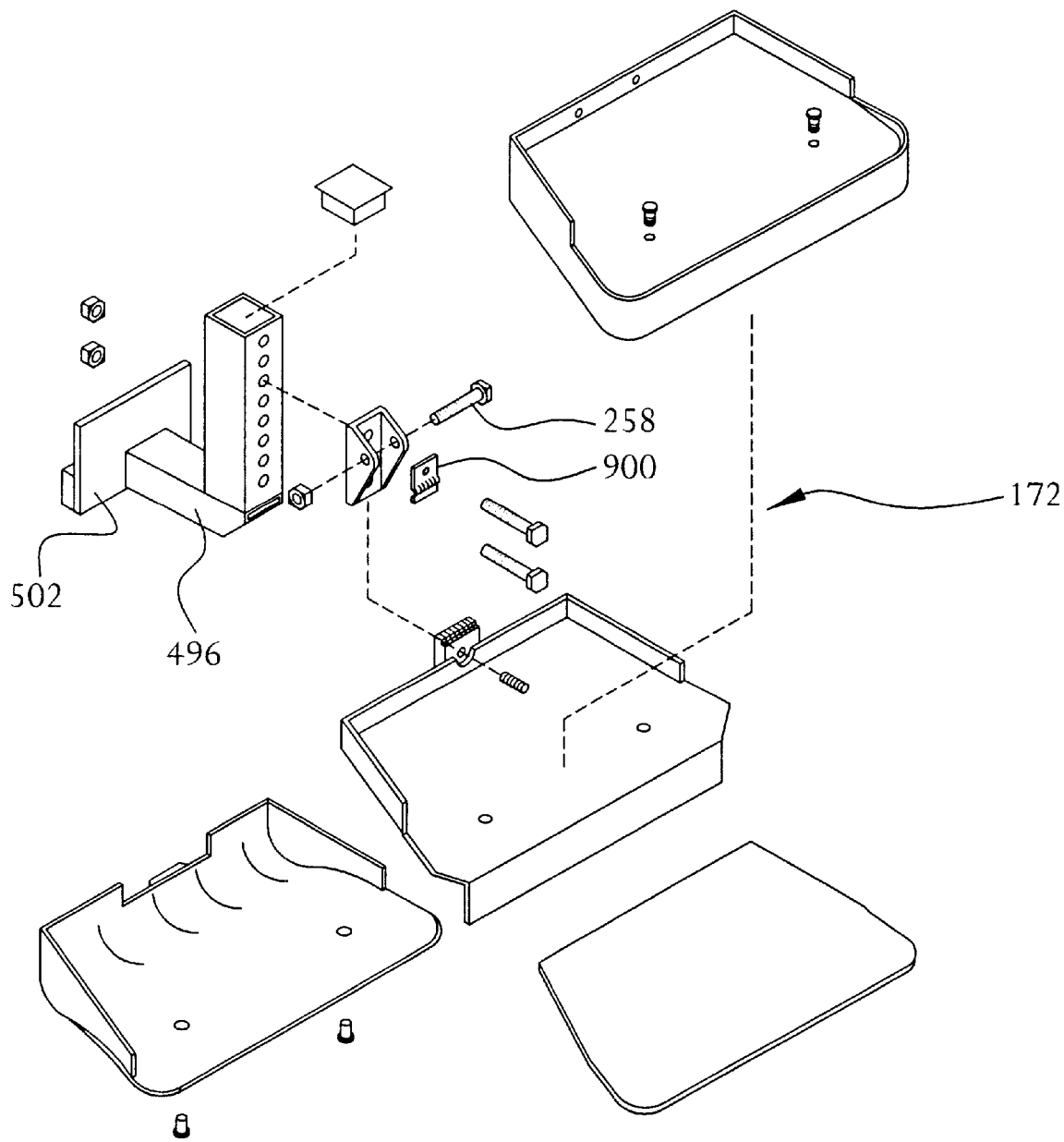
FIG. 7 is an exploded isometric view of a foldable footrest which is attached to the frame at the front of the power chair embodying aspects of the invention.

As illustrated in FIG. 7, the power chair includes a footrest 172 which is detachable to permit folding of the foldable power chair 10. Footrest 172 is connected to upstanding vertically oriented central connection beam 412 by a box-like connecting member 496 which is preferably bolted to beam 412. Rigidly affixed to one end of box-like connecting member 496 are a pair of cylindrical members 498 which are sized for fitting into a pair of curved cutouts 498 formed in vertically oriented central connection beam 412.

The pair of cylindrical members extend from the rear surface of a plate defining terminus of box-like connecting member 496 where the plate is designated 502 in FIG. 7. Relief cutouts formed in the pair of cylindrical members are sized to receive a forward wall of vertically oriented central connection beam 412 which is preferably of box-like construction. When the cylindrical members are inserted into the curved cutouts in vertically oriented central connection beam 412, the relief cutouts receiving the forward wall of vertically oriented central connection beam 412 permit box-like connecting member with the attached cylindrical members and plate 502 to slide down vertically oriented central connection beam 412 and come to rest against the pair of transverse members 404 constituting lower forward transversely extending foldable members 68.

When footrest 172 is to be removed prior to folding the power chair frame 12, footrest 172 together with box-like connecting member 496 is merely lifted until the cylindrical members are aligned with the curved cutouts in vertically oriented central connection beam 412 whereupon footrest 172 and box-like connecting member 496 may be moved forward relative to frame 12, out of engagement with frame 12.

A transversely extending pivot pin provides pivotal connection between the pan portion of footrest 172 and box-like connecting member 496 thereby permitting the pan portion of footrest 172 to be tilted upwardly by pivotal motion about pivot pin 258 respecting box-like connecting member. The pivotal connection between footrest 172 and box-like connecting member 496 provides a snap action whereby the pan portion of footrest may be snapped from a horizontal orientation at which the power chair occupant's feet may rest on the footrest pan, to a vertical orientation, for storage and otherwise minimizing the effective length of the power chair.

The snap action is provided by roll pivot pin 258 having a rod axially aligned with the roll pin and welded to the roll pin forming one portion of the pivotal connection and a piece of arcuate spring steel 900 forming the other portion of the pivotal connection. Interference between the rod welded to the roll pivot pin 258 and the piece of spring steel 900 provides spring-like snap action as the footrest pan is pivoted between vertical and horizontal positions. Most desirably the roll pin with the rod welded to it is retained in place within box-like connecting member 496 by a nut visible but not numbered to aid drawing clarity.

As illustrated in Figures N, O, Q, R, T and Y through II, power chair 10 may include rigid means for releasably supporting seat 14 on frame 12 where frame 12 includes rigid upstanding extension portions for supporting seat 14. These upstanding portions are designated generally 46 in the drawings and specifically include preferably rigid rear upstanding seat support members designated 98 and preferably rigid forward upstanding seat support members 96, which are shown in Figures N and O and especially in Figure Q.

Rear seat support members 98 extend upwardly, preferably vertically, from respective side members 460, 462 or frame 12 and are transversely spaced one from another. Similarly, forward seat support members 96 extend upwardly, preferably vertically, from respective side members 460, 462 of frame 12 and are transversely spaced one from another. Rear seat support members 98 preferably include slots, which are preferably horizontally disposed, and which preferably face forward seat support members 96. These slots are visible in Figures Q, R, Y, Z and BB but have not been numbered to enhance drawing clarity.

As illustrated in Figures Y, CC and DD, forward seat support members 96 preferably include hooking members 100 which are preferably pivotally mounted in rigid U-shaped frame portions 150 of forward seat support members 96. Hooking members 100 are preferably mounted on shafts 104 to be movable by rotation respecting frame portion 150 of forward seat support members 96 as illustrated generally in Figure EE, where arrow A denotes rotational movement of hooking member 100. In Figure EE a hooking member 100 is shown in phantom lines having rotated in the direction of arrow A from its normal operational position illustrated in solid lines in Figure EE.

Hooking members 100 are adapted to rotate rearwardly, as indicated by arrow A in Figure EE, to an orientation such that mouth portions of the hooking members preferably move at least to a horizontal orientation so that seat 14 may be removed from seat support members 46 and specifically from forward upstanding seat support members 96.

Springs 102 are provided about shafts 104 to bias hooking members 100 forwardly respecting Figure EE, in a direction opposite to that indicated by arrow A, to an orientation at which the mouth portion of a slot in hooking member 100 is preferably facing below horizontal as illustrated in solid lines in Figure EE. The mouth portion of hooking member 100 is designated generally 106 by arrow J in Figure EE and is defined by an opening between a tip 152 of hooking member 100 and a remaining surface of the slot formed in hooking member 100.

As depicted schematically by double ended arrow L in Figure FF, upstanding seat support portions 46, specifically forward and rear upstanding seat support members 96, 98, are preferably movable upwardly respecting the remainder of frame 12 and specifically respecting longitudinally extending tubular member 62 to which respective forward and rear upstanding seat support members 96, 98 are connected. Forward and rear seat support members 96, 98 are preferably vertically adjustably positionable respecting longitudinally extending tubular upper member 62 independently of one another thereby to permit adjustment of height and/or tilt of seat 14, specifically cushion portion 20 of seat 14, respecting frame 12.

Height adjustment of forward and/or rear upstanding seat support members may be preferably performed manually, without use of tools. This is preferably facilitated by mounting forward and rear upstanding seat support members 96, 98 in apertures formed in members 62 as depicted generally in Figures FF and GG. Upstanding seat support members 96, 98 preferably have shaft portions 154 which are preferably cylindrical in configuration to preferably slidably reside in the apertures defined by holes in the upper and lower portions of members 62. Preferably, horizontal semi-circular bottomed grooves 156 are formed in shafts 154, are vertically spaced from one another and an aligned at a common position on the periphery of shaft 154, as illustrated in Figure EE.

Side walls of members 62 are drilled to receive pins 158 which slidably reside within the holes drilled in the side walls of members 62. Each pin 158 is sized to fit in a selected one of horizontal semi-circular bottomed grooves 156 formed in shaft portion 154, as illustrated generally in Figures FF and GG. One pin 158 is provided for each of upstanding seat support members 96, 98 to retain the same in place respecting an associated member 62.

To adjust vertical position of one of seat support members 96, 98, associated pin 158 is removed. This is normally accomplished by pulling on a pull ring 160 which is preferably attached to pin 158 by passage through an aperture at one end of pin 158 as indicated generally by double ended arrow B in Figure GG. Once pin 158 has been removed from a given horizontal semi-circular bottomed groove 156 and is outside tubular member 62, the associated forward or rear seat support member 96, 98 may be moved vertically, either up or down as desired; this vertical adjustment is indicated schematically by double ended arrow L in Figure FF.

When the seat support member 96 or 98 is in the desired position, pin 158 is replaced. This is done by pushing pin 158 through the aligned apertures in the parallel side walls of tubular member 62 and into position in the desired semi-circular bottomed groove 156 in shaft portion 154 of the associated forward or rear seat support member 96, 98, as depicted by double ended arrow B in Figure GG. This secures seat support member 96 or 98 against rotation since pin 158 is precluded from rotating about the axis of shaft 154 by interference with the walls of member 62. Seat support member 96 or 98 is precluded from moving vertically, being held in place respecting vertical movement by pin 158 residing within a preferably semi-circular bottomed groove 156 formed in shaft portion 154 of an associated seat support member 96 or 98.

Figures FF and GG depict the interaction of a forward upstanding seat support member 96 and pin 158 and the manner of effectuating vertical position adjustment of upstanding seat support member 96; the same structure is provided for rear seat support members 98. Hence, front and rear seat support members 96, 98 may preferably be positioned vertically respecting frame 12 independently one of another. This permits cushion portion 20 of seat 14 to be affixed to frame 12 in a level position, which is effectuated by seat support members 96, 98 being at a common height respecting longitudinally extending tubular upper member 62 in which forward and rear seat support members 96, 98 reside. Cushion 20 may be tilted back; this is effectuated by having upstanding forward seat support members 96 positioned higher respecting associated member 62 of frame 12 than rear upstanding seat support members 98 respecting associated member 62 of frame 12.

Further alternatively, cushion 20 may be positioned tilted forward by having rear upstanding seat support members 98 positioned higher respecting associated member 62 of frame 12 than forward upstanding seat support members 96. Because the vertical position of upstanding seat support members 96, 98 may be adjusted manually, without use of tools, this permits an attendant or therapist to change the seating position for the power chair user at the home or other premises where the power chair is used; it is not necessary to take the power chair to a dealer or other service facility or to a health care facility to adjust seat height/tilt position.

Seat 14 may be mounted on and may be considered to include a rigid subframe designated generally 108 which provides a part of means for connecting seat 14, specifically cushion 20 of seat 14, to frame 12 of power chair 10 so that seat 14 is releasably supported above frame 12 and may be removed from frame 12 by hand, without the use of tools.

Subframe 108 may include a pair of circular cross-section longitudinally extending rigid tubular members designated 110 affixed to the bottom of cushion 20 of seat 14. Longitudinally extending tubular members 110 are visible in Figures N, O, Q, R, T and Y through DD and are shown partially broken in Figures HH and II. Subframe 108 may further include a pair of transverse rigid tubular members, longitudinally separated from one another, extending between and secured to inwardly facing surfaces of longitudinally extending members 110. These transversely extending members are numbered 111 and are visible in FIG. O.

Seat 14, specifically cushion portion 20 of seat 14, may be secured to rigid subframe 108 via screws passing through tubular members 111 and into the bottom of cushion portion 20 of seat 14. Tubular members 111 are separated from the lower, downwardly facing surface of cushion 20 of seat 14 by thermoplastic washers which are illustrated in FIG. 7. Neither the screws which pass through the thermoplastic washers to secure tubular members 111 to the bottom portion of cushion portion 20 of seat 14 nor the thermoplastic washers themselves have been numbered in FIG. O, to aid drawing clarity.

Longitudinally extending tubular members 110 preferably house pushbuttons 114 having coil springs 112 therewithin as illustrated in Figures HH and II. Pushbutton 114 has a portion 162 which extends longitudinally out of tubular member 110 and a longitudinally facing end surface 166 adapted for receiving axial manually generated force to move pushbutton 114.

Pushbutton 114 is preferably of unitary construction. The section view illustrated in Figure II is a vertical section respecting Figure HH and it is for this reason that pushbutton 114 in Figure II appears to be a two part member. In fact, pushbutton 114 is a single, unitary member having an opening thereon appearing as an open space in Figure II which registers with slot 210 illustrated in Figure HH.

A roll pin 164 extends through the walls of tubular member 110 and limits axial travel of pushbutton 114.

The open void appearing in pushbutton 114 in Figure II, which open void has been designated 168, registers with slot 210 and also with a space within pushbutton 114 occupied by spring 112. Spring 112 is maintained in compression between roll pin 164, which is stationary respecting pushbutton 114, and an unnumbered internal shoulder portion of pushbutton 114 against which spring 112 abuts at its right hand extremity viewed in Figure II.

With spring 112 being under compression, a user applying manually generated axially oriented force to exterior surface 166 urges pushbutton 114 to the left in Figures HH and II. The left hand surface of pushbutton 114, at the end opposite from surface 166, passes over forward transverse rod 206 since there is a slight clearance provided between the surface of pushbutton 114 facing rod 206 and rod 206 itself. This clearance permits pushbutton 114 moving to the left to contact hooking member 100 thereby rotating hooking member 100 in the direction indicated by arrow A, against the bias applied thereto by spring 102. When pushbutton 114 has traveled the full permissible length of its longitudinal travel within tubular member 110 and a shoulder portion at the right hand end of space 168 in Figure II has contacted roll pin 164, pushbutton 114 has pushed hooking member 100 sufficiently that hooking member 100 has rotated into a position at which the mouth of the slide indicated by arrow J in Figure EE is slightly open upwardly, as illustrated by the phantom line depiction of hooking member 100 in Figure EE. This permits the user to lift seat 14 vertically upwardly thereby removing seat 14 from forward seat support member 96 without the use of tools.

Springs 168 are under compression. When manual force is applied to exterior button portion 166 in the axial direction indicated generally by double ended arrow M in Figures HH and II, pushbutton 114 moves to the left in Figures HH and II, against the resilient force applied to pushbutton 114 as a result of contact with spring 112.

Pushbutton 114 is relieved at the bottom, as illustrated in Figure II, to provide clearance above a transverse rod 206 which is fixedly retained within an arcuate cut-out 208 formed in the bottom of longitudinally extending tubular member 110 as illustrated in Figure II. Rod 206 is preferably secured to tubular member 110 by welding.

The relief provided in pushbutton 114 as illustrated in Figure II permits pushbutton 114 to travel axially within tubular member 110, under the influence of axial force applied to exterior surface 162 with pushbutton 114 moving to the left in Figure II, past transverse rod 206. A longitudinally elongated slot 210 is provided in the bottom of tubular member 110 as illustrated in Figure HH. Pushbutton 114 can traverse substantially the longitudinal length of slot 210 under the influence of axial force applied to exterior surface 162 against force applied by spring 112.

As used herein, the "axial" force denotes force such as can be applied in a single direction by pushing with the palm of the hand. One of the major advantages of the power chair is that the seat in the embodiment illustrated in Figures Y through II may be removed from the frame and reengaged with the frame solely by application of such axial force such as may be applied using the palm of the hand. This is significant in that use of the thumb is not required. This is extremely helpful for elderly, infirm and handicapped persons such as those who through the effects of arthritis or other diseases or injury have lost use of or strength in the thumb and/or other fingers. Hence the axial force applied using the palm is applied in a single direction as by pushing with the palm.

Axially extending tubular members 110 preferably further include rear transverse rods 212 which are resident within rear arcuate cut-outs similar to forward arcuate cut-outs 208 illustrated in Figures HH and II but which have not been numbered in the drawings. Rear transverse rods 212 are preferably secured to longitudinally extending tubular members 110 similarly to forward transverse rods 206, preferably by welding. At the position on longitudinally extending tubular members 110 at which rear transverse rods are connected thereto, there is no slot analogous to axial slot 210 illustrated in Figures HH and II nor is there any spring or pushbutton structure analogous to that illustrated as pushbutton 114, spring 112 and exterior surface 162 in Figures HH and II.

Rear seat support members 98 are preferably similar to forward seat support members 96 in that rear seat support members 98 also include a U-shaped frame portion somewhat similar to that of U-shaped frame portion 150 of forward seat support members 96. The U-shaped frame portion of a rear seat support members 98 are illustrated in elevation in Figures Y through BB. Rear seat support members 98 preferably include a pair of spaced-apart vertically upstanding walls, one of which is visible in the view presented by Figures Y through BB and is designated 214 in the drawings.

Walls 214 are separated transversely sufficiently to receive longitudinally extending tubular member 110 therebetween as generally illustrated in Figures Y through BB. Walls 214 each preferably have parallel, transversely aligned forwardly opening longitudinally elongated slots formed therein, as shown in Figure BB. The slots in walls 214 of rear seat support members 98 are adapted to receive rear transverse rods 212 which are affixed to a lower portion of longitudinally extending tubular member 110 closer to the rear terminus thereof than to the forward terminus, all as illustrated in Figure BB. Hence, rear transverse rods 212 may be easily slid into the slots in walls 214 of rear seat support members 98.

Rear seat support members 98 and specifically walls 214 thereof are mounted on shafts 154 which, as described above, are preferably cylindrical in configuration to preferably slidably reside in holes drilled in the upper and lower portions of tubular members 62. Rear seat support members 98 are preferably retained in position respecting tubular members 62 using pins 158 received in a selected one of semi-circular bottomed grooves 156 formed in shaft portions 154, as discussed above and as shown in the drawings respecting the forward seat support members 96.

The semi-circular bottom grooves 156 formed in shaft 154 of the rear seat support member are preferably formed facing the rear of the power chair; this provides assurance that the power chair in general and the seat mounting system in particular is properly assembled. If rear seat support member 98 is inserted into longitudinally extending tubular frame member 62 backwards, with axial slot 210 facing towards the rear, rear seat support member 98 cannot be secured in place because pin 158 cannot engage a semi-circular bottomed groove 156 but rather interferes with a solid portion of shaft 154 of rear seat support member 98.

As yet another advantage resulting from the orientation of the semi-circular bottomed grooves 156 formed in shaft 154 of the rear seat support member, seat support members 96, 98 are preferably rigid plastic composite materials, most preferably glass filled nylon. These materials are stronger in compression than in tension. Positioning the forward and rear seat support members 96, 98 in the manner illustrated, with the grooves facing oppositely in the forward and rear seat support members, takes advantage of the higher strength in compression characteristic of the glass filled nylon thereby to provide maximum strength regions in the respective seat support members to resist stresses received when power chair 10 is rapidly decelerated or accelerated while proceeding either forwards or backwards.

To secure seat 14 in position on frame 12, initially an individual lifts seat 14 first to position circularly cross-sectioned longitudinally extending tubular members 110 of subframe 108 between the upstanding walls of rear seat support member 98 and then to position rear transverse rods 212 in position within forwardly opening longitudinally elongated axial slots 210 as indicated generally by arrow N in Figure BB. This sequence of operation facilitates securing seat 14 in position on frame 12. Initially positioning circularly cross-sectioned longitudinally extending tubular members 110 of subframe 108 between the respective walls of rear seat support members 98 helps to align rear transverse rods 212 in a position to easily engage forwardly opening longitudinally elongated axial slots 210, all as indicated by arrow N in Figure BB. Once rear transverse rods 212 have engaged axial slots 210, rearward force is applied to seat 14, specifically to cushion 20, to slide rear transverse rods into flush engagement with the closed ends or bottoms of the horizontal slots formed in walls 214 of rear seat support members 98.

Once rods 212 are in this position within slots 210, seat 14 may be pivoted downwardly about an axis defined by rear transverse rods 212 in the direction indicated by arrow P in Figure Z.

As seat 14 pivots downwardly about the axis defined by rear transverse rods 212, rods 206 encounter a rounded, downwardly sloped upwardly facing surface 216 of hooking member 100. Surface 216 is so-designated and illustrated in Figures EE, FF and GG. As forward transverse rod 206 bears downwardly on surface 216, the rounded configuration of rod 206 and the rounded downwardly sloping configuration of surface 216 resolves the force applied by rod 206 due to the weight of seat 14 to produce a force vector on hooking member 100 tending to rotate hooking member 100 in the direction illustrated by arrow A in Figure EE.

As hooking member rotates in the direction indicated by arrow A in Figure EE, tip 152 of hooking member 100 rotates into the position illustrated in phantom lines in Figure EE thereby opening the mouth of the groove indicated by arrow J in Figure EE. This permits forward transverse rod 206 to move downwardly into a position at which forward transverse rod 206 is supported by a horizontal shoulder portion 218 of U-shaped frame 150 of forward seat member 96. This movement in an arcuate direction is indicated by arrow P in Figure Z. Horizontal shoulder surface 218 is illustrated and so-designated in Figures EE and FF. Seat 14 in position with forward transverse rods 206 resting on horizontal shoulder surfaces 218 and engaged with forward seat support members 96 is illustrated in Figure AA.

Once forward transverse rods 206 are resident on horizontal shoulder surfaces 218 and are abutting shoulder surfaces 220 of forward seat and once forward transverse rod 206 has cleared tip 152 of hooking member 100, bias applied to hooking member 100 by spring 102 causes hooking member 100 to rotate clockwise in Figures Y through GG thereby causing open slot J to close over forward transverse rod 206. In this position forward rod 206 is restrained against forward movement by hooking member 100 and against rearward movement by forwardly facing vertical shoulder surfaces 220. Additionally, rear transverse rod 212 is constrained against rearward movement by the closed bottom of the unnumbered horizontal slot in rear seat support member 98. As a result, seat 14 is securely retained in position, connected by vertical seat support members 96, 98 to frame 12.

As seat 14 pivots about rear transverse rod 212 and moves downwardly as indicated by arrow B in Figure Z, hooking members 110 are received within slots 210 formed in the bottoms of longitudinally extending tubular members 110. The upwardly extending walls 151 of U-shaped frame portion 150 of forward seat support member 96 are, similarly to walls 214 of rear seat support member 98, transversely spaced one from another sufficiently to receive longitudinally extending tubular member 110 therebetween, as depicted generally in Figure CC. Receipt of longitudinally extending tubular members 110 between upwardly extending walls of the rear seat support member assists in alignment of the seat with the seat support members when the seat is being engaged with the seat support members, as described above.

To remove seat 14 from power chair 10, the procedure is reversed. An individual begins by pressing exterior end surfaces 166 to the left in the direction indicated by double ended arrow M in Figures HH and II. This axially applied manual force moves plugs 114 to the left in Figures HH and II, against the restraining force constantly applied by spring 112. As plugs 114 move to the left, those plugs encounter rounded downwardly sloping surfaces 216 of hooking members 100. Continued application of manual force to push-button surfaces 166 against force applied by spring 112 causes plugs 114 to push against hooking members 100, causing hooking members 100 to rotate counter-clockwise as viewed in Figures CC through EE, thereby causing tips 152 to rotate upwardly and thereby causing open slot J to assume a position where it is opening slightly upwardly, as illustrated in phantom lines in Figure EE.

At this position the forward ends of longitudinally extending tubular members 110 may be lifted since forward transverse rods 206 are no longer restrained against vertically upward movement by hooking members 100. Hence seat 14 may be moved upwardly in a pivotal fashion about a pivot defined by rear transverse rods 212, with seat 14 moving in a direction opposite that indicated by arrow P in Figure Z. Once seat 14 has been rotated somewhat in a direction opposite to that by arrow P in Figure Z, seat 14 may be moved horizontally, to the right viewing Figure Z, thereby disengaging rear transverse rods 212 from the horizontal forwardly facing open slots formed in walls 214 of rear seat support members 98.

Figure T illustrates structure providing means for adjustably transversely separating by positioning arms of seat 14 where the arms are designated generally 182 with the left (looking forward) arm designated 182L and the right (looking forward) arm designated 182R. The structure facilitating adjustable transverse separation and positioning of arms 182L, 182R includes an arm support base 184 which is preferably a hollow rectangular cross-section tubular member. Arm support base 184 is connected to seat 14, specifically to cushion portion 20 thereof, indirectly.

Specifically, arm support base 184 is connected to rearwardly facing portions of L-shaped brackets 222, the lateral portion of one of which is visible in Figures Y through CC and is partially visible in Figure T. The portion of L-shaped bracket 222 which faces rearwardly and is preferably in facing contact with a rearwardly facing surface of cushion portion 20 of seat 14 is not visible in Figure T; it is hidden behind the hollow rectangular cross-section tubular member defining arm support base 184. Lateral portions of L-shaped brackets 222 are connected, preferably by welding, to cushion support brackets 224 which are secured to cushion portion 20 of seat 14 and are illustrated in Figures Y through CC. More preferably L-shaped brackets 222 are secured to lateral flange portions of cushion support brackets 224 via a pair of Phillips head screws illustrated in Figures Y through CC but not numbered to aid clarity of the drawings.

Cushion support brackets 224 preferably include upstanding portions which run along the longitudinally extending side surfaces of seat cushion 20 and bottom portions which run longitudinally along the bottom surface of seat cushion 20. Cushion support brackets 224 are preferably secured to cushion portion 20 of seat 14 via screw-type fasteners driven into the bottom of seat cushion portion 20 through apertures in the bottom longitudinally extending portions of cushion support brackets 224.

A seat back support bracket 226 illustrated in Figure T and Figures Z through CC is of generally L-shaped cross-section and includes a rearwardly facing flange portion and a side facing flange portion. The rearwardly facing flange portion includes apertures therethrough for screw-type fasteners to pass through and into the rearwardly facing surface of seat back 22, to secure seat back 22 to the associated seat back support bracket 226.

Seat back support brackets 226 are preferably connected to seat cushion support brackets 224 via a single rivet connection at each side of seat cushion and back portions 20, 22; the single rivet connection is somewhat visible in Figures Z through CC. The single rivet connection is partially hidden by a portion of the arm support structure, specifically a vertically extending arm support member 190 in Figures Z through CC. The single rivet connection between seat back support brackets 226 and seat cushion support brackets 224 facilitates folding or pivoting movement of seat back 22 towards seat cushion 20 about the points of single rivet connection between cushion support brackets 224 and seat back support brackets 226.

Arm support extensions are designated generally 186 in Figure T and include horizontal supports 188 and vertically extending supports 190. Arm cushions 192 are pivotally connected to vertical supports 190 for arcuate motion of arm cushions 192 with respect thereto.

Arm support base 184 includes a pair of tapped holes, not illustrated in Figure T, which receive in complemental threaded engagement threaded shaft portions which are fixed to hand knobs 194, illustrated in Figure T. The threaded shafts affixed to knobs 194 when advanced or retracted by rotation of knobs 194, through complemental engagement of the threaded shafts with the tapped holes in arm support base 184, move against or retract from contact with respective horizontal arm support portions 188 of arm support extensions designated generally 186, which are associated with left and right arms 182L, 182R.

Frictional contact between the threaded shafts fixedly connected to knobs 194 and respective horizontal arm support portions 188 fixes arm support extensions 186 in position when the threaded shafts are tightly turned thereagainst. Fixation of arm support extensions 186 in position fixes the position of arms 182L, 182R. Since horizontal arm supports portions 188 are movable into and out of arm support base 184, arms 182L, 182R and arm cushions 192 may be manually moved between the positions illustrated in solid lines in Figure T and the positions illustrated in dotted lines in Figure T, thereby adjusting effective width of seat 14 of power chair 10.

Knobs 194 are rotated by application of manual force thereto. Once the knobs are rotated to a position at which threaded shafts associated therewith only lightly contact or do not even contact horizontal arm support portions 188, these horizontal arm support portions may be moved by hand, thereby adjusting transverse separation of arm cushions 192 and hence the effective width of seat 14, all without use of tools.

Figure 8:
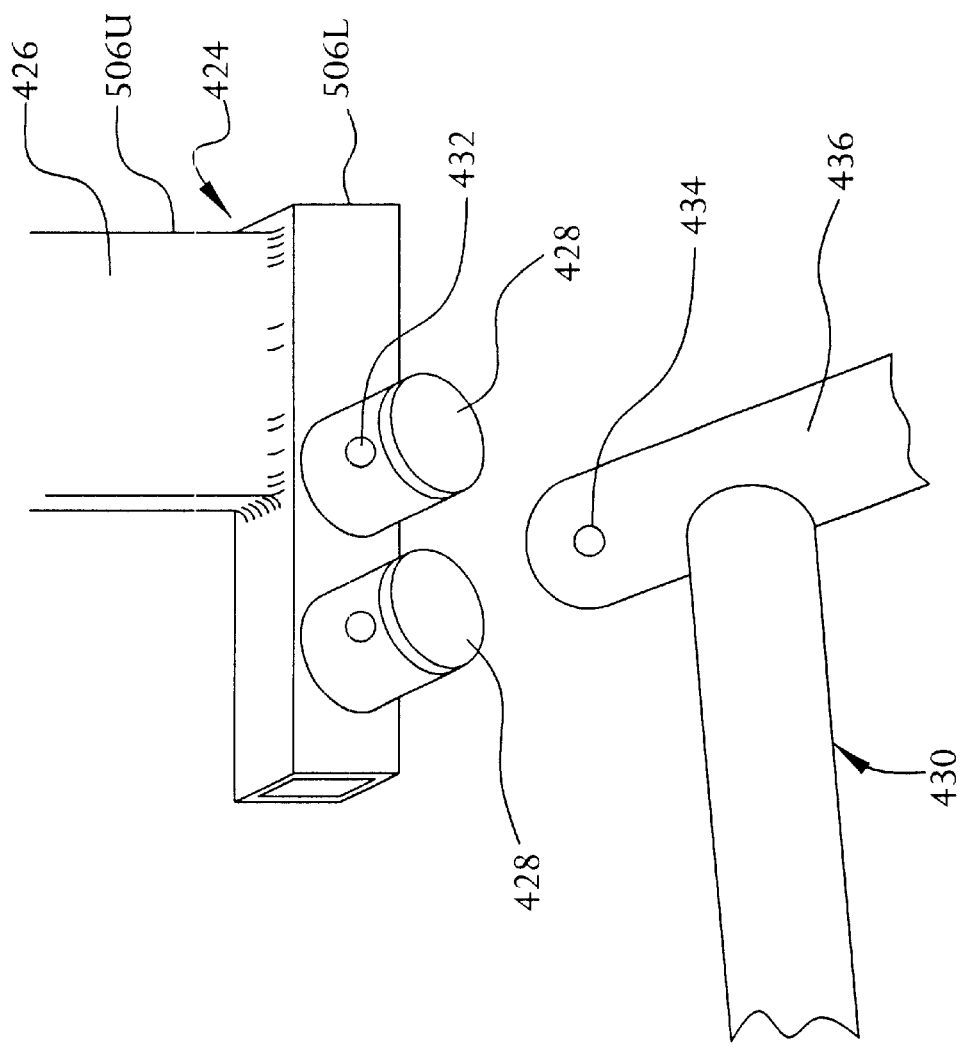
FIG. 8 is a front view of a chair seat and chair back connecting structure usable with a power chair having a frame as illustrated in FIGS. 1 through 6.

FIG. 8 illustrates structure providing adjustable width for the frame of the back of a seat, in an embodiment different from that illustrated in Figures Y through II, usable with foldable power chair 10. A back frame 424 has adjustable width substantially vertical rails 426. Adjustable width vertical rails 426 are equipped with tubular extensions 428 at their bases where rails 426 meet a seat frame 430. Tubular extensions 428 have vertical bores 432 formed through them. The adjoining seat frame 430 has extending hollow tubular extensions 436 where the seat frame 430 attaches to the adjustable width vertical rails 426 of back frame 424. Hollow tubular extensions 436 have corresponding vertical bores 434 through them. Tubular extensions 428 of adjustable width vertical rails 426 fit inside hollow tubular extensions 436 of seat frame 430. A pin is inserted into the aligned bores after the vertical rail tubular extensions 428 are inserted into the hollow tubular extensions 436 of the seat frame 430 as shown in FIG. 8. Either of the two tubular extensions 428 extending forward from the mounting block portion of the back frame 424 illustrated in FIG. 8 may be inserted into tubular extension 436 of seat frame 430. Similarly, at the opposite side of seat frame 430, either of two tubular extensions 428 may be inserted into the corresponding seat frame hollow tubular extension. By selecting one of the tubular extensions 428 to be inserted into seat frame hollow tubular extensions 436, this provides a range of widths for the seat back frame 424.

Figure 16:
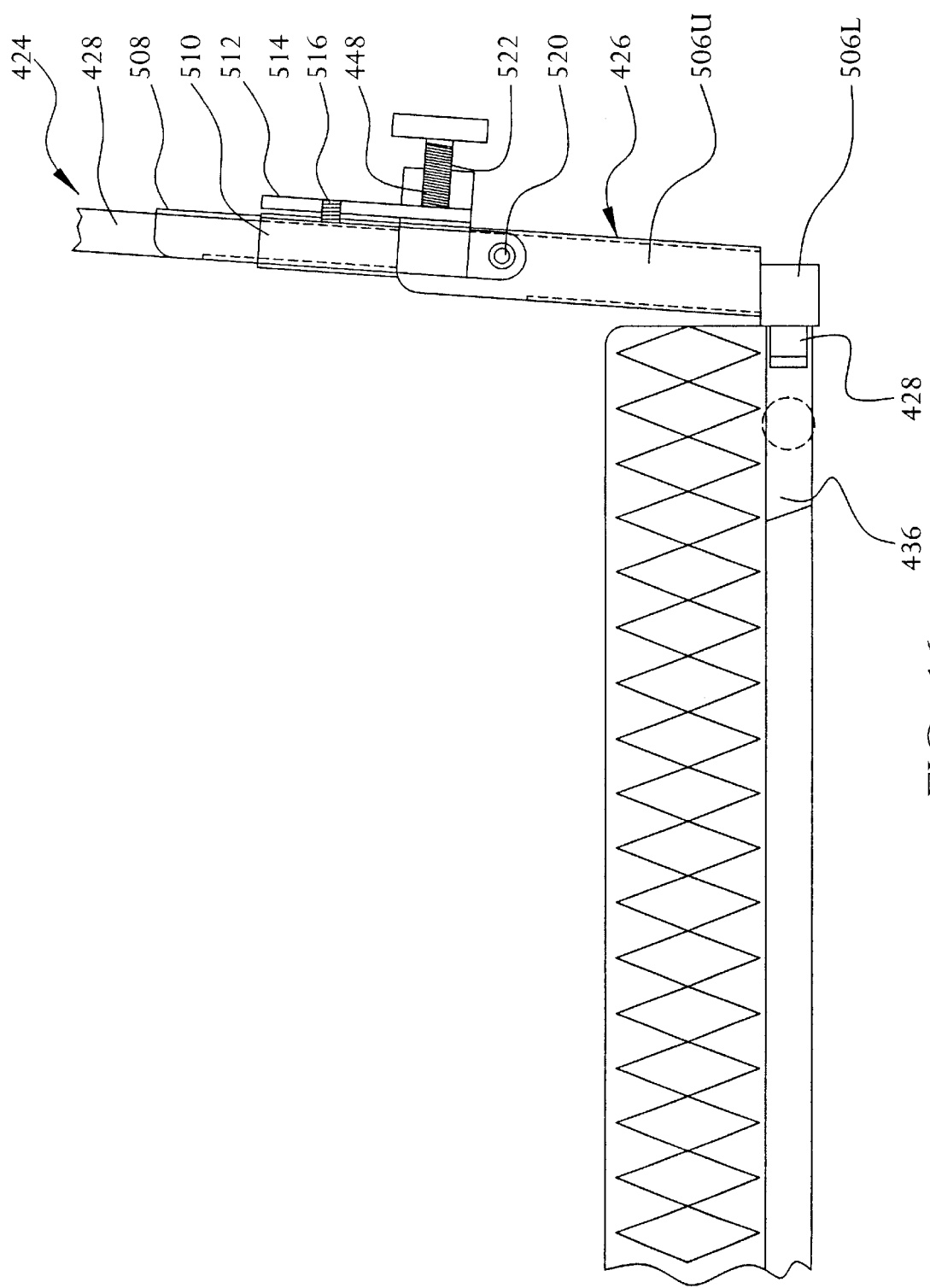
FIG. 16 is a side view of an adjustable back assembly for a seat usable with the midwheel drive foldable power chair illustrated in FIGS. 1 through 6, showing the back of the seat in an upright position.
Figure 17:
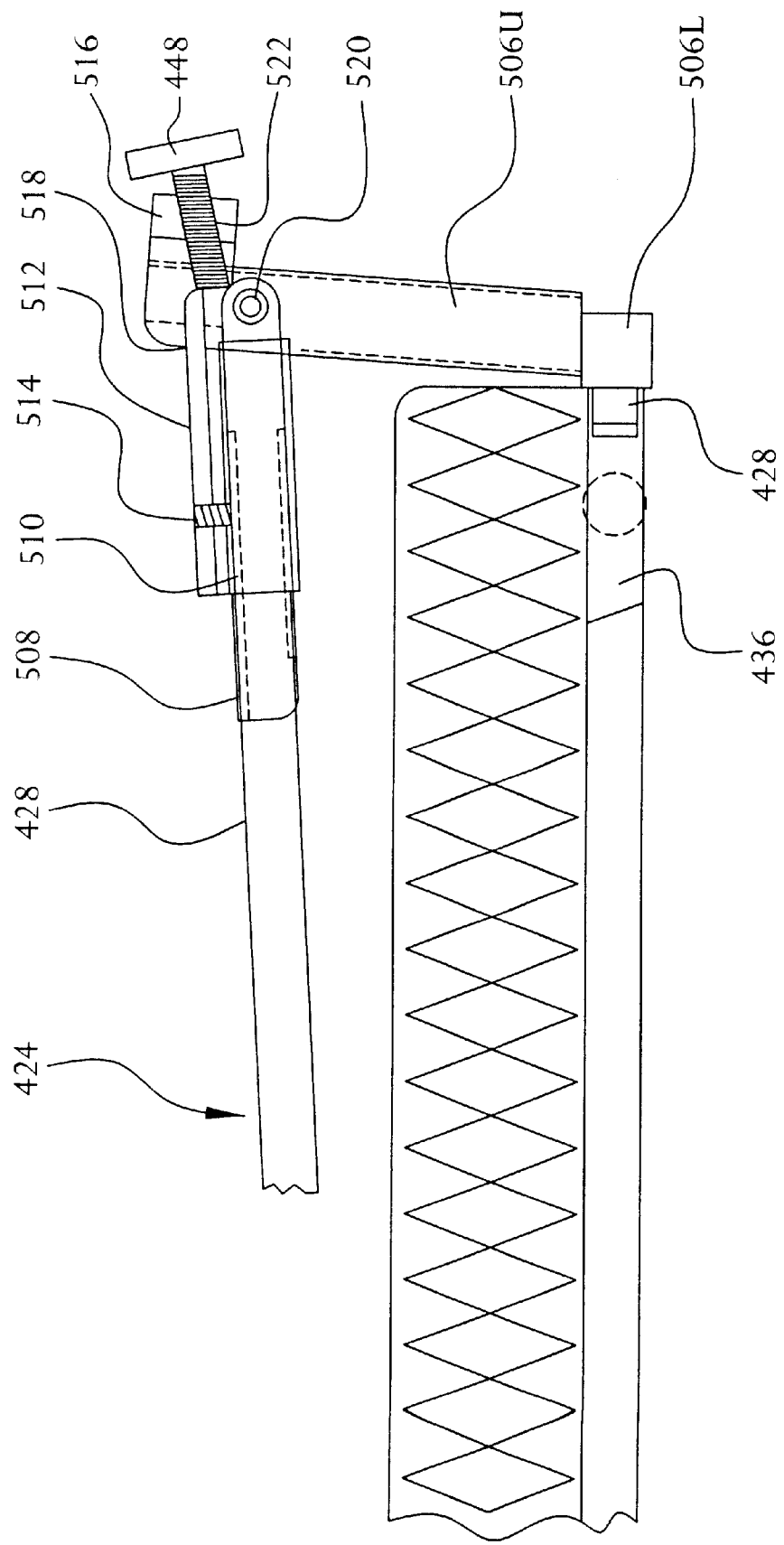
FIG. 17 is a side view of the adjustable back assembly for a seat usable with the midwheel drive foldable power chair illustrated in FIGS. 1 through 6, showing the back of the seat in a folded position.

As illustrated in FIGS. 16 and 17, the back of the frame of the seat for the foldable power chair 10 may be folded from the upright position to a folded position for facile transport of seat 14 when seat 14 has been removed from power chair 10 prior to folding of the power chair frame.

Adjustable width vertical rails 426 forming a portion of back frame 424 have mounting blocks 506 forming a lower end of each vertical rail 426. Vertical rail tubular extension 428 extend forwardly from mounting blocks 506. Mounting blocks 506 preferably have two portions; a lower portion 506L and upper portion 506U where these two portions may be machined from separate pieces of metal and then joined by welding, bolts or other fastening means.

Pivotally connected to mounting block 506U is a tubular receptacle 508 within which a lower extremity of vertical rail tubular extension 428 resides, all as illustrated in FIGS. 16 and 17. Affixed to the exterior of tubular receptacle 508 is a sleeve 510 to which is affixed an axially extending plate 512. In the construction illustrated in FIGS. 16 and 17, plate 512 is secured to sleeve 510 by a set screw 514. Set screw 514 passes through sleeve 510 and not only connects plate 512 to sleeve 510 but secures the assembly of plate 512 and sleeve 510 against movement axially along the exterior of tubular receptacle 508.

A pair of slots, preferably formed by machining, are in mounting block 506U for receipt of axially extending plate 512. One of these slots, designated 516 in FIGS. 16 and 17, receives plate 512 when seat back frame 424 is to be positioned upright, as illustrated in FIG. 16, for a user of the foldable power chair to be seated therein. A second slot 518 formed in mounting block 506U receives an axial extremity of axially extending plate 512 when the seat back frame 428 is in the folded position, with the seat back essentially parallel with the seat cushion, for transport as illustrated in FIG. 17. Seat back frame 424 pivots respecting mounting block 506U about pivotal connection 520 illustrated in FIGS. 16 and 17. A knob 448 has affixed thereto a threaded shaft, not number in the drawings, and threadedly engages a threaded bore 522. The bore 522 is positioned so that knob 448 and the threaded shaft attached thereto abuttingly contact the axial extremity of axial extending plate 512 when the seat back frame is in the upright position illustrated in FIG. 16 and interferes with the axial extremity of axially extending plate 512 thereby precluding rotation of seat back frame 424 about pivotal connection 520 when the seat back frame is in the position illustrated in FIG. 17.

To move the seat back frame from the position illustrated in FIG. 16 to the position illustrated in FIG. 17 set screw 514 is loosened, knob 448 and the shaft associated therewith is loosened and sleeve 510 is moved slidably along the tubular receptacle 508 to disengage axially extending plate 512 from first slot 516. Once this has been accomplished, the seat back frame may be pivoted about connection 520 from the position illustrated in FIG. 16 to the position illustrated in FIG. 17. At that position, sleeve 510 is moved to the right in FIG. 17 thereby causing axially extending plate 512 to enter second slot 518 illustrated in FIG. 17 whereupon set screw 514 may be tightened, knob 448 may be put into position and interference between the threaded shaft attached to knob 448 and axially extending plate 512 precludes rotation of seat back frame 428 about pivotable connection 520 thereby retaining seat back frame 428 in the folded position for transport of the seat separate and apart from the foldable power chair base.

As illustrated in FIGS. 16 and 17, back frame 424 of the seat folds downward until it is parallel to seat frame 430 which allows the seat to be removed as a unit and carried away.

As illustrated in Figures Z through II, arm 192 includes an arm cushion portion 242 which is preferably upholstered to provide cushioning for the arms of the user of power chair 10. Arm cushion portion 242 is mounted on a longitudinally elongated support web 244. Arm cushion portion 242 and longitudinally elongated arm cushion support web 244 together constitute an arm 182 of power chair 10.

Support web 244 has a horizontally oriented central portion on which arm cushion portion 242 is supported and two vertically extending webs, which are visible in Figure T. Two webs 246 may be of different size and shape with one of webs 246 supporting joystick controller 196 and the electronics associated therewith and the remaining web 246 being of more tapered, somewhat truncated shape. Web 246 supporting joystick 196 and the associated electronics is denoted 246J in the drawings.

Affixed to the lower longitudinal extremity, preferably by welding, of vertical support portion 190 of arm support extension 186, is a mounting block 248, as illustrated in Figures JJ and KK. Mounting block 248 preferably has a tapped hole therein. Residing within the tapped hole is a bolt threadedly engaging the tapped hole where the bolt is designated 250 in Figures JJ and KK. Bolt 250 can be advanced into or withdrawn from the tapped hole in mounting block 248 thereby to vary the length of bolt 250 protruding from mounting block 248.

Arm 192 connects to vertical support portion 190 via a pivotal connection provided by a single rivet indicated as 252 in Figures JJ and KK.

As is apparent from Figures JJ and especially from Figure KK, vertical webs 246, 246J of longitudinally elongated arm cushion support web 244 are spaced apart to receive the extremity of arm vertical support portion 190 therebetween. Mounting block 248 is preferably of the same width, measured transversely to the plane of the paper, as vertical arm support portion 190. Hence mounting block 248 and bolt 250 may fit easily slidably between webs 246, 246J of arm 182.

Referring to Figure JJ, when arm 182 is pivoted downwardly about the pivotal connection provided by rivet 252, in the direction indicated by double ended arrow S, the central portion of longitudinally elongated arm cushion support web 244 contacts the head of bolt 250 and cannot move further arcuately downwardly as a result of such contact. Adjustment of the position of bolt 250, specifically by rotating and advancing bolt 250, into or out of mounting block 248, adjusts the angle at which arm 182 and specifically the central portion of longitudinally elongated arm cushion support web 244 contacts bolt 250. This facilitates adjustment of the angular position of arm 182 relative to the remainder of seat 14 when arm 182 is positioned at the limit of its arcuate downward travel in the direction of double ended arrow S in Figure JJ.

Figure 9:
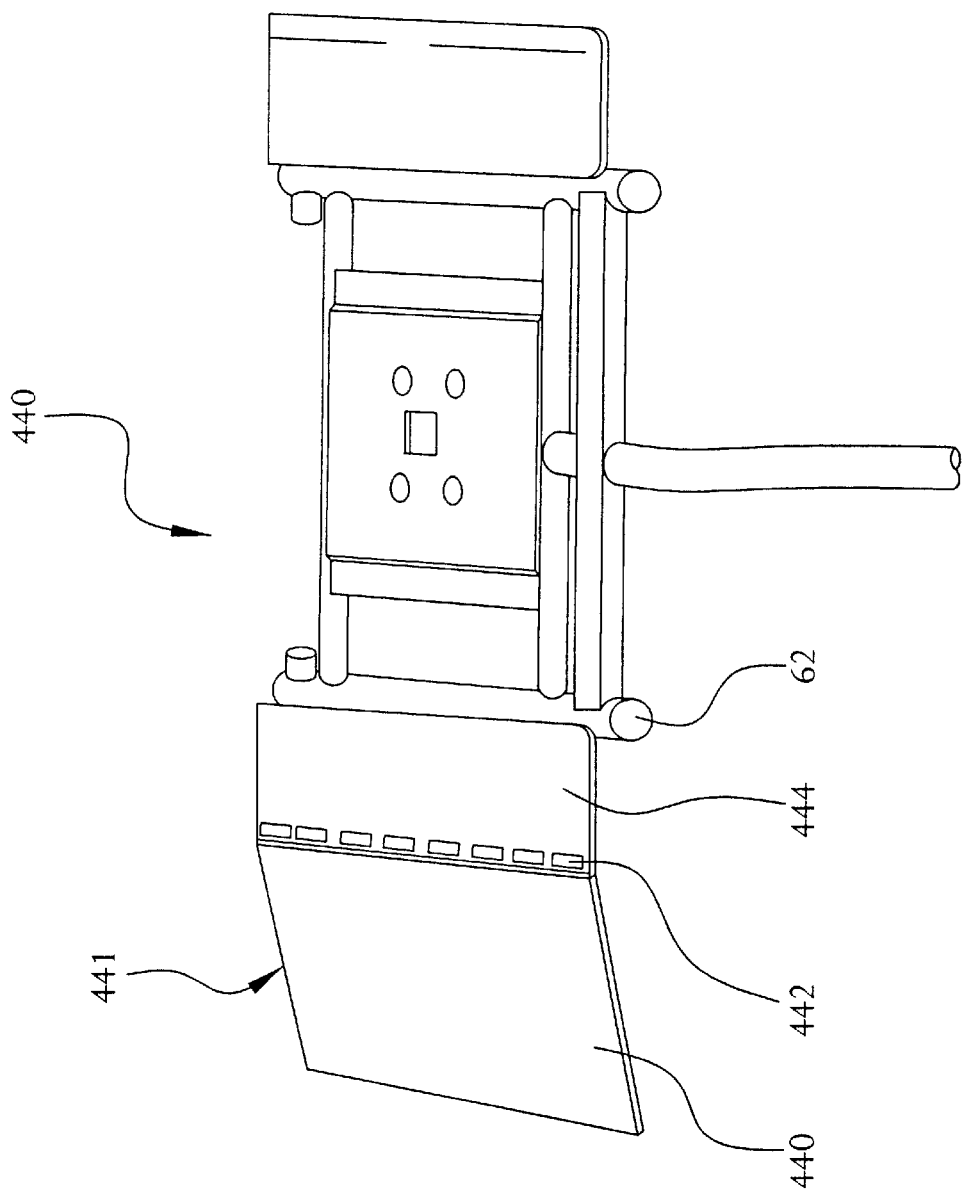
FIG. 9 is an isometric view taken from this front of a patient transfer seat usable with a power chair having a frame as illustrated in FIGS. 1 through 6, showing the transfer seat in an unfolded position for transfer of a patient.

As illustrated in FIG. 9, a patient transfer device 440 provides a smooth slidable surface via which to relocate a patient easily from foldable power chair 10 to another location. Patient transfer device is an alternative to the seat structure illustrated in Figures Z through JJ. Patient transfer device 440 includes an adjustable planar member, with a smooth, sliding surface, attached to frame 12 of foldable power chair 10, permitting a patient to slide from the chair to another location.

A patient transfer board 441 connects by a hinge 442 to a patient transfer mounting board 444. The patient transfer mounting board 444 is in turn fixed, preferably by welding, to longitudinally extending member 62 of the frame 12 of the foldable power chair 10.

A spring loaded lever is preferably attached to the back side of patient transfer board 441, allowing the patient or an attendant to rotate patient transfer board 441 to a vertical position and maintain the board at that position. Thus, patient transfer board 441 may be rotated up to a vertical position or down to a horizontal position about hinge 442. Additionally, patient transfer board 441 may rotate even lower about hinge 442 to provide a more or less continuous surface from where the patient is seated on the power chair to the location in which the patient is to be moved. Hinge 442 is preferably equipped with a detent of increasing resistance so that when the patient or an attendant moves patient transfer board 441 into the desired position, the transfer board stays at that position until released. Once released by movement towards a vertical position about hinge 442, the spring loaded lever pulls the transfer board back into the vertical position. After patient transfer board 441 is released, the spring loaded lever pulls it back up into the vertical position.

The patient transfer board 441 and patient transfer mounting board 444 are preferably upholstered; this has not been depicted in the drawings. The upholstery is preferably maintained in place on the patient transfer device 440 by mating pads of respective hook and eye fabric material, such as that sold under the trademark Velcro, affixed to upwardly facing surfaces on the patient transfer board 441 and patient transfer mounting board 444.

Figure 11:
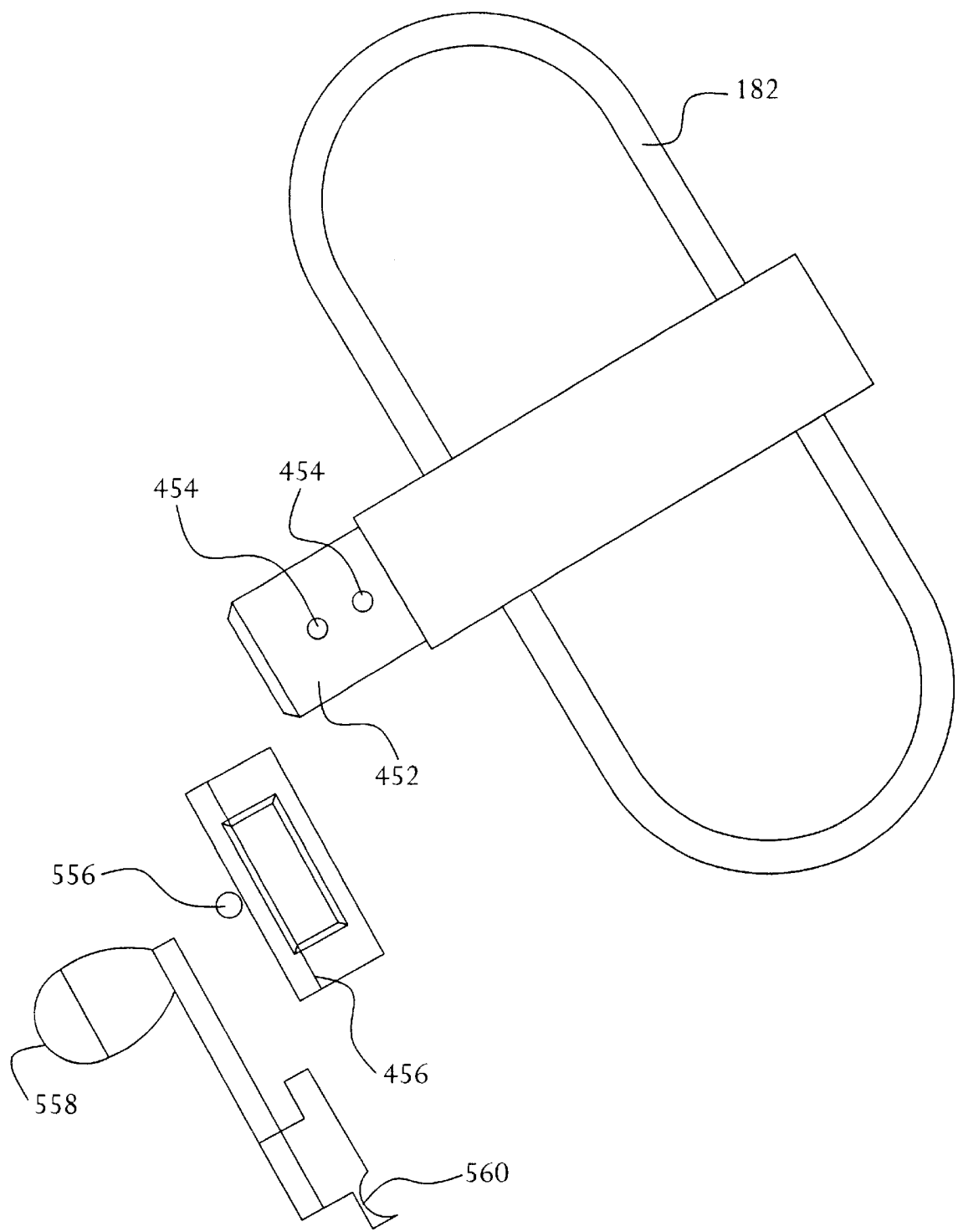
FIG. 11 is an exploded top view of the arm lock apparatus shown in FIG. 10, with the lock portion of the apparatus disassembled.

Arm rests for the foldable power chair 10 are preferably vertically adjustable. One preferred embodiment apparatus facilitating vertical adjustment of the arm rests of foldable power chair 10 is depicted in FIGS. 10 and 11. In those drawings, an arm rest 182, which may be either a left arm rest or a right arm rest, is connected to a machine member 452 which has longitudinally aligned depressions machined into its surface. Depressions 454 are preferably aligned along the longitudinal length of machine member 452 and are located at the transverse midpoint thereof, as illustrated in FIGS. 10 and 11.

Machine member 452 is received by a slot 554 formed in an arm rest box 456. The left and right arm rests 182 are preferably connected to an arm rest machine member 452 which has depressions machined into its surface. An arm rest box 456 with a removable knob 458 protruding from its outwardly facing surface arm rest machined member 452; arm rest box is preferably fixedly connected to frame 12.

The arm rest machine members 452 are welded onto the frames of the left and right arm rests 182. The arm rest machine members 452 have two machined depressions on their laterally outwardly facing surfaces. The arm rest box 456 has a round knob 458 on its lateral surface. The inside of the knob 458 has a semi-circular groove of varying depth in which resides a ball bearing 556. Ball bearing 556 fits into one end of a semi-circular varying depth groove of the knob 458 of the arm rest box 456. The remaining portion of the elongated semi-circular groove, in which ball bearing 556 does not fit, is shallower than the area where the ball bearing fits.

As the knob 458 of the arm rest box 456 is turned, the ball bearing moves into the depressions on the surface of the arm rest machined member 452. When the ball bearing fits into one of the depressions, the arm rest 182 cannot be moved vertically. When it is desired to adjust one of the arm rests 182 upwardly or downwardly, knob 458 of arm rest box is turned through perhaps one quarter of a turn. Due to the configuration of the elongated semi-circular groove formed in the interior facing circular surface of knob 458.

Forward anti-tip wheels 42 do not normally contact the ground or other surface on which power chair 10 operates. Forward anti-tip wheels 42 are maintained above the ground and provide protection against tipping in the event of forward pitching of power chair 10 due to encounter with an obstacle, traverse of a significant downgrade and the like. The off-the-ground, anti-tip positioning of wheels 42 is illustrated in Figure N.

Anti-tip idler wheels 42 are connected to frame 12 via a spring-strut combination which is designated generally 44 in the drawings, specifically in Figures N and U through X. Each spring-strut combination 44 includes a U-shaped spindle 228; one leg (of the U-shape) of one of spindles 228 is shown in side view in Figure N. The U-shape of spindles 228 is readily apparent from Figure P.

One arrangement of the U-shaped spindle apparatus is illustrated in Figures N and U though X; another and preferred arrangement of the U-shaped spindle apparatus as illustrated in FIGS. 1, 2 and 18 through 20.

U-shaped spindles 228 are preferably fabricated by welding rectangular cross-section tubular stock between two parallel plates with the tubular stock forming the base of the U. Spindles 228 are preferably pivotally connected to frame 12 preferably using screw-bolt assemblies. The side plate portions of spindles 228 fit pivotally on either side about the lower portions of respective downwardly extending vertical members 66, which are illustrated in Figures S and U through Y. The nut and bolt pivotal connections of U-shaped spindles 228 to vertical members 66 are depicted schematically by indicator numeral 230 in Figures U through Y and are also visible in FIGS. 4 and 5 and are depicted schematically in FIG. 14.

Extending between the legs of U-shaped spindles 228 are transverse shafts 238. Mounted on transverse shafts 238, via passage of transverse shafts 238 through bores formed therein, are cylindrical spring support bases 236.

Secured to and extending from cylindrical spring support bases 236 are upstanding struts 238, the upper extremities of which extend through and are slidably retained within fittings which are resident within apertures, which have not been numbered in the drawings, formed in horizontally extending planar portions of forwardly extending pedestals 202, which are visible in Figure S as well as in Figures U through X. One of upstanding struts 238 has been identified by a lead line extending to the vertical extremity thereof in Figures W and X.

Preferably, the aperture in pedestal 202 through which shaft 238 passes is longitudinally elongated and formed as a slot, rather than a circular hole. Additionally, springs 236 are preferably retained in position by respective bushings illustrated in FIGS. 18 through 20 and designated generally 522. Each bushing 522 fits at the top of a spring 236 with the upper portion of bushing 522 contacting the downwardly facing surface of pedestal 202.

Figure 20:
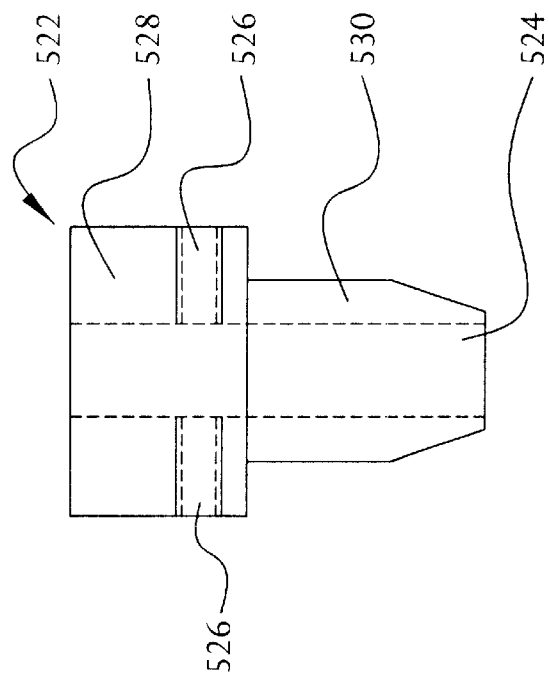
FIG. 20 is a side view of the bushing illustrated in FIGS. 18 and 19.
Figure 18:
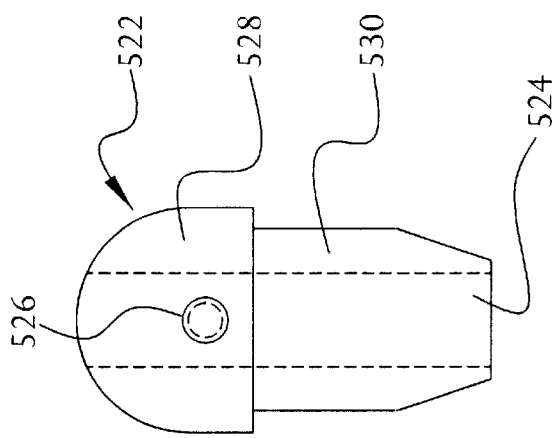
FIG. 18 is a front elevation of a bushing which is a part of the anti-tip wheel spring pivot support apparatus visible in FIGS. 1 and 2.
Figure 19:
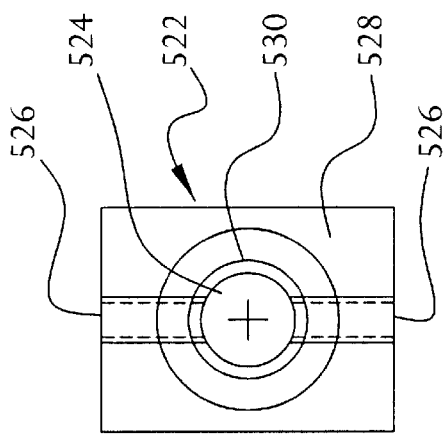
FIG. 19 is a bottom view of the bushing illustrated in FIG. 18.

Bushing 522 includes a vertical strut passageway 524 for passage therethrough of an upstanding strut 238. Bushing 522 further includes a pair of shoulder bolt-receiving bores 526 which are transverse to vertical strut passageway 524 and are formed in a barrel-shaped upper portion 528 of bushing 522, as illustrated in FIGS. 18 and 20.

A conical portion 530 of bushing 522 extends downwardly from barrel-shaped portion 528 and fits within coil spring 236. When an associated anti-tip wheel comes up, for example upon encountering a curb, the spring-strut assembly moves forward and tilts, with the strut 238 and spring 236 becoming more horizontal and less vertical. This pivoting action of the spring-strut is facilitated by the rounded outer surface of barrel-shaped portion 528 of bushing 522 contacting the downwardly facing surface of pedestal 202 thereby facilitating rotation of the spring-strut assembly relative to pedestal 202. This rounded configuration of barrel-shaped portion 528 facilitates a very low friction contact between bushing 522 and the lower surface of pedestal 202. Bushing 522 is retained in place by shoulder bolts extending between outer surfaces of pedestals 202 and residing in shoulder bolt receiving bores 526.

Upstanding shaft 238 extends all the way up from the lower member through the spring, through bushing 522, through the longitudinally elongated slot in pedestal 202 and is retained in place by a nylon washer and a bolt engaging the upper portion of shaft 238.

With this arrangement, upon an anti-tip wheel 42 encountering an obstacle or upon power chair 10 pitching forwardly as depicted schematically in Figure X, anti-tip wheels 42 move arcuately, together with U-shaped spindle 228, as they pivot about pivotal connection 230 relative to frame 12. This pivotal motion is denoted by double ended arrow Q in Figure X. As the illustrated anti-tip wheel 42 and U-shaped spindle 228 pivot about connection point 230, upward movement of spindle 228 causes distance between the anti-tip wheel 42 and pedestal 202 to decrease, thereby compressing spring 236 in the direction indicated by double ended arrow R in Figure X.

Compression of spring 236 provides a cushioning effect when anti-tip wheels 42 contact an obstacle or contact the ground due to forward pitching of power chair 10 as illustrated schematically in Figure X. The suspension of anti-tip wheels 42 provided by spring-strut combination 44 connects anti-tip idler wheels 42 to frame 16 for arcuate upward motion relative to frame 12 upon tipping of power chair 10 or contact of anti-tip wheels 42 with an above-grade obstacle.

A nut 240 mounted on the threaded portion of strut 238 extending above pedestal 202 permits selectable compression of spring 236 thereby providing adjustment of the spring force applied to anti-tip second idler wheels 42 to resist arcuate upward movement thereof upon forward tipping of power chair 10 or upon wheels 42 encountering an obstacle. Rotation of nut 240 also adjusts the distance at which wheels 42 are from the ground.

The tight maneuverability feature of the power chair achieved by locating the drive wheels, which are front wheel drive wheels, close to the longitudinal center of the power chair, while having many attendant advantages as described above, has a minor disadvantage in that there is a slight tendency to tip if a significant obstacle is encountered when the chair is decelerating or traveling forwardly downhill.

Any slight tendency towards forward tipping is counteracted by the spring loaded anti-tip wheels 42 located in front of each drive wheel 16. Spring loading of anti-tip wheels 42 is accomplished via springs forming portions of spring-strut combinations 44 biasing anti-tip wheels 42 downwardly towards the ground. When choosing the rate for these springs used in connection with anti-tip wheels 42, compromise is required between a spring rate stiff enough to resist forward tipping upon deceleration of the power chair yet light enough to allow the power chair to overcome minor obstacles such as incline transitions, curves or other uneven terrain.

An important feature provided in the power chair is that the pairs of transverse members 402 of upper forward transversely extending foldable member 64 and the pair of transverse members 404 of lower forward transversely extending foldable member 68 are angled below horizontal in the unfolded condition of the chair. This prevents inadvertent collapse or folding of the chair.

There are stops provided at the pivotal connection between upper members 402 and vertically oriented beam 412 and at the pivotal connections of lower transverse members 404 with vertically oriented beam 412. As a result of these stops, members 402, 404 cannot pivot further downwardly from the operating position illustrated in FIG. 1. As a result of the presence of these stops, the only way the chair frame can fold is for members 402, 404 to pivot upwardly about their pivotal connections with forward upper and lower transverse fixed beam members 406, 408. However, such upward pivoting cannot occur when the seat is in place on the frame. Presence of the seat supported by the rigid seat frame and carried by seat supports 96, 98 prevents any lateral movement of the side members 460, 462 and, accordingly, prevents any upward rotation of pairs of transverse members 402, 404 respectively forming parts of cross-members 64, 68.

When the chair frame is in the unfolded condition, pairs of transverse members 402 and 404 forming parts of members 64 and 68 pivot about their pivotal connections with upper and lower front fixed transverse beam members 406, 408 to an orientation below horizontal and illustrated in FIG. 1. Locking bar 400 is pivotally connected to one of front lower transverse fixed beam members 408 inboard of vertical frame member 66. Downward facing notches formed in locking bar 400 engage pins extending forwardly from vertically oriented central connecting member 412 and from member 402 positioned oppositely from the point of connection of locking bar 400. With locking bar 400 in place and the slots in locking bar 400 engaging pins extending forwardly out of one of transverse members 402 and vertically oriented beam 412, locking bar 400 secures the foldable frame in an open position in which the frame cannot be folded without disengaging locking bar from those pins.

In the preferred embodiment width of the foldable power chair measured from the outer extremities of the two drive shafts in the unfolded condition is 23½ inches. When the foldable power chair is folded, the width of the chair measured between the outer extremities of the two drive shafts is 13½ inches.

One of the important features provided by the foldable power chair is the accommodation of a rigid seat on a folding chair base. Known folding power chairs use sling-type seats which are similar to "directors' chairs" widely used by consumers.

In sling-type seats, the seat portion, which is cloth, folds as the power chair frame is folded. Such cloth or fabric seats which fold as the power chair frame is folded are less than desirable from the standpoint of providing stability for the power chair user's pelvic region, which may be in need of rehabilitation therapy.

Contrasting, the flat form rigid base seat used in connection with the power chair of the invention provides a stable platform for the power chair user's pelvis, thereby facilitating rehabilitation therapy.

Another disadvantage of the sling-type seat in a folding power chair is that the sling-type seat does not contribute rigidity to the folding power chair. In known conventional folding power chairs with sling-type seats, there is a certain amount of wobble that is inherent in the chair. Such wobble is eliminated with a rigid seat structure such as incorporated by the foldable power chair of the invention.

Yet another advantage of the foldable power chair disclosed herein is that, in contrast to conventional folding power chairs, there is a substantial reduction in height of the power chair unit when the power chair unit is disassembled and folded. In conventional folding power chairs using sling-type seats, the seat support members, particularly the uprights, typically do not fold downwardly.

Contrasting, in the power chair as disclosed herein, with the seat removed, the chassis is only 20 inches high. The length of the chassis is 34½ inches.

A major advantage afforded by the power chair as disclosed herein is the ease of folding of the power chair when the leash is attached to forward and aft portions of the frame as illustrated in FIG. 1 and lifted upwardly, the chair folds easily with the two side members 402, 404 moving easily towards one another due to the downward force of gravity which resolves itself to urge the two side members 402, 404 towards one another.

The lifting action provided by the strap facilitates the folding of the chair because as the user pulls upwardly on the strap, he reduces the downward force applied from the wheels to the ground and effectively may lift the chassis off the ground where the chassis then just folds up quite easily. There is no significant sliding resistance resulting from the wheels dragging across the ground. That is a significant advantage over the other foldable chairs where once the seat is taken off, there still is significant effort required.

A major advantage that the connections between the frame members are pivoting connections about clevis pins that are driven through clearance holes in the frame members. Preferably, there are no sliding connections between frame members in the power chair structure.

Figure 12:
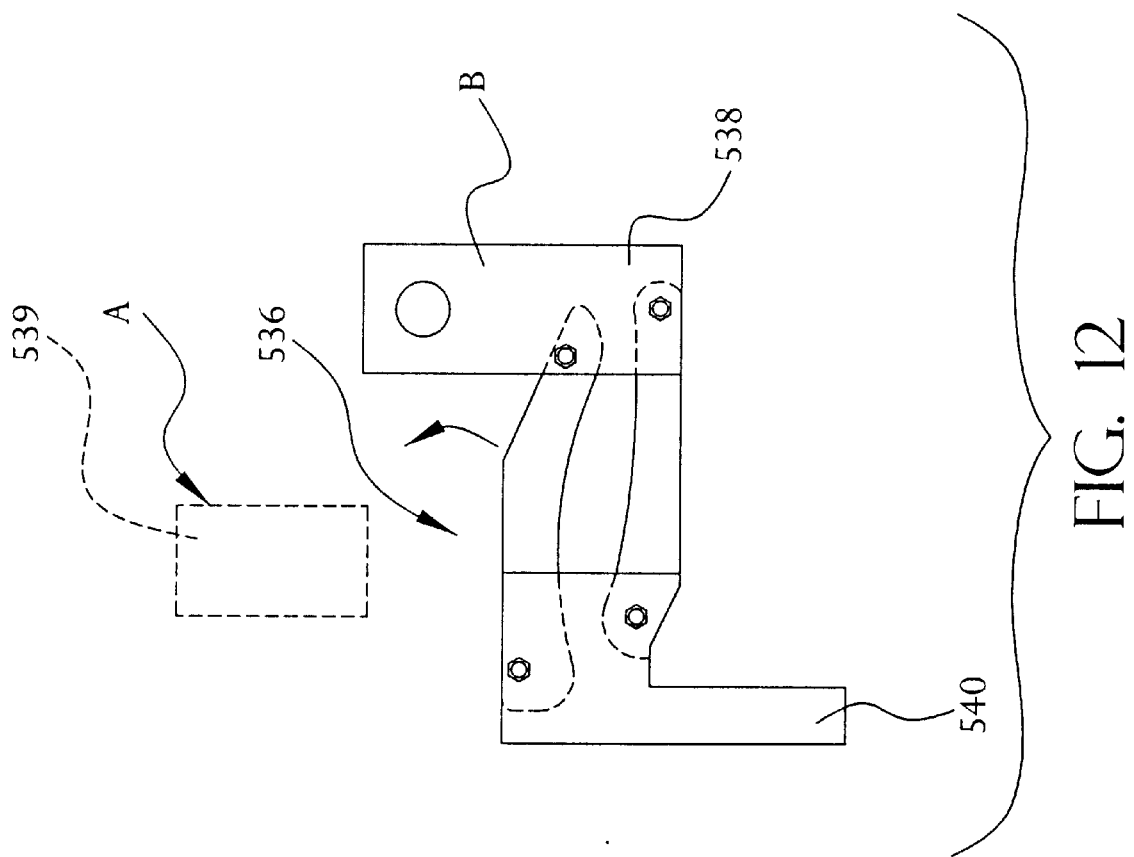
FIG. 12 is a top view of a locking parallelogram linkage for supporting and positioning a joystick controller, usable with a power chair having a frame as illustrated in FIGS. 1 through 6.

FIG. 12 illustrates a parallelogram linkage 536 with one bar of the linkage being defined by a support plate 540 adapted to be connected to the frame or arm rest of the power chair and with the opposite bar of the linkage defined by a support plate 538 for the joystick controller for the power chair. The parallelogram linkage 536 facilitates movement of the joystick controller from a position ahead of the arm rest, identified by arrow A in FIG. 12, to a position adjacent to the side of the arm rest, identified by arrow B in FIG. 12, with the orientation of the joystick remaining at all times fixed with respect to the longitudinal axis which is the direction of travel of the power chair.

This maintenance of constant orientation of the joystick is important so that no matter what the position of the joystick controller within the range of movement provided by the parallelogram linkage, movement of the joystick in the forward, longitudinal direction by the power chair occupant causes the power chair to travel forwards. If the parallelogram linkage 536 was not used, the orientation of the joystick controller relative to the longitudinal direction would change within the range of motion provided by the relevant linkage. As a result, at some position within that range, movement of the joystick in the forward, longitudinal direction would cause the power chair to travel in a direction skew to the longitudinal. This could be very disturbing and disorienting to the power chair occupant, especially to a power chair occupant having diminished mental capacity.

Figure 22:
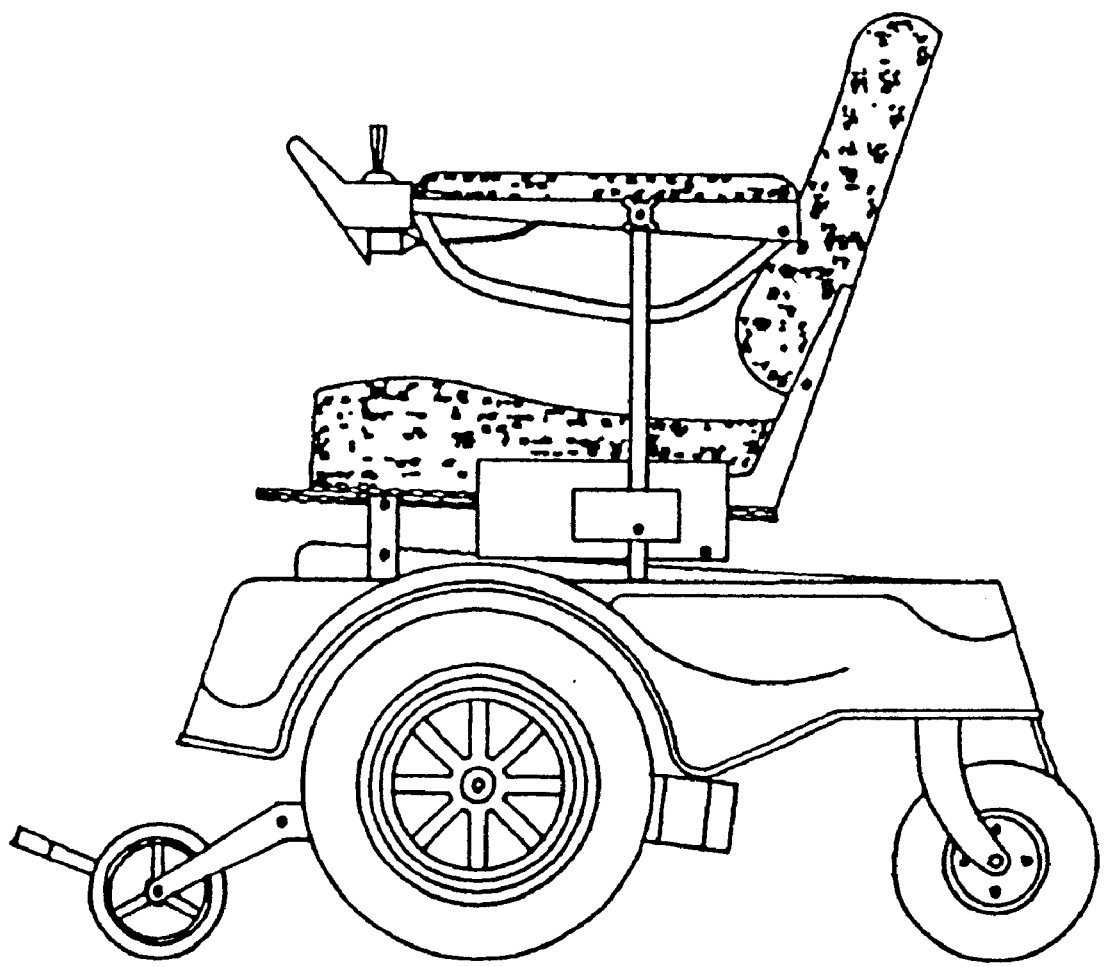
FIG. 22 is a side view of a midwheel drive foldable power chair of the type having a frame as illustrated in FIGS. 1 through 6.
Figure 23:
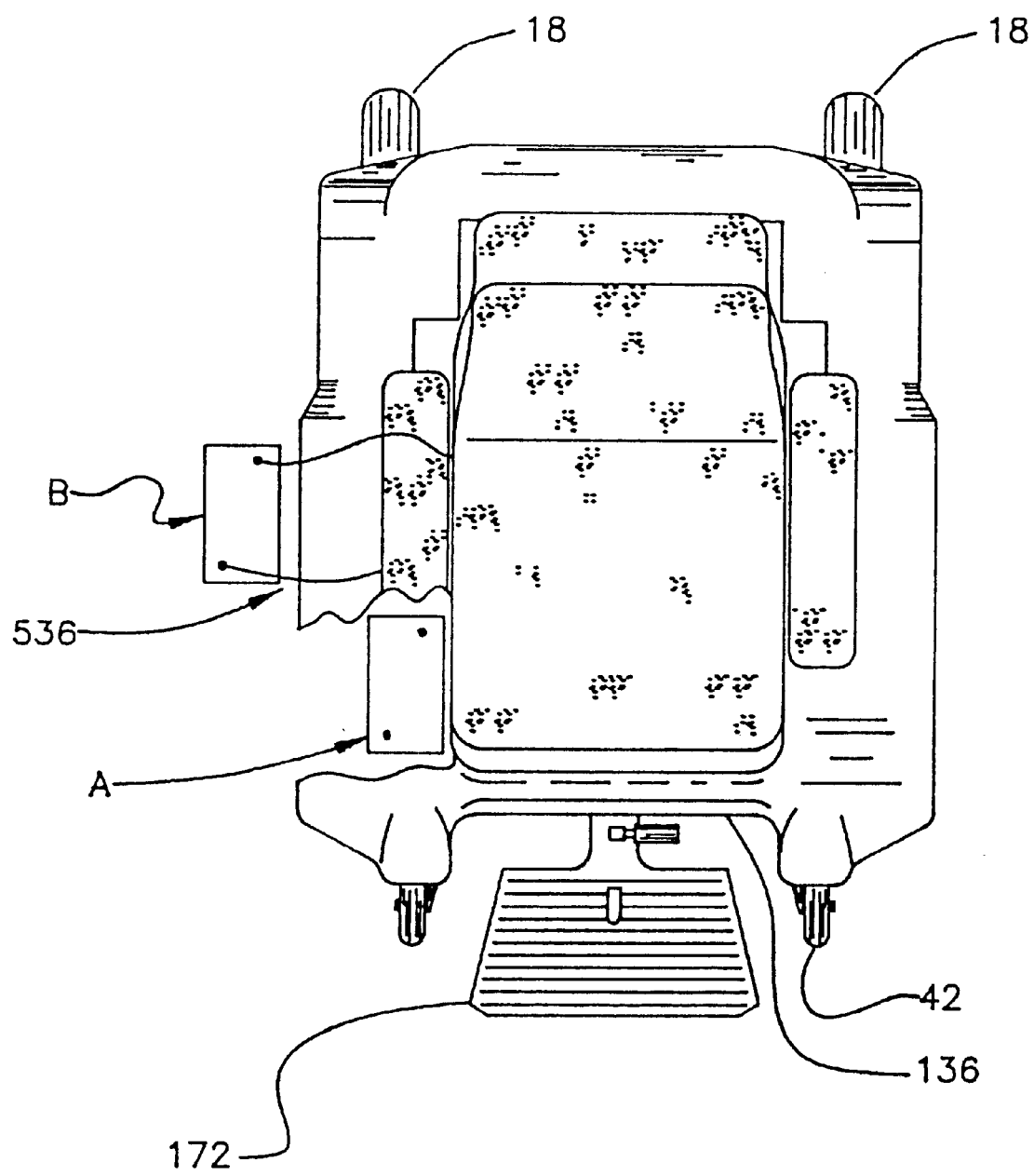
FIG. 23 is a top view of a midwheel drive foldable power chair having a frame as illustrated in FIGS. 1 through 6, including a parallelogram linkage assembly for the joystick power chair movement control device, as depicted schematically in FIG. 12.
Figure 24:
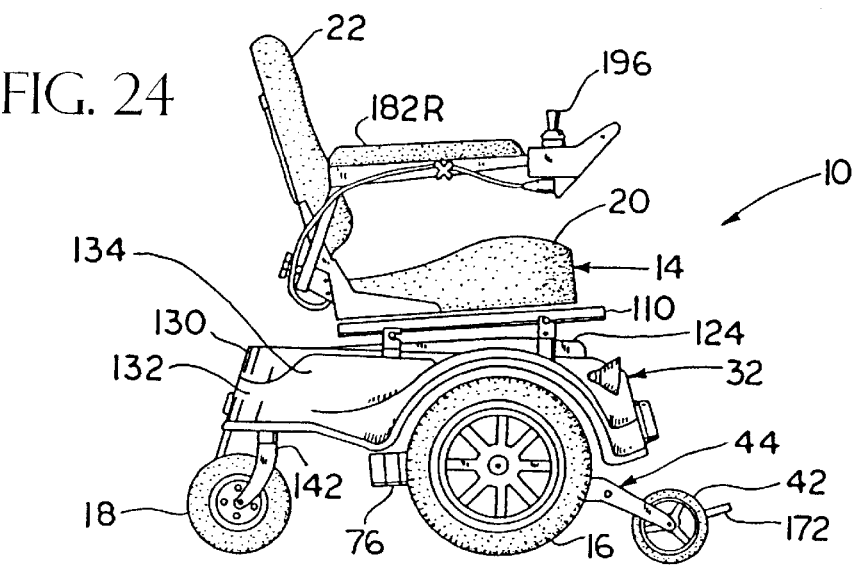
FIG. 24 is a right side view of a power chair of the type to which this application generally pertains and as presented in co-pending U.S. patent application Ser. No. 08/742,972 with Figure A hereof corresponding to FIG. 1 of that application.
Figure 25:
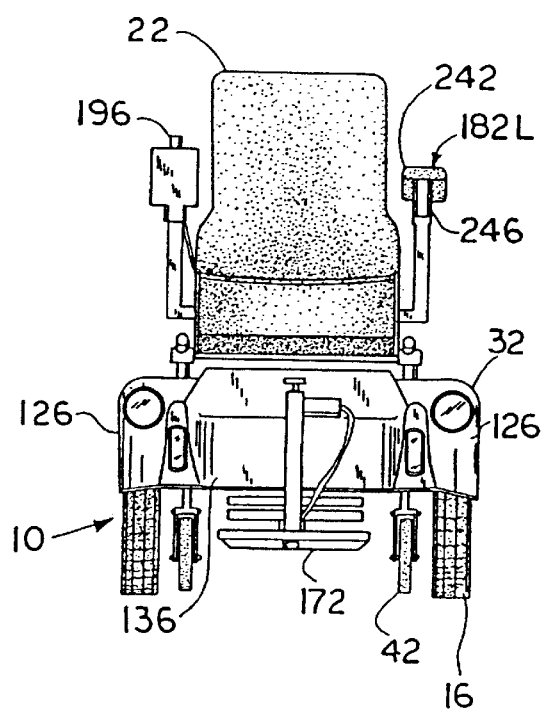
FIG. 25 is a front elevation of the power chair shown in Figure A, as presented in co-pending U.S. patent application Ser. No. 08/742,972 with Figure B hereof corresponding to FIG. 2 of that application.
Figure 26:
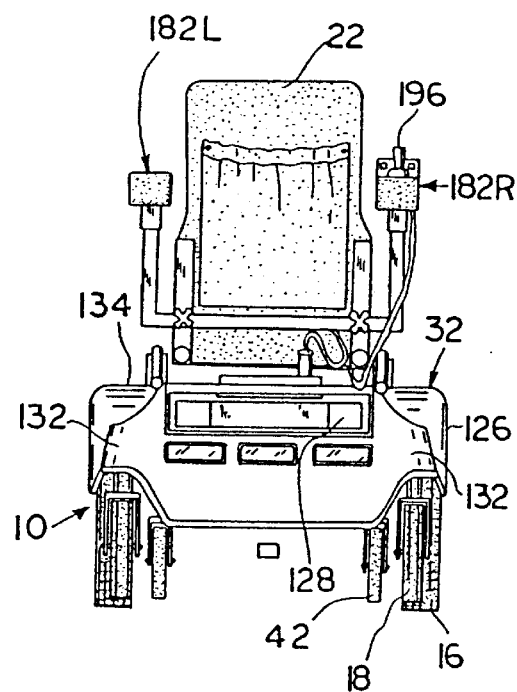
FIG. 26 is a rear elevation of the power chair shown in Figures A and B, as presented in co-pending U.S. patent application Ser. No. 08/742,972 with Figure C hereof corresponding to FIG. 3 of that application.
Figure 27:
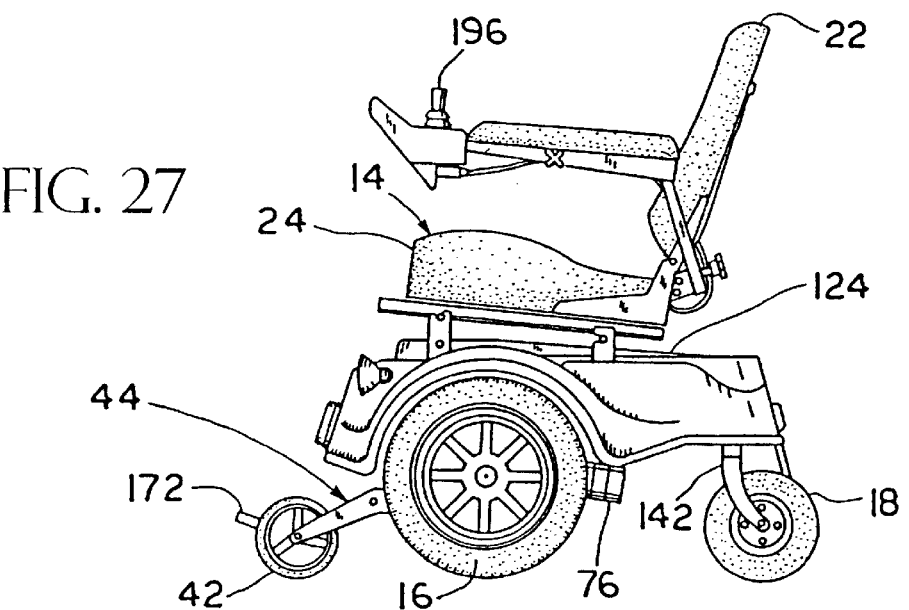
FIG. 27 is a left side view of the power chair shown in Figures A through C as presented in co-pending U.S. patent application Ser. No. 08/742,972 with Figure D hereof corresponding to FIG. 4 of that application.
Figure 28:
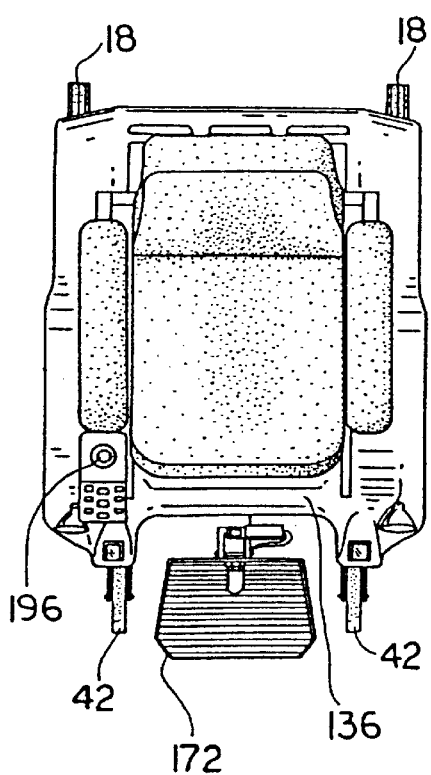
FIG. 28 is a top view of the power chair shown in Figures A through H as presented in co-pending U.S. patent application Ser. No. 08/742,972 with Figure E hereof corresponding to FIG. 5 of that application.
Figure 29:
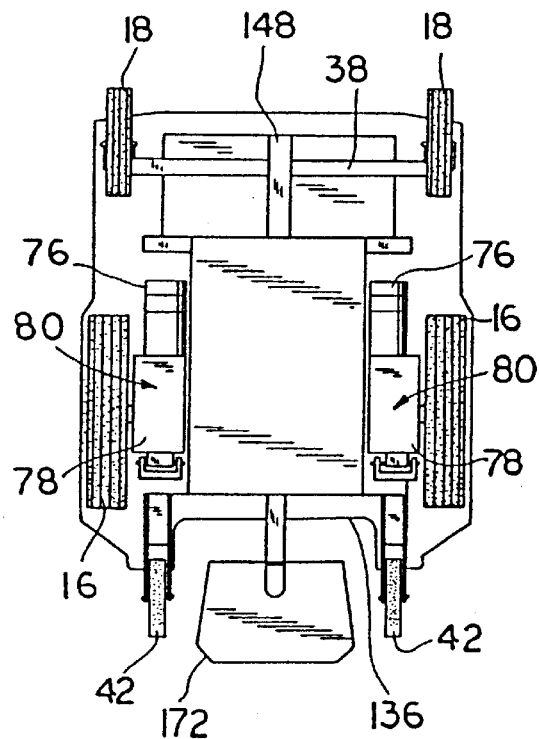
FIG. 29 is a bottom view of the power chair shown in Figures A through E as presented in co-pending U.S. patent application Ser. No. 08/742,972 with Figure F hereof corresponding to FIG. 6 of that application.
Figure 30:
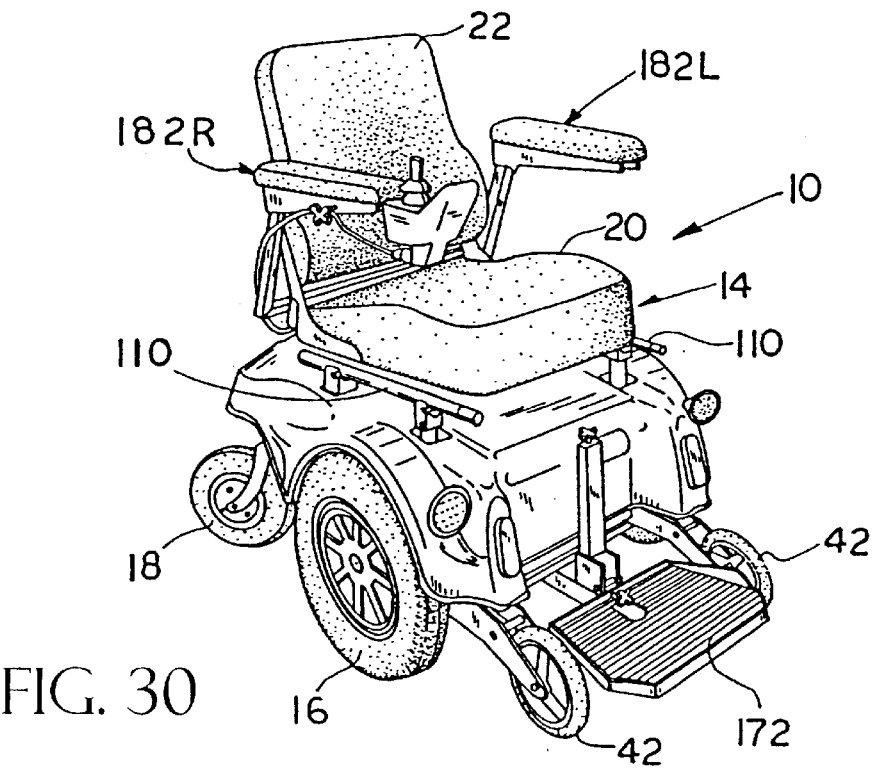
FIG. 30 is a perspective view looking at the right front of the power chair shown in Figures A through F as presented in co-pending U.S. patent application Ser. No. 08/742,972 with Figure G hereof corresponding to FIG. 7 of that application.
Figure 31:
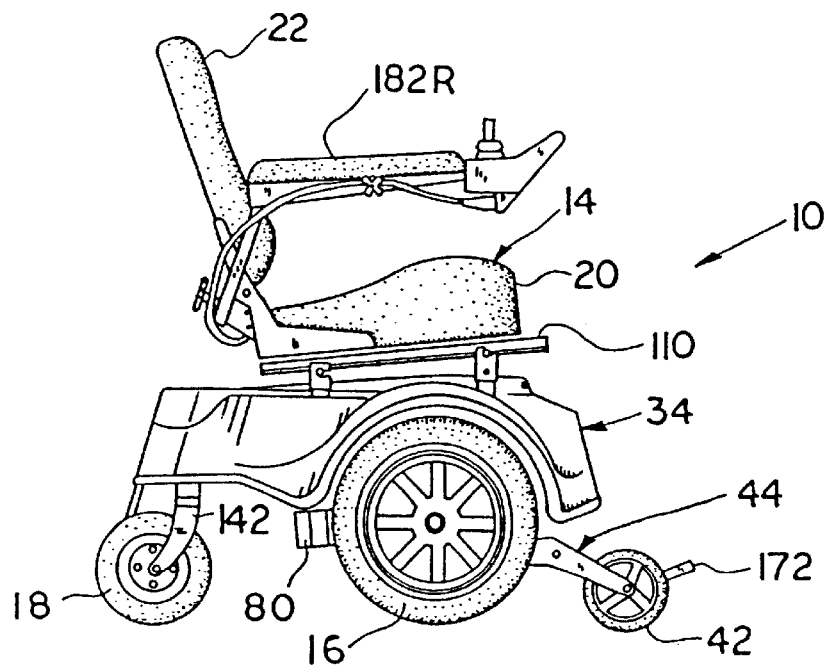
FIG. 31 is a right side view of a power chair similar to that shown in Figures A through G and as presented in co-pending U.S. patent application Ser. No. 08/742,972 with Figure H hereof corresponding to FIG. 8 of that application.

FIG. 22 illustrates the arm rest releasable height adjustment and locking mechanism in position on a power chair while FIGS. 10 through 11 illustrate the releasable arm rest height adjustment and locking mechanism in various orientations and degrees of disassembly. The arm rest releasable height adjustment and locking mechanism is designated generally 542 and preferably includes a box-like member 456 having a knob 458 rotatably mounted thereon for turning a circular insert facing onto an exposed interior surface of box-like member 456.

An interior surface of the circular insert, which faces the exposed interior surface of the box-like member, is machined to provide a variable depth pocket or groove receptacle 560 receiving a ball 556 which resides in a clearance hole in a wall of box-like member 456, which clearance hole is covered by the circular insert when the releasable locking mechanism is assembled. Dimensions of the machining are such as to make ball 556 protrude from the clearance hole into a vertical passageway through the box-like member when a portion of the interior surface of the circular insert which does not have the variable depth pocket or groove receptacle 560 formed therein is over the clearance hole. In this configuration, the protruding ball engages one of the depressions machined into member 452 to which the arm rest is attached, and retains member 452 and arm rest against movement. The ball 556 does not substantially protrude from the clearance hole into the vertical passageway through the box-like member when a portion of the interior surface of the circular insert which has the variable depth pocket or groove receptacle 560 formed therein is over the clearance hole. In this configuration, the ball does not protrude sufficiently to engage any of the receptacle depressions 454 machined into a machine member 452 to which the arm rest is attached, and, as a result, the machine member and arm rest are freely moveable relative to releasable locking mechanism 542.

Preferably a knob is provided and connected to the circular insert to facilitate rotation of the circular insert between the positions at which the fixed against movement and is freely movable relative to box-like member 456. With this arrangement, very little torque on the knob is required to move the circular insert between the positions of interest; this is important since many of the users of the power chair can be expected to lack significant strength in their arms, hands and fingers.

Figure 13:
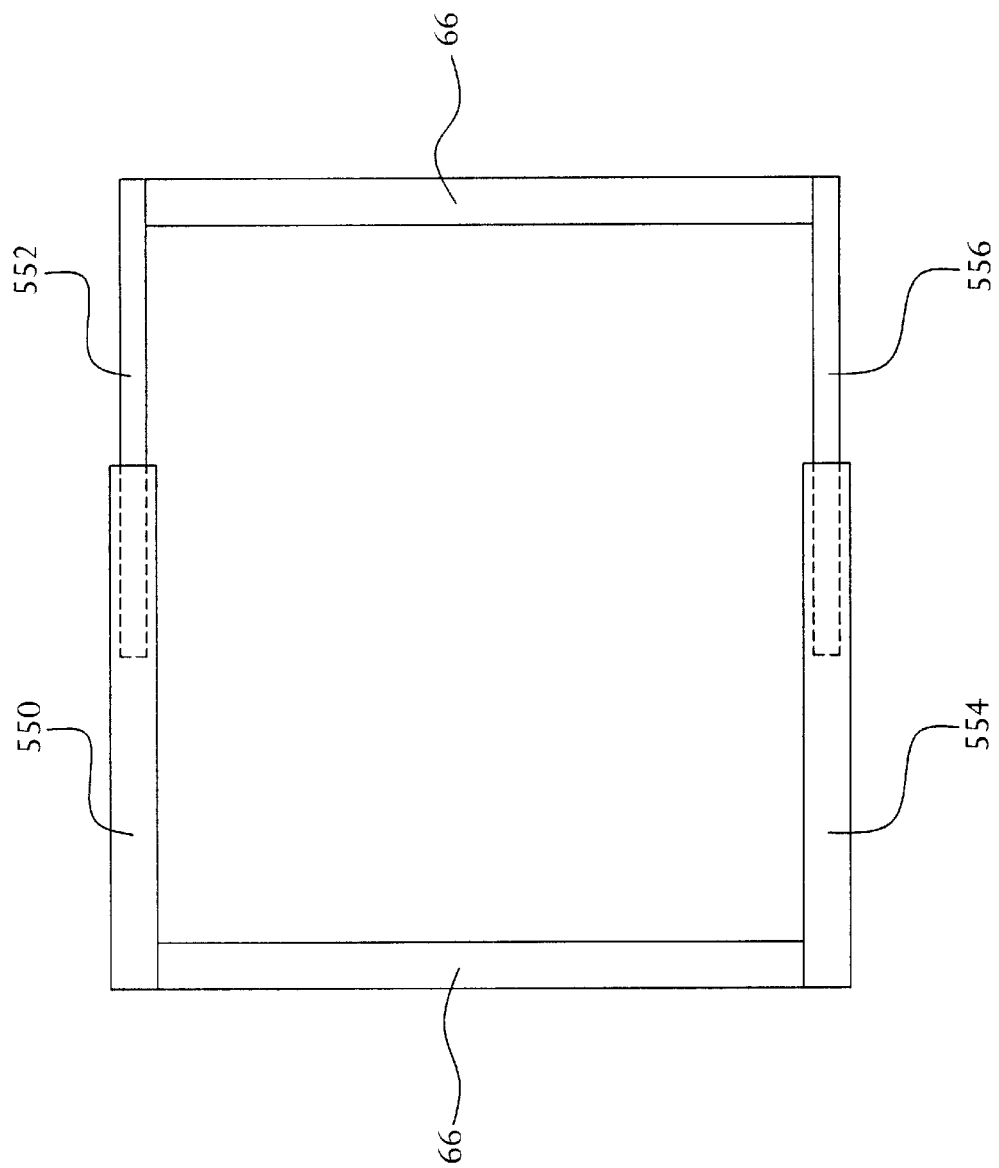
FIG. 13 is a front view of a frame for an adjustable width power chair manifesting aspects of the invention.

FIG. 13 illustrates a front view of the frame for an adjustable width power chair, made by modifying the foldable frame illustrated above. In FIG. 13, a pair of upper and lower telescoping tubular members extend laterally from respective vertical members 66, with the upper telescoping tubular members being designated 550 and 552 and the lower telescoping tubular members being designated 554 and 556. Pin connections are provided to secure upper and lower telescoping tubular members 550, 552 and 554, 556 together, at a selected one of a continuum of positions. A single transversely extending telescoping member is preferably used at the rear of the frame. With this arrangement, the power chair, while not foldable for transport, has adjustable width and is especially well suited for accommodating a child as the child grows. Other than substitution of the transversely extending telescoping members 550, etc. for the pivoting members 404, etc., the adjustable width frame and the resulting adjustable width power chair is as described for the folding version of the power chair.

What is claimed is:
1. A power chair comprising:
   a. a frame transversely foldable between operating and transport positions;
   b. a seat connected to said frame;
   c. a pair of drive wheels connected to said frame and rotatable about transverse axes below a portion of said seat supporting an occupant's thighs;
   d. motors for driving respective drive wheels, respective motor/drive wheel combinations being pivotally connected to said frame;
   e. at least one ground-engaging idler wheel connected to said frame and located rearward of said drive wheels;
   f. at least one anti-tip wheel forward of said drive wheels and positioned above ground, said at least one anti-tip wheel connected to said frame for resilient movement relative to said frame upon encountering an obstacle;
   g. a pair of transversely spaced arms positioned on respective sides of said power chair; and
   h. means connected to said frame for adjustably positioning said arms at a plurality of heights, the means connected to said frame comprising
      i. a tongue member fixedly connected to said arm, having a plurality of recesses in the surface thereof;
      ii. a housing member connected to said frame and having a receptacle of varying depth formed therein, being movable among positions at which various parts of said receptacle having different depths communicate with a selected one of said recesses; and
      iii. movable means resident in said receptacle and being of a size for receipt of a portion thereof by a recess with which said receptacle is communicating for interfering with movement of said tongue relative to said housing when said movable means is in a relatively shallow portion of said receptacle and freely permitting movement of said tongue when said movable means is in a relatively deep portion of said receptacle.
2. The power chair of claim 1 further comprising spring-strut assemblies for resiliently resisting upward movement of said anti-tip wheels upon encountering an obstacle.

3. The power chair of claim 2 wherein said spring-strut assemblies further comprise:
   a. a strut connected to said anti-tip wheel and moveable upwardly therewith;
   b. a spring coiled about said strut;
   c. means connected to said frame for constraining an upper end of said spring against upward movement while permitting slidable upward passage of said strut therethrough including a shaft portion slidably receiving said strut and fitting within the interior of said spring and a cap portion connecting with an upper portion of said shaft portion, having a curved exterior upper surface facilitating relative rotary motion of said constraining means respecting said frame responsively to an associated anti-tip wheel encountering an obstacle, upwardly displacing said strut and compressing said spring.

4. The power chair of claim 1 wherein said frame has a pair of rigid parallel side members connected by a plurality of cross members each comprising a plurality of pivotally connected links.

5. The power chair of claim 4 wherein said cross members are transverse to said side members and said pivotal connections rotate about longitudinal axes.

6. The power chair of claim 1 further comprising arcuate fenders fitting about upper portions of said parallel side members of said frame.

7. The power chair of claim 1 further comprising:
   a. manually actuable stick means for controlling speed and direction of power chair motion; and
   b. linkage means supportingly connecting said control stick means to said frame and permitting movement thereof between at least two positions while maintaining a fixed orientation relative to a longitudinal axis of said power chair.

8. The power chair of claim 7 wherein said linkage means is a four bar linkage.

9. The power chair of claim 8 wherein said four bar linkage defines a parallelogram.

10. The power chair of claim 1 wherein said seat includes a generally horizontal occupant vertical support portion and said power chair further comprises:
    a. an occupant transfer board pivotally connected to said frame and movable between positions generally parallel and skew respecting said occupant vertical support portion.

11. The power chair of claim 10 wherein said parallel position is co-planar with said occupant vertical support portion and said skew position is generally perpendicular to aid occupant vertical support portion.

12. The power chair of claim 10 further comprising:
    a. resilient means for biasing said transfer board towards one of said parallel and skew positions; and
    b. detent means for retaining said transfer board at a selected position intermediate said parallel and skew positions in opposition to said resilient means.

13. A power chair comprising:
    a. a frame transversely foldable between operating and transport positions;
    b. a seat connected to said frame;
    c. a pair of drive wheels connected to said frame and rotatable about transverse axes below a portion of said seat supporting an occupant's thighs;
    d. motors for driving respective drive wheels, respective motor/drive wheel combinations being pivotally connected to said frame;
    e. at least one ground-engaging idler wheel connected to said frame and located rearward of said drive wheels;
    f. at least one anti-tip wheel forward of said drive wheels and positioned above ground;
    g. a spring-strut assembly for resiliently resisting upward movement of said anti-tip wheel upon encountering an obstacle, said spring-strut comprising
       i. a strut connected to said anti-tip wheel and movable upwardly therewith;
       ii. a spring coiled about said strut;
       iii. means connected to said frame for constraining an upper end of said spring against upward movement while permitting slidable upward passage of said strut there through including a shaft portion slidably receiving said strut and fitting within the interior of said spring and a cap portion connecting with an upper portion of said shaft portion, having a exterior upper surface facilitating relative rotary motion of said constraining means respecting said frame responsively to an associated anti-tip wheel encountering an obstacle, upwardly displacing said strut and compressing said spring.

14. The power chair of claim 13 wherein said frame has a pair of rigid parallel side members connected by a plurality of cross members each comprising a plurality of pivotally connected links.

15. The power chair of claim 14 wherein said cross members are transverse to said side members and said pivotal connections rotate about longitudinal axes.

16. The power chair of claim 13 further comprising arcuate fenders fitting about upper portions of said parallel side members of said frame.

17. The power chair of claim 13 wherein said seat further comprises a pair of transversely spaced arms positioned on respective sides of said and said power chair further comprises means connected to said frame for adjustably positioning said arms at a plurality of heights.

18. A power chair comprising:
    a. a frame transversely foldable between operating and transport positions;
    b. a seat connected to said frame;
    c. a pair of drive wheels connected to said frame and rotatable about transverse axes below a portion of said seat supporting an occupant's thighs;
    d. motors for driving respective drive wheels, respective motor/drive wheel combinations being pivotally connected to said frame;
    e. at least one ground-engaging idler wheel connected to said frame and located rearward of said drive wheels;
    f. at least one anti-tip wheel forward of said drive wheels and positioned above ground;
    g. a pair of transversely spaced arms positioned on respective sides of said power chair; and
    h. means connected to said frame for adjustably positioning said arms at a plurality of heights, the means comprising
       i a tongue member fixedly connected to said arm, having a plurality of recesses in the surface thereof;
       ii. a housing member connected to said frame and having a receptacle of varying depth formed therein, being movable among positions at which various parts of said receptacle having different depths communicate with a selected one of said recesses; and
       iii. movable means resident in said receptacle and being of a size for receipt of a portion thereof by a recess with which said receptacle is communicating for interfering with movement of said tongue relative to said housing when said movable means is in a relatively shallow portion of said receptacle and freely permitting movement of said tongue when said movable means is in a relatively deep portion of said receptacle.

19. The power chair of claim 15 further comprising:
a. manually actuable stick means for controlling speed and direction of power chair motion; and
b. linkage means supportingly connecting said control stick means to said frame and permitting movement thereof between at least two positions while maintaining a fixed orientation relative to a longitudinal axis of said power chair.

20. A power chair comprising:
a. a frame transversely foldable between operating and transport positions;
b. a seat connected to said frame;
c. a pair of drive wheels connected to said frame and rotatable about transverse axes below a portion of said seat supporting an occupant's thighs;
d. motors for driving respective drive wheels, respective motor/drive wheel combinations being pivotally connected to said frame;
e. at least one ground-engaging idler wheel connected to said frame and located rearward of said drive wheels;
f. at least one anti-tip wheel forward of said drive wheels and positioned above ground, connected to said frame for movement relative to said frame upon encountering an obstacle; and
g. spring-strut assemblies for resiliently resisting upward movement of said anti-tip wheel upon encountering an obstacle, comprising:
  i. a strut connected to said anti-tip wheel and moveable upwardly therewith;
  ii. a spring coiled about said strut;
  iii. means connected to said frame for constraining an upper end of said spring against upward movement while permitting slidable upward passage of said strut therethrough including a shaft portion slidably receiving said strut and fitting within the interior of said spring and a cap portion connecting with an upper portion of said shaft portion, having a curved exterior upper surface facilitating relative rotary motion of said constraining means respecting said frame responsively to an associated anti-tip wheel encountering an obstacle, upwardly displacing said strut and compressing said spring;
wherein said frame has a pair of rigid parallel side members connected by a plurality of cross members each comprising a plurality of pivotally connected links;
wherein said cross members are transverse to said side members and said pivotal connections rotate about longitudinal axes.

21. A power wheel chair comprising:
a. a frame transversely foldable between operating and transport positions;
b. a seat connected to said frame;
c. a pair of drive wheels connected to said frame and rotatable about transverse axes;
d. at least one ground-engaging idler wheel connected to said frame;
e. a pair of transversely spaced arms positioned on respective sides of said power wheel chair; and
f. means connected to said frame for adjustably positioning said arms at a plurality of heights, the means connected to said frame comprising
  i. a tongue member fixedly connected to said arm, having a plurality of recesses in the surface thereof;
  ii. a housing member connected to said frame and having a receptacle of varying depth formed therein, being movable among positions at which various parts of said receptacle having different depths communicate with a selected one of said recesses; and
  iii. movable means resident in said receptacle and being of a size for receipt of a portion thereof by a recess with which said receptacle is communicating for interfering with movement of said tongue relative to said housing when said movable means is in a relatively shallow portion of said receptacle and freely permitting movement of said tongue when said movable means is in a relatively deep portion of said receptacle.

22. The power wheel chair according to claim 21, wherein a motor drives respective drive wheels, the respective motor/drive wheel combinations being pivotally connected to said frame.

23. The power wheel chair according to claim 21 further comprising:
manually actuable stick means for controlling speed and direction of power wheel chair motion; and
linkage means supportingly connecting said stick means to said frame and permitting movement thereof between at least two positions while maintaining a fixed orientation relative to a longitudinal axis of said power wheel chair.

24. The power chair of claim 23 wherein said linkage means is a four bar linkage.

25. The power chair of claim 24 wherein said four bar linkage defines a parallelogram.

* * * * *